United States Patent [19]
Jones et al.

[11] Patent Number: 5,268,903
[45] Date of Patent: Dec. 7, 1993

[54] MULTICHANNEL TELEPHONIC SWITCHING NETWORK WITH DIFFERENT SIGNALING FORMATS AND CROSS CONNECT/PBX TREATMENT SELECTABLE FOR EACH CHANNEL

[75] Inventors: Barry W. Jones, Hoffman Estates; Gordon J. Purtell, Lisle, both of Ill.

[73] Assignee: Rockwell International Corporation, El Segundo, Calif.

[21] Appl. No.: 770,197

[22] Filed: Oct. 2, 1991

[51] Int. Cl.$^5$ .............................................. H04J 3/12
[52] U.S. Cl. ................................ 370/110.1; 370/58.2; 370/58.3; 370/60; 370/68.1; 379/165
[58] Field of Search ..................... 370/110.1, 60, 58.3, 370/68.1, 58.2; 379/165

[56] References Cited

U.S. PATENT DOCUMENTS

| | | | |
|---|---|---|---|
| 3,652,803 | 3/1972 | Joel, Jr. | 370/68.1 |
| 4,685,100 | 8/1987 | Coppens et al. | 370/58.3 |
| 4,701,913 | 10/1987 | Nelson | 370/110.1 |
| 4,731,782 | 3/1988 | Shimizu et al. | 370/110.1 X |
| 4,890,280 | 12/1989 | Hirata | 370/60 |

Primary Examiner—Douglas W. Olms
Assistant Examiner—Russell W. Blum
Attorney, Agent, or Firm—C. B. Patti; V. L. Sewell; H. F. Hamann

[57] ABSTRACT

A telephonic switching network (20) having a plurality of multichannel incoming switching circuits, a central control processor (22) for controlling the incoming switching circuits (24, 36) to switch a selected plurality of incoming time division multiplex channels of PCM voice data on incoming lines (42) of a plurality of multichannel receiving circuits (36) to a plurality of selected outgoing channels on ongoing lines (58) of a plurality of multichannel outgoing switching circuits in accordance with messages representative of analysis of signaling data embedded in the PCM voice data by a plurality of relatively lower order processors (78) of said plurality of incoming multichannel switching circuits which are transmitted directly to the central control processor (22). Messages from the central control processor (22) cause the lowest order processors (70), of the receiving circuits to preselect the multiple channels on the incoming lines (42) associated therewith for cross connect treatment or signaling data analysis treatment on a channel by channel basis. A multichannel signaling control circuit (80) is responsive to the incoming signaling data and to a hardware state machine (82, 84) associated therewith for analysis of the signaling data on each channel according to different ones of a plurality of signaling formats preselected for each of said channels.

40 Claims, 52 Drawing Sheets

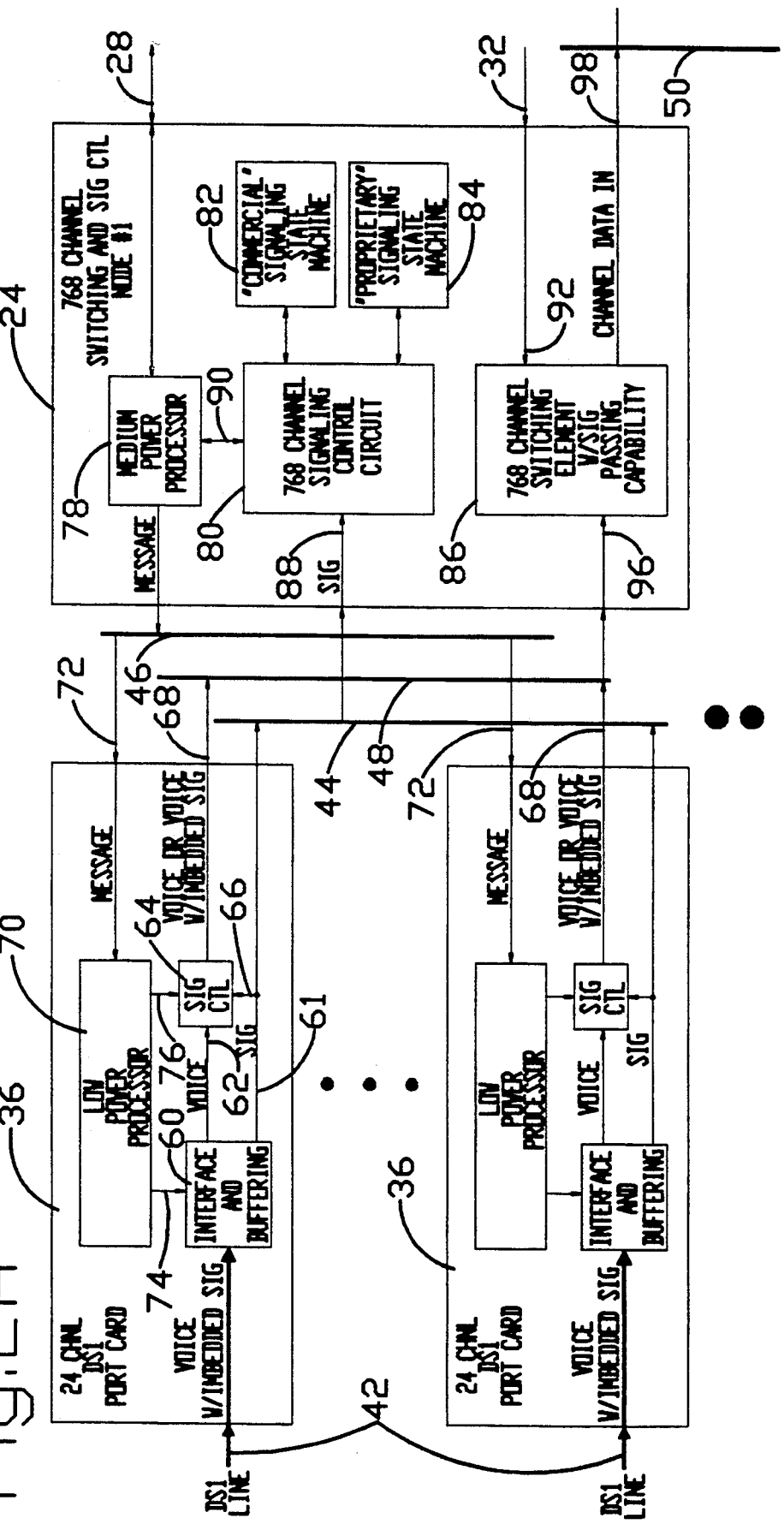

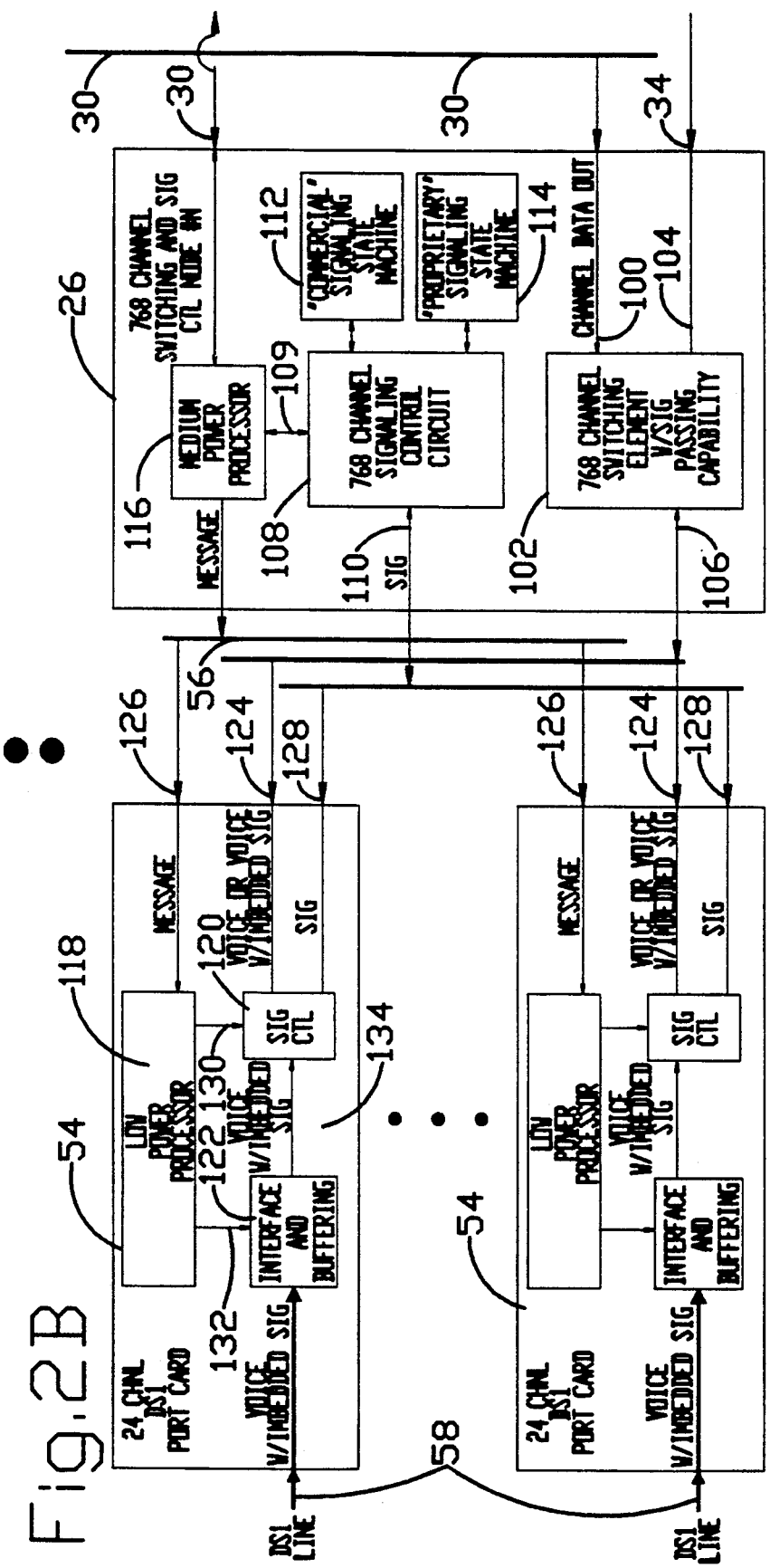

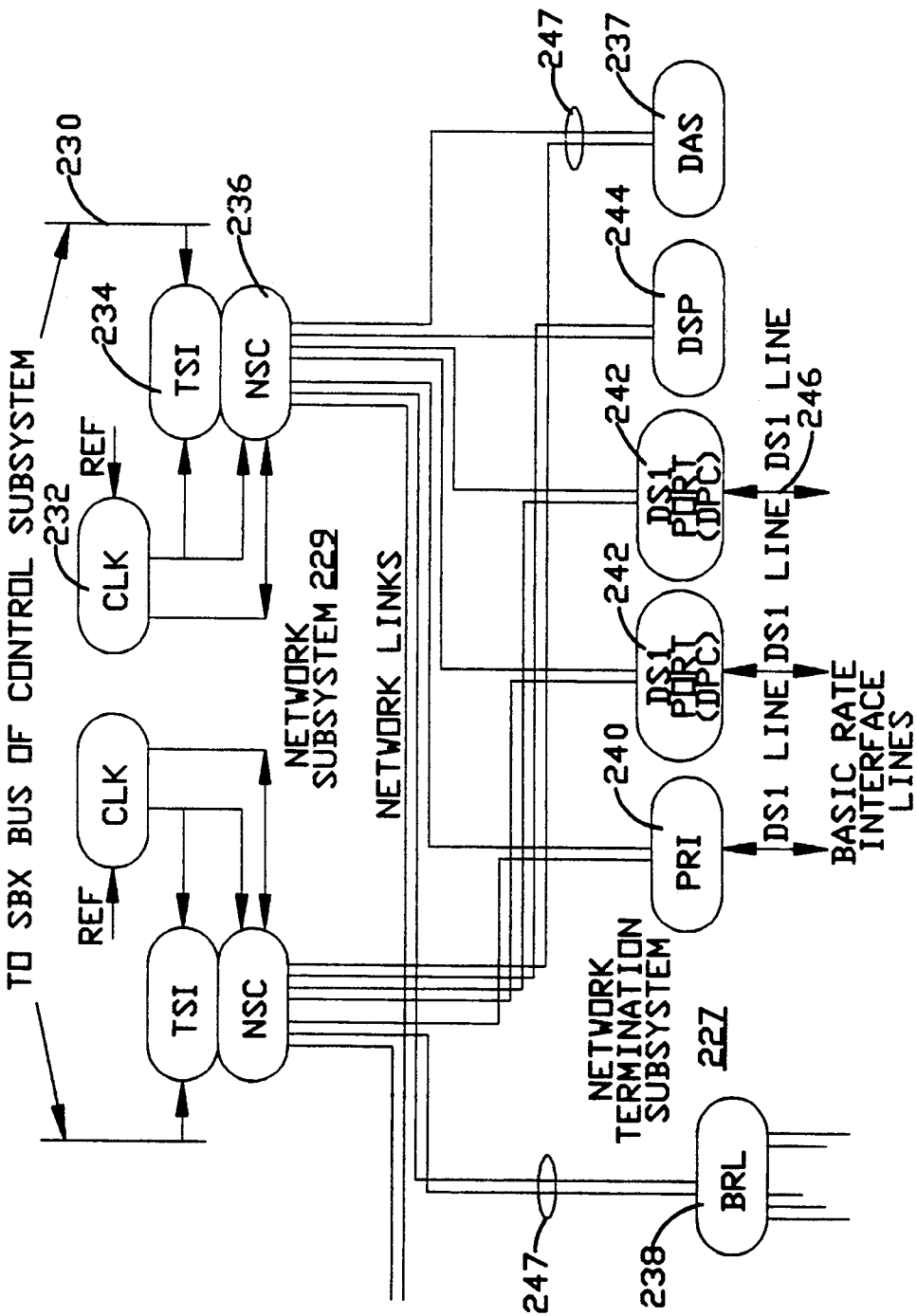

Fig. 5A

| TRANSMIT LINK LS CONTROL REGISTER (A5-A1 = 01110) | | | | | | | |
|---|---|---|---|---|---|---|---|
| D7 | D6 | D5 | D4 | D3 | D2 | D1 | D0 |
| TLSC7 | TLSC6 | TLSC5 | TLSC4 | TLSC3 | TLSC2 | TLSC1 | TLSC0 |

D0-D7   CHANNEL 0-7 CONTROL

Fig. 5B

| RECEIVE LINK MS SIGNALING CONTROL REGISTER (A5-A1 = 01111) | | | | | | | |
|---|---|---|---|---|---|---|---|
| D7 | D6 | D5 | D4 | D3 | D2 | D1 | D0 |
| RLSC23 | RLSC22 | RLSC21 | RLSC20 | RLSC19 | RLSC18 | RLSC17 | RLSC16 |

D0-D7   CHANNEL 16-23 CONTROL

Fig. 5C

| RECEIVE LINK SS SIGNALING CONTROL REGISTER (A5-A1 = 10000) | | | | | | | |
|---|---|---|---|---|---|---|---|
| D7 | D6 | D5 | D4 | D3 | D2 | D1 | D0 |
| RLSC15 | RLSC14 | RLSC13 | RLSC12 | RLSC11 | RLSC10 | RLSC9 | RLSC8 |

D0-D7   CHANNEL 8-15 CONTROL

Fig.6A

| TRANSMIT LINK MS SIGNALING CONTROL REGISTER (A5-A1 = 01100) |
|---|

| D7 | D6 | D5 | D4 | D3 | D2 | D1 | D0 |
|---|---|---|---|---|---|---|---|
| TLSC23 | TLSC22 | TLSC21 | TLSC20 | TLSC19 | TLSC18 | TLSC17 | TLSC16 |

D0-D7    CHANNEL 16-23 CONTROL

Fig.6B

| TRANSMIT LINK SS SIGNALING CONTROL REGISTER (A5-A1 = 01101) |
|---|

| D7 | D6 | D5 | D4 | D3 | D2 | D1 | D0 |
|---|---|---|---|---|---|---|---|
| TLSC15 | TLSC14 | TLSC13 | TLSC12 | TLSC11 | TLSC10 | TLSC9 | TLSC8 |

D0-D7    CHANNEL 8-15 CONTROL

Fig.6C

| TRANSMIT LINK LS SIGNALING CONTROL REGISTER (A5-A1 = 01110) |
|---|

| D7 | D6 | D5 | D4 | D3 | D2 | D1 | D0 |
|---|---|---|---|---|---|---|---|
| TLSC7 | TLSC6 | TLSC5 | TLSC4 | TLSC3 | TLSC2 | TLSC1 | TLSC0 |

D0-D7    CHANNEL 0-7 CONTROL

Fig. 8

| | FRAME 1 | FRAME 2 | FRAME 3 | FRAME 4 | FRAME 5 | FRAME 6 |
|---|---|---|---|---|---|---|
| A SIGNALING FRAMES | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 |

| | FRAME 7 | FRAME 8 | FRAME 9 | FRAME 10 | FRAME 11 | FRAME 12 |
|---|---|---|---|---|---|---|
| B SIGNALING FRAMES | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 |

| | FRAME 13 | FRAME 14 | FRAME 15 | FRAME 16 | FRAME 17 | FRAME 18 |
|---|---|---|---|---|---|---|
| C (OR A) SIGNALING FRAMES | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 |

| | FRAME 19 | FRAME 20 | FRAME 21 | FRAME 22 | FRAME 23 | FRAME 24 |
|---|---|---|---|---|---|---|
| D (OR B) SIGNALING FRAMES | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 | CHN CHN ... CHN 0 1 ... 771 |

Fig.9

1) CONFIGURATION (CFG) WORD

C4:     =1, CHANNEL OUTPUT DATA LOOPED TO INPUT
             =0, CHANNEL INPUT=BACKPLANE DATA

C3:     =1, CHANNEL ACTIVE
             =0, CHANNEL INACTIVE

C2, C1: =00, A-ONLY SIGNALING
             =01, AB SIGNALING
             =10, ABAB (SLC96) SIGNALING
             =11, ABCD (ESF) SIGNALING

C0:     =1, AGENT CONSOLE
             =0, TRUNK

2) INBOUND AB SIGNALING (ABIN) WORD

IF C2, C1=00   ONLY THE 'A' SIGNALING BIT HAS MEANING
              SO AI8,AI7,AI6,AI5 = 'A',X,X,X

IF C2, C1=01   BOTH THE 'A' AND 'B' SIGNALING BITS HAVE MEANING
              SO AI8,AI7,AI6,AI5 = 'A','B',X,X

IF C2, C1=10   FOUR SIGNALING BITS HAVE MEANING-TWO 'A','B' PAIRS
              SO AI8,AI7,AI6,AI5 = 'A1','B1','A2','B2'

IF C2, C1=11   FOUR SIGNALING BITS HAVE MEANING-'A','B','C',+'D'
              SO AI8,AI7,AI6,AI5 = 'A','B','C','D'

3) OUTBOUND AB SIGNALING (ABOUT) WORD
SAME AS ABIN WORD IN STRUCTURE BUT THE FOUR BITS OF INTEREST
      ARE: AO3,AO2,AO1,+ AO0

4) OUTBOUND SPECIAL-B SIGNALING (SBOUT) WORD
ONLY HAS MEANING WHEN C2,C1,C0=001

SO11,SO10,SO9,SO8,SO7,SO6,SO5,SO4 = A SPECIAL-B MESSAGE CODE

SO3,SO2,SO1,SO0:   =1111,    IDLE CODE (0) BEING TRANSMITTED
                   = OTHER   MESSAGE CODE IN SO11-SO4
                               TRANSMISSION IN PROGRESS

Fig.10

| ADDRESS | REGISTER NAME | REGISTER TYPE |
|---|---|---|
| OFFSET + 0000 | STATUS REGISTER | READ ONLY |
| 0001 | RESPONSE REGISTER | READ ONLY |
| 0010 | TRUNK FIFO WORD #1 (CHANNEL NUMBER) | READ ONLY |
| 0011 | TRUNK FIFO WORD #2 (DATA) | READ ONLY |
| 0100 | TRUNK FIFO COUNT | READ ONLY |
| 0101 | SPECIAL-B FIFO WORD #1 (CHANNEL NUMBER) | READ ONLY |
| 0110 | SPECIAL-B FIFO WORD #2 (DATA) | READ ONLY |
| 0111 | SPECIAL-B FIFO COUNT | READ ONLY |
| 1000 | COMMAND REGISTER | READ / WRITE |
| 1001 | COMMAND PARAMETER REGISTER #1 | READ / WRITE |
| 1010 | COMMAND PARAMETER REGISTER #2 | READ / WRITE |
| 1011 | BACKPLANE I/O DELAY REGISTER | READ / WRITE |
| 1100 | ERROR CONTROL REGISTER | READ / WRITE |
| 1101 | COMMAND EXECUTION REGISTER | WRITE ONLY |

Fig.11

| COMMAND REGISTER | IMPLIED COMMAND | COMMAND PARAMETER 1 REGISTER | COMMAND PARAMETER 2 REGISTER | RESPONSE REGISTER |
|---|---|---|---|---|
| 0 0 0 0 | NO ACTION | --------- | --------- | --------- |
| 0 0 0 1 | READ STATE RAM | ADDR(12:0) | --------- | DATA(11:0) |
| 0 0 1 0 | WRITE STATE RAM | ADDR(12:0) | DATA(11:0) | DATA(11:0) |
| 0 0 1 1 * | WRITE TRUNK FIFO | DATA(9:0) | DATA(3:0) | --------- |
| 0 1 0 0 * | WRITE SPECL-B FIFO | DATA(9:0) | DATA(7:0) | --------- |
| 0 1 0 1 | RESET TRUNK FIFO | --------- | --------- | --------- |
| 0 1 1 0 | RESET SPECL-B FIFO | --------- | --------- | --------- |
| 0 1 1 1 | SET TEST MODE A | --------- | --------- | --------- |
| 1 0 0 0 | SET TEST MODE B | --------- | --------- | --------- |
| 1 0 0 1 | CLEAR TEST MODES | --------- | --------- | --------- |
| 1 0 1 0 | ENABLE INTERRUPTS | --------- | --------- | --------- |
| 1 0 1 1 | DISABLE INTERRUPTS | --------- | --------- | --------- |

* A WRITE TO THE TRUNK TRANSITION FIFO AND THE SPECIAL-B MESSAGE FIFO CAN ONLY OCCOUR WHEN THE DEVICE IS SET IN TEST MODE A.

Fig.12

1) READ STATUS REGISTER
   IF COMMAND READY = 1, PROCEED
2) WRITE COMMAND CODE TO COMMAND REGISTER (SEE FIG 7.6)
3) WRITE PARAMETER TO COMMAND PARAMETER #1 REGISTER
4) WRITE PARAMETER TO COMMAND PARAMETER #2 REGISTER
5) WRITE (ANYTHING) TO COMMAND EXECUTION REGISTER
   COMMAND PROCESSING WILL BEGIN AND COMPLETE IN LESS THAN 5US
6) READ STATUS REGISTER
   A) IF COMMAND WAS READ/WRITE STATE RAM AND RESPONSE READY
      BIT=1, THEN COMMAND EXECUTION ALMOST COMPLETE-ONE MORE
      READ OF THE STATUS REGISTER IS NEEDED TO ASSURE RESPONSE
      READY BIT IS CLEARED; COMMAND EXECUTION IS NOW COMPLETE
      AND VALID DATA IS AVAILABLE IN THE RESPONSE REGISTER
      FOR READING.
   B) OTHER COMMANDS: IF COMMAND READY BIT = 1,
      THEN COMMAND EXECUTION COMPLETE

NOTES:

- STEPS 2 THRU 4 MAY OCCUR IN ANY ORDER;
  TIME IS NOT CRITICAL-NOTHING HAPPENS UNTIL THE
  EXECUTION REGISTER IS WRITTEN

- CERTAIN COMMANDS DO NOT HAVE ANY PARAMETERS, THUS
  STEPS 3 AND 4 MAY BE UNNECESSARY

- WHENEVER THE EXECUTE REGISTER IS WRITTEN, THE
  COMMAND READY BIT WILL BE CLEARED. THE COMMAND READY
  (AND RESPONSE READY IF A READ/WRITE STATE RAM COMMAND)
  BIT WILL BE SET UPON COMMAND COMPLETION

Fig.13

| ADDR* | WORD NAME | (D12) | D11 | D10 | D9 | D8 | D7 | D6 | D5 | D4 | D3 | D2 | D1 | D0 |
|---|---|---|---|---|---|---|---|---|---|---|---|---|---|---|
| AAAAAAAA000 | CFG | PAR | x | x | x | x | x | x | x | C4 | C3 | C2 | C1 | C0 |
| AAAAAAAA001 | ABIN | PAR | x | x | x | A18 | A17 | A16 | A15 | A14 | A13 | A12 | A11 | A10 |
| AAAAAAAA010 | SBIN | PAR | x | SI10 | SI9 | SI8 | SI7 | SI6 | SI5 | SI4 | SI3 | SI2 | SI1 | SI0 |
| AAAAAAAA011 | ABOUT | PAR | x | x | x | x | x | x | x | x | AO3 | AO2 | AO1 | AO0 |
| AAAAAAAA100 | SBOUT | PAR | SO11 | SO10 | SO9 | SO8 | SO7 | SO6 | SO5 | SO4 | SO3 | SO2 | SO1 | SO0 |
| AAAAAAAA101 | UNUSED1 | PAR | x | x | x | x | x | x | x | x | x | x | x | x |
| AAAAAAAA110 | UNUSED2 | PAR | x | x | x | x | x | x | x | x | x | x | x | x |
| AAAAAAAA111 | UNUSED3 | PAR | x | x | x | x | x | x | x | x | x | x | x | x |

*–AAAAAAAAA RANGES FROM 0 TO 1023)
WE USE 0 TO 771(CHNL#)

Fig. 14
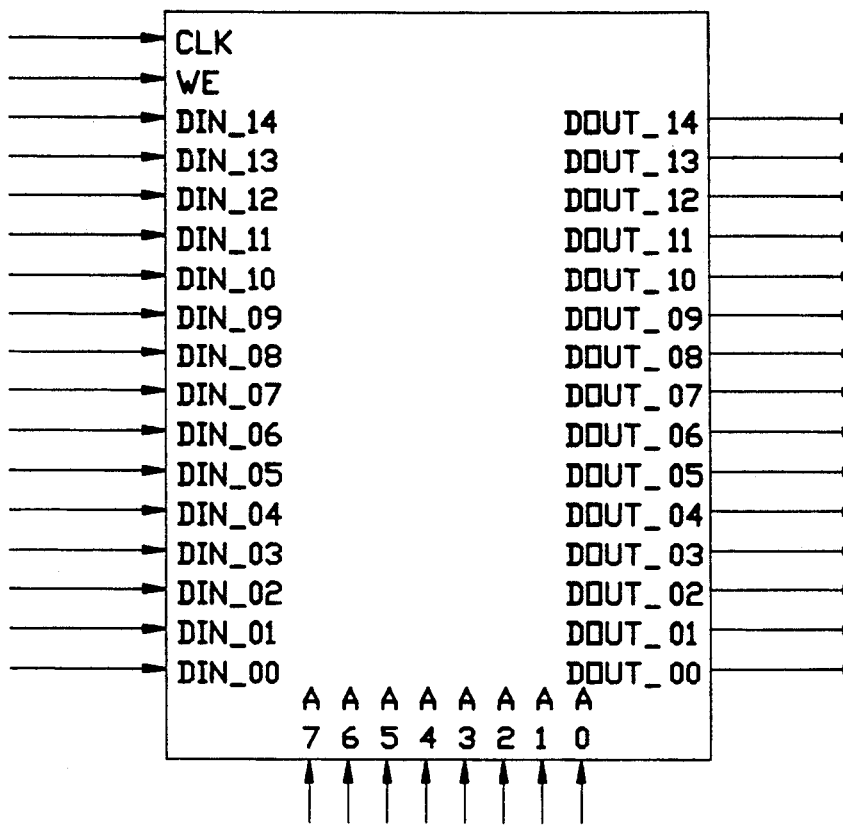
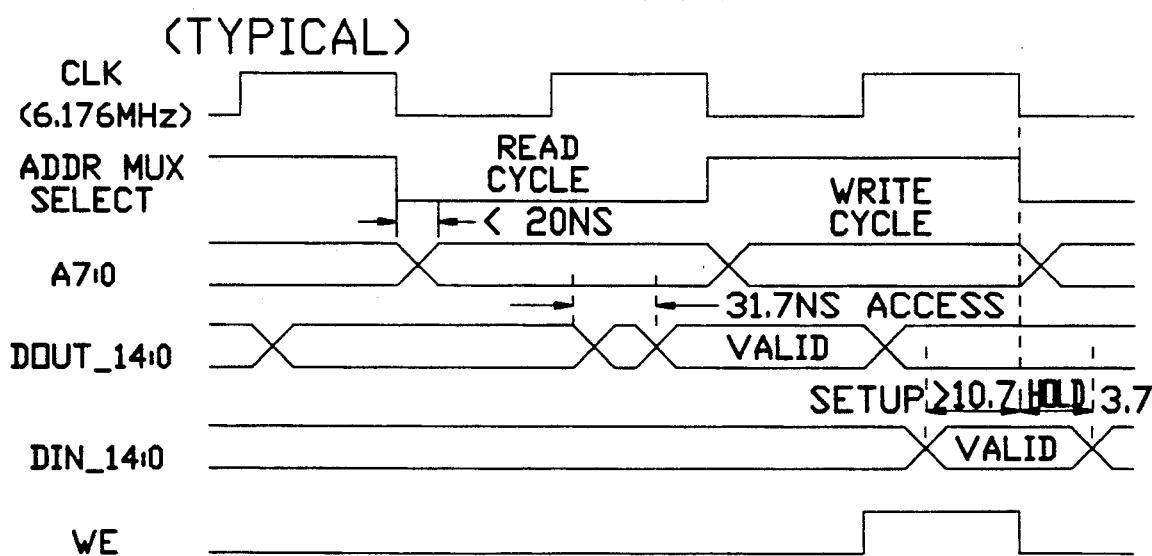

Fig.15

| | | | STATUS REGISTER (READ ONLY) | | | | |
|---|---|---|---|---|---|---|---|
| D15 | D14 | D13 | D12 | D11 | D10 | D9 | D8 |
| XXXXXX | INPER | OTPER | SRPER | ABPER | SBPER | ABAER | SBAER |

| D7 | D6 | D5 | D4 | D3 | D2 | D1 | D0 |
|---|---|---|---|---|---|---|---|
| SYCER | ABFOV | SBFOV | TSTA | TSTB | INTEN | CMDRD | RSPRD |

D15 NOT USED
D14 INPUT RAM PARITY ERROR
D13 OUTPUT RAM PARITY ERROR
D12 STATE RAM PARITY ERROR
D11 AB-FIFO PARITY ERROR
D10 SB-FIFO PARITY ERROR
D9 AB-ROM ACCESS ERROR
D8 SB-ROM ACCESS ERROR
D7 SYNC ERROR
D6 AB-FIFO OVERFLOW
D5 SB-FIFO OVERFLOW
D4 TEST MODE A SET
D3 TEST MODE B SET
D2 INTERRUPTS ENABLED
D1 COMMANDS READY
D0 RESPONSE READY

Fig.16

RESPONSE REGISTER (READ ONLY)

| D15 | D14 | D13 | D12 | D11 | D10 | D9 | D8 |
|-----|-----|-----|-----|-----|-----|-----|-----|
| XXXXXX | XXXXXX | XXXXXX | XXXXXX | RSPD11 | RSPD10 | RSPD9 | RSPD8 |

| D7 | D6 | D5 | D4 | D3 | D2 | D1 | D0 |
|-----|-----|-----|-----|-----|-----|-----|-----|
| RSPD7 | RSPD6 | RSPD5 | RSPD4 | RSPD3 | RSPD2 | RSPD1 | RSPD0 |

```
D15   NOT USED
D14   NOT USED
D13   NOT USED
D12   NOT USED
D11   RESPONSE DATA BIT 11 - STATE RAM DATA BIT 11
D10   RESPONSE DATA BIT 10 - STATE RAM DATA BIT 10
D9    RESPONSE DATA BIT  9 - STATE RAM DATA BIT  9
D8    RESPONSE DATA BIT  8 - STATE RAM DATA BIT  8
D7    RESPONSE DATA BIT  7 - STATE RAM DATA BIT  7
D6    RESPONSE DATA BIT  6 - STATE RAM DATA BIT  6
D5    RESPONSE DATA BIT  5 - STATE RAM DATA BIT  5
D4    RESPONSE DATA BIT  4 - STATE RAM DATA BIT  4
D3    RESPONSE DATA BIT  3 - STATE RAM DATA BIT  3
D2    RESPONSE DATA BIT  2 - STATE RAM DATA BIT  2
D1    RESPONSE DATA BIT  1 - STATE RAM DATA BIT  1
D0    RESPONSE DATA BIT  0 - STATE RAM DATA BIT  0
```

THE 68000 READS THIS REGISTER AFTER READING OR WRITING THE STATE RAM. VALID DATA IS AVAILABLE WHEN THE RESPONSE READY BIT IS SET IN THE STATUS REGISTER. WRITING THE STATE RAM AUTOMATICALLY INITIATES A READ AT THE ADDRESS LOCATION BEING WRITTEN. THUS, THE 68000 COULD READ THE RESPONSE REGISTER TO VERIFY THAT CORRECT DATA WAS WRITTEN.

Fig.17

TRUNK FIFO REGISTER #1 (READ ONLY)

| D15 | D14 | D13 | D12 | D11 | D10 | D9 | D8 |
|---|---|---|---|---|---|---|---|
| XXXXXX | XXXXXX | XXXXXX | XXXXXX | XXXXXX | XXXXXX | TFCN9 | TFCN8 |

| D7 | D6 | D5 | D4 | D3 | D2 | D1 | D0 |
|---|---|---|---|---|---|---|---|
| TFCN7 | TFCN6 | TFCN5 | TFCN4 | TFCN3 | TFCN2 | TFCN1 | TFCN0 |

```
D15   NOT USED
D14   NOT USED
D13   NOT USED
D12   NOT USED
D11   NOT USED
D10   NOT USED
D9    TRUNK FIFO CHANNEL NUMBER BIT 9 -MSB
D8    TRUNK FIFO CHANNEL NUMBER BIT 8
D7    TRUNK FIFO CHANNEL NUMBER BIT 7
D6    TRUNK FIFO CHANNEL NUMBER BIT 6
D5    TRUNK FIFO CHANNEL NUMBER BIT 5
D4    TRUNK FIFO CHANNEL NUMBER BIT 4
D3    TRUNK FIFO CHANNEL NUMBER BIT 3
D2    TRUNK FIFO CHANNEL NUMBER BIT 2
D1    TRUNK FIFO CHANNEL NUMBER BIT 1
D0    TRUNK FIFO CHANNEL NUMBER BIT 0 -LSB
```

THE 68000 READS THIS REGISTER TO DETERMINE WHICH CHANNEL HAD A TRUNK SIGNALING STATE TRANSITION.

Fig.18

TRUNK FIFO REGISTER #2 (READ ONLY)

| D15 | D14 | D13 | D12 | D11 | D10 | D9 | D8 |
|-----|-----|-----|-----|-----|-----|-----|-----|
| XXXXXX | XXXXXX | XXXXXX | XXXXXX | XXXXXX | XXXXXX | XXXXXX | XXXXXX |

| D7 | D6 | D5 | D4 | D3 | D2 | D1 | D0 |
|-----|-----|-----|-----|-----|-----|-----|-----|
| XXXXXX | XXXXXX | XXXXXX | XXXXXX | TFD3 | TFD2 | TFD1 | TFD0 |

D15 NOT USED
D14 NOT USED
D13 NOT USED
D12 NOT USED
D11 NOT USED
D10 NOT USED
D9 NOT USED
D8 NOT USED
D7 NOT USED
D6 NOT USED
D5 NOT USED
D4 NOT USED
D3 TRUNK FIFO DATA BIT 3 - A SIGNALING BIT
D2 TRUNK FIFO DATA BIT 2 - B SIGNALING BIT
D1 TRUNK FIFO DATA BIT 1 - C SIGNALING BIT
D0 TRUNK FIFO DATA BIT 0 - D SIGNALING BIT

THE 68000 READS THIS REGISTER TO DETERMINE THE NEW SIGNALING STATE FOR A SPECIFIC CHANNEL. THE SPECIFIC CHANNEL NUMBER WHICH HAD THE SIGNALING STATE TRANSITION IS FOUND IN TRUNK FIFO REGISTER1.

Fig.19

| TRUNK FIFO COUNT REGISTER (READ ONLY) ||||||||
|---|---|---|---|---|---|---|---|
| D15 | D14 | D13 | D12 | D11 | D10 | D9 | D8 |
| XXXXXX | XXXXXX | XXXXXX | XXXXXX | XXXXXX | XXXXXX | XXXXXX | XXXXXX |
| D7 | D6 | D5 | D4 | D3 | D2 | D1 | D0 |
| TFC7 | TFC6 | TFC5 | TFC4 | TFC3 | TFC2 | TFC1 | TFC0 |

D15 NOT USED
D14 NOT USED
D13 NOT USED
D12 NOT USED
D11 NOT USED
D10 NOT USED
D9 NOT USED
D8 NOT USED
D7 TRUNK FIFO COUNT BIT 7-MSB
D6 TRUNK FIFO COUNT BIT 6
D5 TRUNK FIFO COUNT BIT 5
D4 TRUNK FIFO COUNT BIT 4
D3 TRUNK FIFO COUNT BIT 3
D2 TRUNK FIFO COUNT BIT 2
D1 TRUNK FIFO COUNT BIT 1
D0 TRUNK FIFO COUNT BIT 0-LSB

THE 68000 READS THIS REGISTER TO DETERMINE THE NUMBER OF ELEMENTS IN THE TRUNK TRANSITION FIFO. ELEMENTS IMPLIES THE CHANNEL NUMBER ALONG WITH THE TRANSITION DATA PER ADDRESS LOCATION OF THE FIFO.

Fig.20

SPECIAL-B FIFO REGISTER #1 (READ ONLY)

| D15 | D14 | D13 | D12 | D11 | D10 | D9 | D8 |
|---|---|---|---|---|---|---|---|
| XXXXXX | XXXXXX | XXXXXX | XXXXXX | XXXXXX | XXXXXX | SBFCN9 | SBFCN8 |

| D7 | D6 | D5 | D4 | D3 | D2 | D1 | D0 |
|---|---|---|---|---|---|---|---|
| SBFCN7 | SBFCN6 | SBFCN5 | SBFCN4 | SBFCN3 | SBFCN2 | SBFCN1 | SBFCN0 |

```
D15   NOT USED
D14   NOT USED
D13   NOT USED
D12   NOT USED
D11   NOT USED
D10   NOT USED
D9    SPECIAL-B FIFO CHANNEL NUMBER BIT 9-MSB
D8    SPECIAL-B FIFO CHANNEL NUMBER BIT 8
D7    SPECIAL-B FIFO CHANNEL NUMBER BIT 7
D6    SPECIAL-B FIFO CHANNEL NUMBER BIT 6
D5    SPECIAL-B FIFO CHANNEL NUMBER BIT 5
D4    SPECIAL-B FIFO CHANNEL NUMBER BIT 4
D3    SPECIAL-B FIFO CHANNEL NUMBER BIT 3
D2    SPECIAL-B FIFO CHANNEL NUMBER BIT 2
D1    SPECIAL-B FIFO CHANNEL NUMBER BIT 1
D0    SPECIAL-B FIFO CHANNEL NUMBER BIT 0-LSB
```

THE 68000 READS THIS REGISTER TO DETERMINE WHICH CHANNEL RECEIVED A NEW SPECIAL-B MESSAGE.

Fig.21

SPECIAL-B FIFO REGISTER #2 (READ ONLY)

| D15 | D14 | D13 | D12 | D11 | D10 | D9 | D8 |
|---|---|---|---|---|---|---|---|
| XXXXXX | XXXXXX | XXXXXX | XXXXXX | XXXXXX | XXXXXX | XXXXXX | XXXXXX |

| D7 | D6 | D5 | D4 | D3 | D2 | D1 | D0 |
|---|---|---|---|---|---|---|---|
| SBFD7 | SBFD6 | SBFD5 | SBFD4 | SBFD3 | SBFD2 | SBFD1 | SBFD0 |

D15 NOT USED
D14 NOT USED
D13 NOT USED
D12 NOT USED
D11 NOT USED
D10 NOT USED
D9  NOT USED
D8  NOT USED
D7  SPECIAL-B FIFO DATA BIT 7
D6  SPECIAL-B FIFO DATA BIT 6
D5  SPECIAL-B FIFO DATA BIT 5
D4  SPECIAL-B FIFO DATA BIT 4
D3  SPECIAL-B FIFO DATA BIT 3
D2  SPECIAL-B FIFO DATA BIT 2
D1  SPECIAL-B FIFO DATA BIT 1
D0  SPECIAL-B FIFO DATA BIT 0

THE 68000 READS THIS REGISTER TO DETERMINE THE NEW SPECIAL-B MESSAGE FOR A SPECIFIC CHANNEL THE SPECIFIC CHANNEL NUMBER WHICH RECEIVED THIS SPECIAL-B MESSAGE IS FOUND IN SPECIAL-B FIFO REGISTER1.

Fig.22

SPECIAL-B FIFO COUNT REGISTER (READ ONLY)

| D15 | D14 | D13 | D12 | D11 | D10 | D9 | D8 |
|---|---|---|---|---|---|---|---|
| XXXXXX | XXXXXX | XXXXXX | XXXXXX | XXXXXX | XXXXXX | XXXXXX | XXXXXX |

| D7 | D6 | D5 | D4 | D3 | D2 | D1 | D0 |
|---|---|---|---|---|---|---|---|
| SBFC7 | SBFC6 | SBFC5 | SBFC4 | SBFC3 | SBFC2 | SBFC1 | SBFC0 |

- D15 NOT USED
- D14 NOT USED
- D13 NOT USED
- D12 NOT USED
- D11 NOT USED
- D10 NOT USED
- D9 NOT USED
- D8 NOT USED
- D7 SPECIAL-B FIFO DATA BIT 7-MSB
- D6 SPECIAL-B FIFO DATA BIT 6
- D5 SPECIAL-B FIFO DATA BIT 5
- D4 SPECIAL-B FIFO DATA BIT 4
- D3 SPECIAL-B FIFO DATA BIT 3
- D2 SPECIAL-B FIFO DATA BIT 2
- D1 SPECIAL-B FIFO DATA BIT 1
- D0 SPECIAL-B FIFO DATA BIT 0-LSB

THE 68000 READS THIS REGISTER TO DETERMINE THE NUMBER OF ELEMENTS IN THE SPECIAL-B MESSAGE FIFO. ELEMENTS IMPLIES THE CHANNEL NUMBER ALONG WITH THE SPECIAL-B MESSAGE PER ADDRESS LOCATION OF THE FIFO.

Fig.23

COMMAND REGISTER (READ/WRITE)

| D15 | D14 | D13 | D12 | D11 | D10 | D9 | D8 |
|---|---|---|---|---|---|---|---|
| XXXXXX | XXXXXX | XXXXXX | XXXXXX | XXXXXX | XXXXXX | XXXXXX | XXXXXX |

| D7 | D6 | D5 | D4 | D3 | D2 | D1 | D0 |
|---|---|---|---|---|---|---|---|
| XXXXXX | XXXXXX | XXXXXX | XXXXXX | CMD3 | CMD2 | CMD1 | CMD0 |

```
D15   NOT USED
D14   NOT USED
D13   NOT USED
D12   NOT USED
D11   NOT USED
D10   NOT USED
D9    NOT USED
D8    NOT USED
D7    NOT USED
D6    NOT USED
D5    NOT USED
D4    NOT USED
D3    COMMAND DATA BIT 3
D2    COMMAND DATA BIT 2
D1    COMMAND DATA BIT 1
D0    COMMAND DATA BIT 0
```

Fig. 24

COMMAND PARAMETER REGISTER #1 (READ/WRITE)

| D15 | D14 | D13 | D12 | D11 | D10 | D9 | D8 |
|---|---|---|---|---|---|---|---|
| CP1D15 | CP1D14 | CP1D13 | CP1D12 | CP1D11 | CP1D10 | CP1D9 | CP1D8 |

| D7 | D6 | D5 | D4 | D3 | D2 | D1 | D0 |
|---|---|---|---|---|---|---|---|
| CP1D7 | CP1D6 | CP1D5 | CP1D4 | CP1D3 | CP1D2 | CP1D1 | CP1D0 |

D15  COMMAND PARAMETER1 DATA BIT 15
D14  COMMAND PARAMETER1 DATA BIT 14
D13  COMMAND PARAMETER1 DATA BIT 13
D12  COMMAND PARAMETER1 DATA BIT 12
D11  COMMAND PARAMETER1 DATA BIT 11
D10  COMMAND PARAMETER1 DATA BIT 10
D9   COMMAND PARAMETER1 DATA BIT 9
D8   COMMAND PARAMETER1 DATA BIT 8
D7   COMMAND PARAMETER1 DATA BIT 7
D6   COMMAND PARAMETER1 DATA BIT 6
D5   COMMAND PARAMETER1 DATA BIT 5
D4   COMMAND PARAMETER1 DATA BIT 4
D3   COMMAND PARAMETER1 DATA BIT 3
D2   COMMAND PARAMETER1 DATA BIT 2
D1   COMMAND PARAMETER1 DATA BIT 1
D0   COMMAND PARAMETER1 DATA BIT 0

NORMAL ON LINE: BITS D12-D0 HOLD THE STATE RAM ADDRESS WHEN THE 68000 IS READING OR WRITING THE STATE RAM.

TEST MODE A: BITS D9-D0 HOLD THE UPPER DATA WHEN THE 68000 IS WRITING THE TRUNK TRANSITION FIFO OR THE SPECIAL-B MESSAGE FIFO.

CHIP TEST: BITS D15-D11 AND BITS D10-D0 HOLD THE VALUES WHICH WILL BE LOADED TO THE BACK FRAME AND BACK CHANNEL COUNTERS RESPECTIVELY. THIS CAN ONLY OCCUR WHEN THE TEST PIN IS PULLED HIGH AND SYNC IS APPLIED.

Fig.25

| COMMAND PARAMETER REGISTER #2 (READ/WRITE) ||||||||
|---|---|---|---|---|---|---|---|
| D15 | D14 | D13 | D12 | D11 | D10 | D9 | D8 |
| CP2D15 | CP2D14 | CP2D13 | CP2D12 | CP2D11 | CP2D10 | CP2D9 | CP2D8 |

| D7 | D6 | D5 | D4 | D3 | D2 | D1 | D0 |
|---|---|---|---|---|---|---|---|
| CP2D7 | CP2D6 | CP2D5 | CP2D4 | CP2D3 | CP2D2 | CP2D1 | CP2D0 |

D15 COMMAND PARAMETER DATA BIT 15
D14 COMMAND PARAMETER DATA BIT 14
D13 COMMAND PARAMETER DATA BIT 13
D12 COMMAND PARAMETER DATA BIT 12
D11 COMMAND PARAMETER DATA BIT 11
D10 COMMAND PARAMETER DATA BIT 10
D9 COMMAND PARAMETER DATA BIT 9
D8 COMMAND PARAMETER DATA BIT 8
D7 COMMAND PARAMETER DATA BIT 7
D6 COMMAND PARAMETER DATA BIT 6
D5 COMMAND PARAMETER DATA BIT 5
D4 COMMAND PARAMETER DATA BIT 4
D3 COMMAND PARAMETER DATA BIT 3
D2 COMMAND PARAMETER DATA BIT 2
D1 COMMAND PARAMETER DATA BIT 1
D0 COMMAND PARAMETER DATA BIT 0

NORMAL ON LINE: BITS D11-D0 HOLD THE STATE RAM DATA WHEN THE 68000 IS WRITING TO THE STATE RAM.

TEST MODE A: BITS D3-D0 HOLD THE LOWER DATA WHEN THE 68000 IS WRITING TO THE TRUNK TRANSITION FIFO. BITS D7-D0 HOLD THE LOWER DATA WHEN THE 68000 IS WRITING TO THE SPECIAL-B FIFO.

CHIP TEST: BITS D15-D6 AND BITS D5-D0 HOLD THE VALUES WHICH WILL BE LOADED TO THE PROCESSING CHANNEL AND PROCESSING-48 COUNTERS RESPECTIVELY. THIS CAN ONLY OCCUR WHEN THE TEST PIN IS PULLED HIGH AND SYNC IS APPLIED.

Fig.26

| BACKPLANE I/O DELAY REGISTER (READ WRITE) | | | | | | | |
|---|---|---|---|---|---|---|---|
| D15 | D14 | D13 | D12 | D11 | D10 | D9 | D8 |
| XXXXXX | XXXXXX | XXXXXX | XXXXXX | XXXXXX | XXXXXX | XXXXXX | XXXXXX |

| D7 | D6 | D5 | D4 | D3 | D2 | D1 | D0 |
|---|---|---|---|---|---|---|---|
| XXXXXX | XXXXXX | XXXXXX | XXXXXX | XXXXXX | DLY2 | DLY1 | DLY0 |

- D15 NOT USED
- D14 NOT USED
- D13 NOT USED
- D12 NOT USED
- D11 NOT USED
- D10 NOT USED
- D9 NOT USED
- D8 NOT USED
- D7 NOT USED
- D6 NOT USED
- D5 NOT USED
- D4 NOT USED
- D3 NOT USED
- D2 DELAY DATA BIT 2
- D1 DELAY DATA BIT 1
- D0 DELAY DATA BIT 0

THIS REGISTER PROGRAMS THE NUMBER OF TIME-SLOTS THE OUTBOUND SIGNALING IS DELAYED. THE MAXIMUM DELAY IS EIGHT TIME SLOTS ($2^3 = 8$) THIS REGISTER IS WRITTEN ONLY DURING INITIALIZATION AND THE VALUE THAT IS WRITTEN IS DEPENDANT ON SYSTEM TIMING.

Fig. 27

| | | | ERROR CONTROL REGISTER (READ/WRITE) | | | | |
|---|---|---|---|---|---|---|---|
| D15 | D14 | D13 | D12 | D11 | D10 | D9 | D8 |
| GINPER | MINPER | GOTPER | MOTPER | GSRPER | MSRPER | GABPER | MABPER |

| D7 | D6 | D5 | D4 | D3 | D2 | D1 | D0 |
|---|---|---|---|---|---|---|---|
| GSBPER | MSBPER | GABAER | MABAER | GSBAER | MSBAER | GSYCER | MSYCER |

- D15 GENERATE INPUT RAM PARITY ERRORS
- D14 MASK INPUT RAM PARITY ERRORS
- D13 GENERATE OUTPUT RAM PARITY ERRORS
- D12 MASK OUTPUT RAM PARITY ERRORS
- D11 GENERATE STATE RAM PARITY ERRORS
- D10 MASK STATE RAM PARITY ERRORS
- D9 GENERATE AB-FIFO PARITY ERRORS
- D8 MASK AB-FIFO PARITY ERRORS
- D7 GENERATE SB-FIFO PARITY ERRORS
- D6 MASK SB-FIFO PARITY ERRORS
- D5 GENERATE AB-ROM ACCESS ERRORS
- D4 MASK AB-ROM ACCESS ERRORS
- D3 GENERATE SB-ROM ACCESS ERRORS
- D2 MASK SB-ROM ACCESS ERRORS
- D1 GENERATE SYNC ERRORS
- D0 MASK SYNC ERRORS

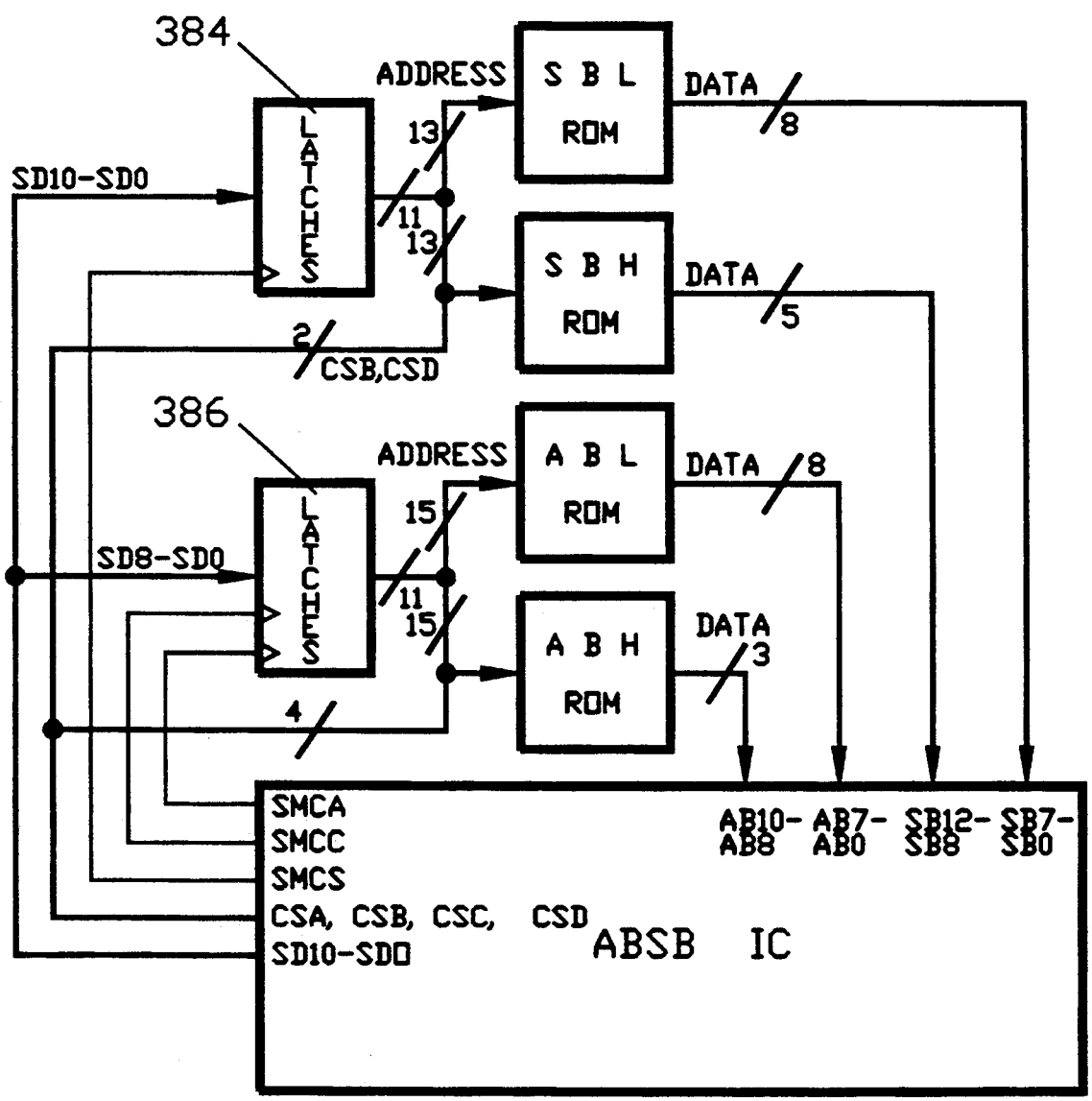

Fig.29

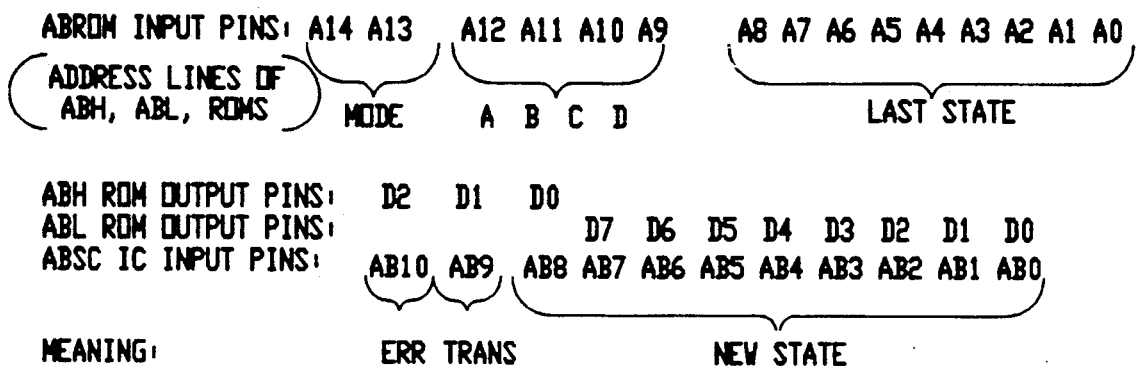

NOTES: MODE IS PROVIDED BY THE ABSB IC FROM CHANNEL CONFIGURATION DATA.
ABCD = MOST RECENT SIGNALING BITS OF A CHANNEL (CAN BE ABAB).
ERR = 1 IMPLIES ACCESS ERROR; ADDRESS APPLIED TO ROM IS NOT VALID
TRANS = 1 IMPLIES SIGNALING TRANSITION FOUND; AB8-AB5 IS WRITTEN AS
ABCD TRUNK TRANSITION FIFO WITHIN THE ABSB IC.

DEFINITION OF TRANSITION: MUST HAVE RECEIVED CONSTANT NEW SIGNALING STATE
FOR 9 MS.

IF MODE = A AND PRESENT STATE OF CHANNEL IS 1:
SUPPOSE CHANNEL RECEIVES (A = 01000000)
                                    ↑
                          TRANSITION OCCURS HERE;
                          EACH DIGIT = 1.5 MS.

ROM CONTENTS

| Condition | Contents |
|---|---|
| IF A14,A13 = 00 (MODE = A ONLY) | STATE OF A-SIGNALING |
| IF A14,A13 = 01 (MODE = AB ONLY) | STATE OF AB-SIGNALING |
| IF A14,A13 = 10 (MODE = ABAB ONLY) | STATE OF ABAB SIGNALING |
| IF A14,A13 = 11 (MODE = ABCD ONLY) | STATE OF ABCD SIGNALING |

Fig. 30

BOXES SHOW:  
CORRESPOND TO ABH AND  
ABL ROM ADDRESS PINS:  
    N / N / N N N / N N N N  
    A8 / A7 / A6 A5 A4 / A3 A2 A1 A0

ARROWS SHOW:  
CORRESPOND TO ABH AND  
ABL ROM ADDRESS PINS:  
    N N N N  
    A12 A11 A10 A9

OUTPUT IS THE N/N/NNN/NNNN VALUE IN THE BOX POINTED TO

COMING FROM: D0 OF ABH & D7-D0 OF ABL

---

* A12 A11 A10 A9 ARE DEFINED AS THE A B C D SIGNALING BIT INPUTS RESPECTIVELY WHERE THE B AND D BITS ARE DON'T CARES SINCE A (AND C) BITS ARE ONLY CHECKED WHEN 'MODE = A'. THUS THE B AND D BITS ON THE STATE DIAGRAM ARE LABELED X.
* A8 IS DEFINED AS THE PRESENT A-SIGNALING STATE.
* A7 IS DEFINED AS THE MOST RECENTLY RECEIVED A-SIGNALING BIT.
* A6 A5 A4 ARE DEFINED AS THE COUNT FOR THE MOST RECENTLY RECEIVED A SIGNALING BITS.
* A3 A2 A1 A0 ARE DON'T CARES BUT ARE SHOWN AS 0000 ON THE STATE DIAGRAM.

---

IF COMMENT SAYS 'WITH FLAG = 1', THEN D1 OF ABH ROM = 1  
    ELSE D1 OF ABH ROM = 0

IF AN ADDRESS IS NOT SHOWN ON THE ENTIRE STATE DIAGRAM,  
    THEN D2 OF ABH ROM = 1 (ERROR)  
    D1-D0 OF ABH & D7-D0 OF ABL = 0

EXAMPLE 1) A8 / A7 / A6 A5 A4 / A3 A2 A1 A0 = 0 / 1 / 0 0 0 / X X X X  
    IMPLIES COUNT EQUALS TO ONE FOR THE MOST RECENTLY RECEIVED A-SIGNALING BITS.

EXAMPLE 2) A8 / A7 / A6 A5 A4 / A3 A2 A1 A0 = 0 / 1 / 0 0 1 / X X X X  
    IMPLIES COUNT EQUALS TO TWO FOR THE MOST RECENTLY RECEIVED A-SIGNALING BITS.

EXAMPLE 3) A8 / A7 / A6 A5 A4 / A3 A2 A1 A0 = 0 / 1 / 1 0 0 / X X X X  
    IMPLIES COUNT EQUALS TO FIVE FOR THE MOST RECENTLY RECEIVED A-SIGNALING BITS. IF THE NEXT A-SIGNALING BITS ARE 1 X 0 X, THEN THE NEXT STATE WILL BE:

1/0/000/XXXX  
                                                        WITH FLAG = 1

Fig.32

BOXES SHOWN:
CORRESPOND TO ABH AND
ABL ROM ADDRESS PINS:

N N / N N / N N N

A8 A7 / A6 A5 / A4 A3 A2

ARROWS SHOW:
CORRESPOND TO ABH AND
ABL ROM ADDRESS PINS:

N N N N

A12 A11 A10 A9

OUTPUT IS THE N N / N N / N N N VALUE IN THE BOX POINTED TO

COMING FROM: D0 OF ABH & D7-D0 OF ABL

* A12 A11 A10 A9 ARE DEFINED AS THE A B C D SIGNALING BIT INPUTS RESPECTIVELY, WHERE C D = A B, THUS A B C D = A B A B
* A8 A7 ARE DEFINED AS THE PRESENT A B SIGNALING STATE.
* A6 A5 ARE DEFINED AS THE MOST RECENTLY RECEIVED A B SIGNALING BITS.
* A4 A3 A2 ARE DEFINED AS THE COUNT FOR THE MOST RECENTLY RECEIVED A B SIGNALING BITS.
* A1 A0 ARE DON'T CARES AND ARE NOT SHOWN ON THE STATE DIAGRAMS.

IF COMMENT SAYS 'WITH FLAG'; THEN D1 OF ABH ROM = 1
ELSE D1 OF ABH ROM = 0

IF AN ADDRESS IS NOT SHOWN ON THE ENTIRE STATE DIAGRAM;
THEN D2 OF ABH ROM = 1 (ERROR)
D1-D0 OF ABH & D7-D0 OF ABL = 0

EXAMPLE 1) A8 A7 / A6 A5 / A4 A3 A2 = 0 0 / 0 1 / 0 0 0 IMPLIES COUNT EQUALS TO ONE FOR THE MOST RECENTLY RECEIVED A B SIGNALING BITS.

EXAMPLE 2) A8 A7 / A6 A5 / A4 A3 A2 = 0 0 / 0 1 / 0 1 0 IMPLIES COUNT EQUALS TO THREE FOR THE MOST RECENTLY RECEIVED A B SIGNALING BITS.

EXAMPLE 3) A8 A7 / A6 A5 A4 A3 A2 = 0 0 / 0 1 / 1 0 0 IMPLIES COUNT EQUALS TO FIVE FOR THE MOST RECENTLY RECEIVED A B SIGNALING BITS. IF THE NEXT A B SIGNALING BITS ARE 0 1 0 0, THEN THE NEXT STATE WILL BE:

| 01/00/000 |

WITH FLAG = 1

Fig.37

BOXES SHOW:  W X Y Z / N N N N / N
CORRESPOND TO ABH AND
ABL ROM ADDRESS PINS: A8 A7 A6 A5 / A4 A3 A2 A1 / A0

ARROWS SHOW:  N N N N
CORRESPOND TO ABH AND
ABL ROM ADDRESS PINS: A12 A11 A10 A9

OUTPUT IS THE  W X Y Z / N N N N / N,  VALUE IN THE BOX POINTED TO

COMMING FROM:  D0 OF ABH & D7-D0 OF ABL

---

* A12 A11 A10 A9 ARE DEFINED AS THE A B C D SIGNALING BIT INPUTS RESPECTIVELY.
* A8 A7 A6 A5 ARE DEFINED AS THE PRESENT A B C D SIGNALING STATE.
* A4 A3 A2 A1 ARE DEFINED AS THE MOST RECENTLY RECEIVED A B C D SIGNALING BITS.
* A0 IS DEFINED AS THE COUNT FOR THE MOST RECENTLY RECEIVED A B C D SIGNALING BITS.

---

IF COMMENT SAYS 'WITH FLAG', THEN D1 OF ABH ROM = 1
                          ELSE D1 OF ABH ROM = 0

IF AN ADDRESS IS NOT SHOWN ON THE ENTIRE STATE DIAGRAM,
              THEN D2 OF ABH ROM = 1 (ERROR)
                   D1-D0 OF ABH & D7-D0 OF ABL = 0

EXAMPLE 1) A8 A7 A6 A5 / A4 A3 A2 A1 / A0 = 0 0 0 0 / 0 0 1 1 / 0
           IMPLIES COUNT EQUALS TO ONE FOR THE MOST RECENTLY RECEIVED
           A B C D SIGNALING BITS.

EXAMPLE 2) A8 A7 A6 A5 / A4 A3 A2 A1 / A0 = 1 0 0 0 / 0 1 1 1 / 1
           IMPLIES COUNT EQUALS TO TWO FOR THE MOST RECENTLY RECEIVED
           A B C D SIGNALING BITS. IF THE NEXT A B C D SIGNALING BITS
           ARE 0 1 1 1, THEN THE NEXT STATE WILL BE:

| 0111/0111/0 |
                                  WITH FLAG = 1

Fig. 41

EXPLANATION OF ABAB SIGNALING (9-STATE SLC96):

ABAB SIGNALING DIFFERS FROM THE OTHER SIGNALING SCHEMES BECAUSE IT ALLOWS SIGNALING BITS TO ALTERNATE. BELOW ARE THE NINE STATES WHICH DEFINE ABAB SIGNALING. A SIGNALING TRANSITION OCCOURS IF ANY OF THESE STATES ARE PRESENT FOR 9MS AND DIFFER FROM THE PREVIOUSLY ESTABLISHED STATE.

| 1) 0001<br>0100 | 2) 1011<br>1110 | 3) 0010<br>1000 | 4) 0111<br>1101 | 5) 0011<br>0110<br>1001<br>1100 |
|---|---|---|---|---|
| A=0 STATIC<br>B=ALTERNATING | A=1 STATIC<br>B=ALTERNATING | B=0 STATIC<br>A=ALTERNATING | B=1 STATIC<br>A=ALTERNATING | A=ALTERNATING<br>B=ALTERNATING |

| 6) 0000 | 7) 0101 | 8) 1010 | 9) 1111 |
|---|---|---|---|
| A=0 STATIC<br>B=0 STATIC | A=0 STATIC<br>B=1 STATIC | A=1 STATIC<br>B=0 STATIC | A=1 STATIC<br>B=1 STATIC |

EXPLANATION OF 'MODE = ABAB' STATE DIAGRAM:

BOXES SHOW: W X Y Z / N N N N / N
CORRESPOND TO ABH AND
ABL ROM ADDRESS PINS: A8 A7 A6 A5 / A4 A3 A2 A1 / A0

ARROWS SHOW: N N N N
CORRESPOND TO ABH AND
ABL ROM ADDRESS PINS: A12 A11 A10 A9

OUTPUT IS THE $\underbrace{W\ X\ Y\ Z\ /\ N\ N\ N\ N\ /\ N}$ VALUE IN THE BOX POINTED TO

COMING FROM: D0 OF ABH & D7-D0 OF ABL

---

* A12 A11 A10 A9 ARE DEFINED AS THE A B C D SIGNALING BIT INPUTS RESPECTIVLEY, WHERE C D = A B, THUS A B C D = A B A B.
* A8 A7 A6 A5 ARE DEFINED AS THE PRESENT A B A B SIGNALING STATE.
* A4 A3 A2 A1 ARE DEFINED AS THE MOST RECENTLY RECEIVED A B A B SIGNALING BITS.
* A0 IS DEFINED AS THE COUNT FOR THE MOST RECENTLY RECEIVED A B A B SIGNALING BITS.

Fig. 45

```
SB ROM INPUT PINS: A12 A11 A10 A9 A8 A7 A6 A5 A4 A3 A2 A1 A0
(ADDRESS LINES OF)   B1 B2        LAST STATE
 SBH, SBL ROMS

SBH ROM OUTPUT PINS:                    D7  D6  D5  D4  D3  D2  D1  D0
SBL ROM OUTPUT PINS: SB12 SB11 SB10 SB9 SB8 SB7 SB6 SB5 SB4 SB3 SB2 SB1 SB0
ABSB IC INPUT PINS:

MEANING:             ERR  MSG                  NEW STATE
```

NOTES: B1 B2 = MOST RECENT TWO B-SIGNALING BITS OF A CHANNEL.
ERR = 1 IMPLIES ACCESS ERROR: ADDRESS APPLIED TO ROM IS NOT VALID.
MSG =1 IMPLIES MESSAGE FOUND; SB10-SB3 IS WRITTEN AS
     MSG7-MSG0 TO SPECIAL-B FIFO WITHIN THE ABSB IC.

Fig. 46

EXPLANATION OF A SPECIAL-B MESSAGE

WHEN A SPECIAL-B MESSAGE IS SENT AT THE TRANSMIT END AN APPROPRIATE HEADER OR SYNC, AS IT IS CALLED IN THE FOLLOWING FIGURES, MUST BE SENT FIRST. THERE ARE FIVE VALID HEADERS WHICH THE ABSB CORE CAN DECODE AND THEY ARE LISTED BELOW.

1) 11100
2) 11101
3) 11001
4) 10101
5) 01101

FOLLOWED BY THE HEADER TWENTY-FOUR INFORMATION BITS ARE SENT REPRESENTING AN EIGHT BIT MESSAGE, WITH EACH BIT REPEATED THREE TIMES. THIS EIGHT BIT MESSAGE IS TRANSMITTED STARTING WITH THE LEAST AND ENDING WITH THE MOST SIGIFICANT BITS.

FOLLOWED BY THE TWENTY-FOUR INFORMATION BITS IS THE TRAILER WHICH CONSISTS OF THREE CONSECUTIVE ZEROS.

EXAMPLE)

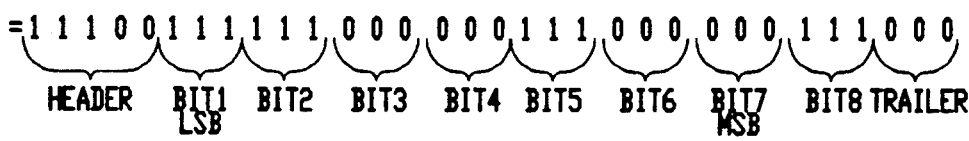

RECEIVED MESSAGE
WITHIN SPECIAL-B = 10010011
MESSAGE FIFO

MULTICHANNEL TELEPHONIC SWITCHING NETWORK WITH DIFFERENT SIGNALING FORMATS AND CROSS CONNECT/PBX TREATMENT SELECTABLE FOR EACH CHANNEL

BACKGROUND OF THE INVENTION

The invention relates to a telephonic switching network for selectively switching time division multiplexed digital channels carrying pulse code modulated voice data and signaling data.

In a conventional telephonic switching network, a central control processor is made aware of several events needed by it to correctly establish, maintain and terminate communications between two parties, or two transceiving units, of the network. For instance, the central control processor must be informed when one unit picks up the handset of his phone, or otherwise comes on line, in order to return a dial tone. The central control processor must be informed of the digits that the calling party selects in order to determine the identity of the called unit. The control processor must then communicate with other switching nodes in the telephone network in order to establish a path between the calling party and the called party. Thereafter, the control processor must be aware of when one party has hung up, so as to reallocate resources.

This information is conveyed from each phone or each switching node, by way of signaling data in the form of signaling bits which are embedded in and accompany the digitized PCM voice information or data. Somewhere in the network switch the signaling data must be read and analyzed. This analysis can be done either with hardware, software, or a combination of both. Regardless of the form of this analysis, the results must be passed on to the central control processor in order for a response to be generated to each signaling data event.

There are two possible modes of operation of a network switch: cross connect (without signaling data analysis) and PBX (with signaling data analysis). In the cross connect mode of operation of a network switch known, the control processor of the switch is not responsible for formulating or interpreting the signaling data of each channel. Instead, the central control processor is responsible for only establishing connections between channels, while the signaling data is passed without alteration. Other circuitry in the network ensures the integrity of signaling data information as it passes from an incoming channel to an outgoing channel.

In the PBX mode of operation, on the other hand, the signaling data of incoming channels is terminated at the switch and interpreted by the central control processor of the switch, and then new signaling data is formulated by the control process and embedded in the PCM data of outgoing channels. Disadvantageously, in known multichannel network switches, channels can only operate in the cross-connect mode or the signaling data analysis mode, but not selectively in either mode on a channel-by-channel basis. Such network switches therefore suffer from structural inflexibility and inefficiency in the handling of signaling information.

The information conveyed to and from the switch via the signaling data can be in a variety of formats. The format employed on a given channel is a function of the type of telephone equipment which is connected to the switch on associated port. In known multichannel switches, the central control processor is not provided with hardware of sufficient versatility to be able to completely identify transitions of incoming channel signaling states of each signaling format selectable on a channel-by-channel basis. This results in considerable inflexibility for signaling data handling and require substantial processing power for signaling data operations.

Signaling data must be handled in virtually every network switch. In some of the known network switches, special circuits or hardware devices have been employed for identifying transitions of the signaling state of incoming channels which serves only a relatively few channels, and the results of signaling data analysis from each such special circuit are then conveyed to a central control processor. Servicing of several hundreds of channels in known network switches requires the presence of at least one or both of several different, special hardware devices and several processing entities. However, each of the special hardware devices employed are restricted to only one type of signaling information for which they are designed, or they do not completely identify signaling transitions. Circuit and processor entities must be replicated multiple times to service a set of several limited channels resulting in a large number of distributed components and high cost. Cross connect features are not found in such general switching products.

SUMMARY OF THE INVENTION

It is, therefore, the principal object of the present invention to provide a telephonic switching network or network switch which overcomes the aforementioned limitations of known networks to achieve enhanced versatility and reduced complexity and cost. Preferably, channels are selectable for operation in either cross connect mode or PBX mode of operation on a channel by channel basis, and signaling data analysis is performed on the PBX selected channels according to different signaling formats preselected on a channel by channel basis. Transitions of incoming channel signaling states are completely identified to a microprocessor. A plurality of relatively lower order microprocessors are used for signaling data analysis of channels associated therewith to convey messages representative thereof directly to a central control processor for control of switching of the channels associated with all of the relatively lower order microprocessors. Each of these lower order microprocessors and associated hardware elements can serve a large number of channels, resulting in a cost efficient implementation.

Specifically, it is an object to provide a telephonic switching network with means for receiving a plurality of time division multiplexed input channels of incoming information from selected nodes of the network in the form of PCM voice data with embedded signaling data, means for preselecting individual ones of said plurality of channels for alternative cross connect treatment and signaling data analysis treatment on a channel-by-channel basis, and a controllable incoming switching circuit with signaling data passing capability for passing the incoming information of each channel for transmission to other selected nodes in the network selectively with and without embedded signaling data depending upon the preselection of each incoming channel for alternative cross connect treatment and signaling data analysis treatment, respectively.

It is also an objective of the invention to provide a telephonic switching network with means for receiving on a plurality of time division multiplex channels of selected nodes of the network data including PCM voice data and signaling data on a plurality of channels in a plurality of different preselected signaling formats, means including a multichannel incoming switching circuit connected with the receiving means for switching the data of said plurality of channels to other nodes of the network, and means for controlling the multichannel incoming switching circuit to switch said plurality of channels in accordance with the signaling data in said plurality of different signaling formats including a multichannel signaling control circuit responsive to said signaling data and to a state machine associated therewith for analysis of said signaling data on each channel according to the signaling format preselected for each of said channels.

Further, an objective of the invention is to provide a telephonic switching network with a plurality of multichannel incoming switching circuits, a central control processor for controlling the plurality of multichannel switching circuits to switch a selected plurality of incoming time division multiplex channels of PCM voice data to a plurality of selected outgoing channels, means including a plurality of relatively lower order processors respectively associated with said plurality of multichannel switching circuits for analyzing signaling data embedded in the voice data from the incoming channels, means for transmitting messages representative of said analysis of the signaling data from each of the plurality of relatively lower order processors directly to the central control processor, said central control processor being responsive to said transmitted messages for controlling the switching of the channels of all of said plurality of switching circuits.

In the preferred embodiment, a simple combinational logic circuit is employed for signaling bit passing on circuit cards which connect directly to twenty-four channel DS1 lines. A 768 channel switching complex is provided with the ability to pass signaling bits undisturbed by any gain or attenuation elements which affect voice data, and a state machine based circuit with a microprocessor is provided for signaling bit analysis on all 768 channels. With this structure, the need is eliminated for processing entities for groups smaller than 768 channels to be involved with the signaling bit analysis process to substantially reduce the number of components required for this function.

Preferably, the multichannel switch is embodied in a single integrated circuit together with means for performing both PBX and crossconnect functions selectively on a channel-by-channel basis. The use of a state machine for signaling bit analysis gives the flexibility needed to handle signaling information from a variety of different types of channel termination equipment, with the type selectable on a channel-by-channel basis. The ability to handle all major commercial signaling formats is preferably provided together with any proprietary formats which may be preferred.

State machine based signaling control hardware isolates new events from the large set of received signaling information. This enables the use of a relatively lower order processor, since the hardware needs to be periodically scanned for indications of only new events. Excessive processing power, which would otherwise be needed to view the entire set of received signaling information to determine new events, is eliminated. Alternatively, use of state machines for this purpose enables use of more cost effective processing elements and an increase in speed of the call set-up and tear-down process.

BRIEF DESCRIPTION OF THE DRAWINGS

The foregoing objects, features and advantages will be discussed in detail and other objects, features and advantages will be made apparent from the following detailed description of the preferred embodiment which is given with reference to the several figures of the drawing, in which:

FIG. 2A is a functional block diagram of the incoming interface circuit; block and the incoming multichannel signal analyzing switching circuit of FIG. 1;

FIG. 2B is a functional block diagram of the outgoing interface circuit block and the outgoing multichannel signal generating switching circuit of FIG. 1;

FIG. 3A is a functional block diagram of a telephonic network in which the preferred embodiment of the invention is employed;

FIGS. 5A, 5B and 5C illustrate the contents of signaling control registers for individual channel control of signaling as described with reference to the incoming interface circuit 36 of FIG. 2A;

FIGS. 6A, 6B and 6C illustrate the contents of registers for individual channel control of signaling with reference to the outgoing interface circuit 54 of FIG. 2B;

FIG. 8 illustrates the 24 frame organization of the serial input to the ABSB IC containing time division multiplexed signaling bits from each of the 772 channels;

FIG. 9 illustrates the organization of the data structures state RAM of FIG. 7;

FIG. 10 illustrates the data structures of each of the five types of state RAM elements for the state RAM of FIG. 7;

FIG. 11 shows the four bit commands understood by the ABSB IC of FIG. 7.

FIG. 12 shows the command execution sequence of the microprocessor of FIG. 7;

FIG. 13 illustrates the organization of the state RAM of FIG. 7;

FIG. 14 depicts the timing attributes of a preferred RAM used in the ABSB IC of FIG. 7;

FIG. 15 shows the register bit definitions for the status register (read only) of FIG. 7;

FIG. 16 shows the register bit definitions for the response register (read only) of FIG. 7;

FIG. 17 shows the register bit definitions for the trunk FIFO register #1 (read only) of FIG. 7;

FIG. 18 shows the register bit definitions for the trunk FIFO register #2 (read only) of FIG. 7;

FIG. 19 shows the register bit definitions for the trunk FIFO count register (read only) of FIG. 7;

FIG. 20 shows the register bit definitions for the special-B FIFO register #1 (read only) of FIG. 7;

FIG. 21 shows the register bit definitions for the special-B FIFO register #2 (read only) of FIG. 7;

FIG. 22 shows the register bit definitions for the special-B FIFO count register (read only) of FIG. 7;

FIG. 23 shows the register bit definitions for the command register (read/write) of FIG. 7;

FIG. 24 shows the register bit definitions for the command parameter register, #1 (read/write) of FIG. 7;

FIG. 25 shows the register bit definitions for the command parameter register #2 (read/write) of FIG. 7;

FIG. 26 shows the register bit definitions for the backplane I/O delay register (read/write) of FIG. 7;

FIG. 27 shows the register bit definitions for the error control register (read/write) of FIG. 7;

FIG. 28 shows the register bit definitions for the ABSB IC support ROM configuration;

FIG. 29 shows the register bit definitions for ABH, ABL ROM connections;

FIG. 30 shows the register bit definitions for the overview of A-only signaling debounce;

FIG. 32 shows the register bit definitions for the overview of AB signaling debounce;

FIG. 37 shows the register bit definitions for the overview of ABCD (ESF) signaling debounce;

FIG. 41 shows the register bit definitions for the overview of ABAB (SLC96) signaling debounce;

FIG. 45 shows the register bit definitions for SBH, SBL ROM connections;

FIG. 46 shows the register bit definitions for the overview of special-B signaling decoding;

DETAILED DESCRIPTION

Figure 1:
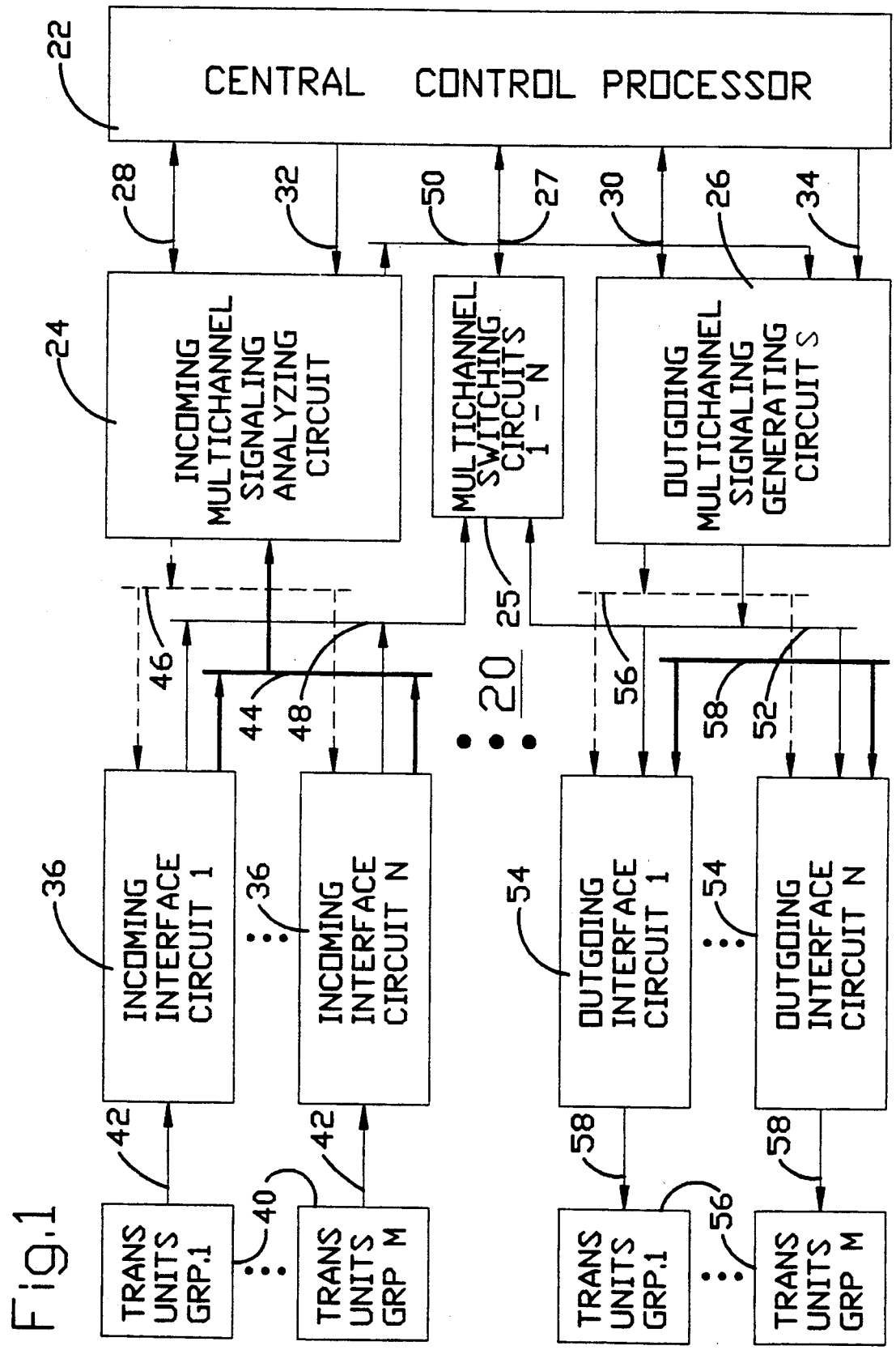
FIG. 1 is a functional block diagram of the preferred embodiment of a telephonic switching network constructed in accordance with the present invention.

Referring now to FIG. 1 of the drawing, the preferred embodiment of the telephonic network 20 is seen to include a central control processor 22 for controlling the switching operations of one through N, substantially identical, incoming, multichannel, switching circuits 25. The central control processor 22 also receives inputs in the form of messages from an incoming multichannel signaling analysis circuit 24 via an interface 28. Based on these messages, the central control processor 22 specifies the connections between channels in the switching circuits 25 via an interface 27. The central control processor 22 also directs the outbound signaling of outgoing channels by providing messages to an outgoing multichannel signaling generating circuit 26 via an interface 30.

Each of incoming multichannel signal analyzing circuits 24 has associated therewith a plurality substantially identical incoming interface circuits 36 connected with a first group of transceiving units 40 via incoming DS1 lines 42. The DS1 lines 42 each carry twenty-four time division multiplex channels of pulse code modulated, or PCM voice data and associated signaling data. Likewise, each of the outgoing multichannel signaling generating circuits 26 has associated therewith a plurality of substantially identical outgoing interface circuits 54 connected with a second group of transceiving units 56 via outgoing DS1 lines 58.

Preferably, there are thirty-two transceiving units groups for each incoming multichannel signaling analyzing circuit 24 and multichannel switching circuit 25, and thus each signaling and switching circuit is capable of handling a total of 768 incoming channels. The central control processor 22, in turn, is capable of handling all the channels associated with four or sixteen incoming multichannel signaling analyzing circuits 24 for a total of 3072 or 12,288 incoming channels. Each of the incoming interface circuits 36 interfaces with its associated incoming multichannel signaling analyzing circuit 24 by an incoming signaling information bus 44 and an incoming message bus 46. They are connected to the multichannel switching circuit by an incoming voice, a communication bus 48 with imbedded signaling. These busses 44, 46 and 48 each comprise only a pair of wires on which the information conveyed thereby is time division multiplexed.

The incoming interface circuits 36 receive messages from the associated incoming signaling circuits 24 on the message bus 46. These messages indicate which, if any, of the channels have been preselected for cross connect treatment (in which signaling data does not terminate at the incoming signaling circuit 24 and is not analyzed) or for PBX, or signaling analysis, treatment (in which the signaling data does terminate at the incoming signaling circuit 24 and is analyzed).

The incoming signaling data which is embedded in the PCM voice signal at input 42, is reproduced alone on an incoming signaling information TDM network link, or incoming signaling information bus, 44 by the associated incoming interface circuit 36 and provided to the incoming multichannel signaling analyzing circuit 24. This signaling on incoming signaling information bus 44 is used by the incoming signaling analyzing circuit 24 to monitor the channels preselected for cross connect and is analyzed to determine outgoing signaling for channels preselected for PBX treatment.

The incoming voice communication TDM network link, or bus, 48 carries PCM encoded voice data received at each of the incoming interface circuits 36. In the case of cross connect treatment, the incoming PCM voice data is outputted onto the incoming voice communication bus 48 with the embedded signaling data intact. When a channel is selected for cross connect treatment, the embedded signaling data is passed to the associated switching circuit 25 and treated thereby the same as the PCM voice data. The incoming voice data with embedded signaling data from all channels is passed to the switching circuit 25. The switching circuit 25 passes the PCM voice data with embedded signaling data from the selected incoming interface channels 36 via an outgoing voice TDM network link, or bus, 52 carrying voice and message information to each of a 1 - M of substantially identical, outgoing interface circuits 54. Each of the outgoing interface circuits 54 has an input connected to an outgoing message TDM network link, or bus, 56 for receiving messages from the outgoing multichannel signaling generating circuit 26. Each of the outgoing interface circuits 54 also has an output connected to an outgoing signaling data bus 58. Outgoing signaling data is provided to each of the associated outgoing interface circuits 54 on the outgoing signaling data TDM network link, or bus, 58.

Each of the outgoing interface circuits 54 provide PCM voice data with embedded signaling data to their associated time dimension multiplexing DS1 line 58. In the case of channels selected for cross connect treatment, the embedded signaling data is the same signaling data originally received at the incoming interface circuit 36, while in the case of channels selected for PBX, or signaling analysis treatment, the signaling data is generated by the outgoing, multichannel, signal generating circuit 26. It should be appreciated that the DS1 interface circuits of both the incoming interface circuits 36 and the outgoing interface circuits 54 contains a single device functioning as a transmitter of data on the twenty-four channel DS1 line from the lines 58 and as a receiver of data for those same twenty-four channels arriving at the switch on DS1 lines 42.

Referring to FIG. 2A, the details of the incoming interface circuits 36 and the incoming multichannel signal analyzing circuit 24 of FIG. 1 are shown as implemented in the preferred embodiment. Each of the incoming interface circuits 36 is preferably implemented on a separate twenty-four channel DS1 Port Card. The twenty-four channels of PCM encoded voice with embedded signals carried on incoming DS1 line as is applied to an input of an interface and buffering circuit 60 which connects the incoming digital signals to appropriate levels for processing, buffers them in a series of registers and extracts a separate copy of signaling data from the PCM with embedded signaling and provides it on line 61. The voice data with embedded signaling voice data is applied to an input 62 of a signal controller 64. The extracted signaling data on line 61 is provided to an input 66 of the signal controller 64 and also to the incoming signaling data TDM network link 44. PCM voice encoded data with embedded signaling data is generated on an output 68 by the signal controller 64 which, in turn, is connected to incoming voice communication bus 48.

Signaling information on DS1 lines is conveyed as the least significant bit of the eight bit PCM data of each channel in specially designated frames of the superframe structure defined for the DS1 interface. The multichannel switching circuit, or switch 25 likewise utilizes the same superframe structure with specially designated signaling frames, though, there is no inherent phase synchronization between the incoming DS1 line superframe structure and that of the switch 25. The interface and buffering circuit 60 will provide an alignment of at least the frames, if not necessarily the superframes, of the asynchronously arriving DS1 line and the switch 25. The voice with imbedded signaling data output 62 of the interface and buffering circuit 60 will therefore not necessarily contain signaling data in the least significant bit of PCM data in those frames which the superframe structure of the switch has designated signaling frames. The signaling buffer portion of the interface and buffering circuit 60, however, will copy the signaling data received from the incoming DS1 line 42, store it, and convey the signaling data on line 61 and input 66 aligned to the switch 25 in accordance with the superframe structure of the switch 25 which designates the specific signaling frames. The synchronization function provided by the interface and buffering circuit 60 is necessary for all signaling operations within the switch 25 and, with the method employed in this invention, provides for a range of potential signaling treatments.

A relatively low processing power processor, or low power processor 70, preferably a type 68008 made by Motorola, in response to incoming messages at 46 applied to input 72, indicates to the interface circuit 60 the type of DS1 line present via an output 74 of the low power processor 70. A selection is made between two types commercial DS1 service: D4 and ESF. Selection of DS1 line type is an initialization function, dictating the standard types of interface and signaling buffering functions required.

The low power processor 70 selects for each one of the twenty-four incoming channels one of three types of treatments or modes: DS1 crossconnect treatment, DS0 crossconnect treatment, or PBX (also referred to as signaling analysis) treatment. As indicated, the interface and buffering circuit 60 has two types of twenty-four channel time-division multiplexed outputs: channel voice with imbedded signaling data on input 62 and a copy of the channel signaling data on line 61 and input 66. Inputs 62 and 66 of the signal control circuit 64 from the incoming interface and buffering circuit 60 will be identical for channels in any of the three modes of signaling treatment and are a function of the type of DS1 line service employed at 42.

Output 68 from the DSI port card 36 is formulated using the signaling control circuit 64 which is programmed specifically for each channel via a signal 76 from central control processor 22 as a function of the desired type of signaling treatment.

Channels programmed via signals at 76 for operation with either DS1 crossconnect mode or PBX mode will be treated identically by the signaling control circuit 64. The signaling control circuit 64 will allow the voice data with imbedded signaling received at input 62 to pass undisturbed to output 68. As previously noted, the imbedded signaling data at input 62 will not necessarily be aligned to the superframe structure designated specific signaling frames of the switch. However, the other elements of the switch 25 will treat the data output on 68 distinctly for DS1 crossconnect mode and PBX mode.

Channels programmed via a signal at 76 to operate with DS0 crossconnect treatment will force the least significant bit of PCM data received input 62 to be replaced with signaling data from input 66 during those frames designated by the superframe structure of the switch as signaling frames on output 68. In this fashion, PCM data for each channel selected for DS0 crossconnect treatment has signaling bits present in their LSB during the defined signaling frames. Accordingly, the switch need only connect the signaling bits to an output channel for transmission without further interaction for signaling operations.

Independent of the mode of signaling treatment, output 66 from the interface and buffering circuit 60 contains signaling data for each channel aligned to the superframe structure of the switch. For channels designated for PBX treatment, this data will be terminated by and analyzed at the 768 channel signaling control circuit 80 of the incoming multichannel signaling analyzing circuit 24. For channels designated for DS0 or DS1 crossconnect treatment, this signaling data, while not required for determination of the appropriate outgoing signaling for that channel, will also be available for monitoring the active/idle status of each channel by the 768 channel signaling control circuit 80.

The selection of signaling treatment is an initialization function. Once set, there are no further communications required between the incoming interface circuits 36 and any other system elements regarding signaling operations except to alter the desired mode of signaling treatment. The minimization of messages being passed between the switch and the interface circuit advantageously results in reduced time delay to set up and tear down connections.

Still referring to FIG. 2A, each of the incoming multichannel signal analyzing circuits 24 is preferably in the form of a 768 channel switching and signaling control circuit including a medium processing power, or medium power, processor 78, and a 768 channel signaling control circuit 80 with one or more associated hardware state machines such as a commercial signaling state machine 82 (capable of handling the structural termination types A-only, AB, SLE96 and ESF) and a proprietary signaling state machine 84 (capable of handling any special signaling formats). Preferably, the switching circuit 25 is comprised of a 768 channel switching element with signaling data passing capability, or switching element, 86. The medium power processor 78 preferably comprises a type 68000, made by Motorola. The preferred embodiment of the signaling control unit 80, the state machines 82 and 84 and the switching element 86, are shown in and will be described in detail with reference to FIGS. 3, 4A, 4B and 4C, 5A, 5B and 5C and 6, and other drawing figures, but their general function will be first described briefly here.

The signaling control circuit 80 receives the incoming signaling data at an input 88 and compares and analyzes the signaling data in accordance with one or more signaling formats according to algorithms stored in hardware state machines 82 for different commercial signaling formats and according to an algorithm stored in proprietary state machine 84. Those state machines are preferably embodied in the form of EPROMs, such as any standard 32K × 8 EPROM made by TI, Intel or others.

In keeping with one aspect of the invention, the EPROMs are preferably mounted for releasable connection to facilitate changing of the algorithms associated with the different signaling formats. A proprietary signaling format of proprietary state machine 84 can be provided on some channels, while other channels employing standard signaling formats are selected on a channel by channel basis or are given cross connect treatment.

The medium power processor 78 receives messages on message bus 28 from the central control computer 22 including messages concerning which signaling format is to be used with which channel for channels selected for signaling data analysis treatment. The medium power processor 78 conveys this information in the form of selection signals on line 90 to the signaling control circuit 80. In turn, the signaling control circuit 80 conveys on line 90 to the medium power processor 78 signals which indicate which of the channels have had a change in status of the signaling data. This status change information is interpreted by the medium power processor 78 and thereafter is conveyed to the central control processor 22. The central control processor 22 responds by making specific channel connections in the line switching circuit 86 via a line 32 applied to an input 92. The switching circuit 86 responds to the switching control signals at input 92 to appropriately control the switching circuits 25 to switch the incoming communication from bus 48 which is applied to the outgoing interface circuits 54 via network link 52. Channel data output applied to 96 from the switching element 86 comes from 768 channel node of the incoming interface circuits 36 or from other 768 channel switching nodes.

Referring now to FIG. 2B, the outgoing interface circuit 54 and outgoing multichannel signal generating switching circuits 26 are seen to be comprised of elements which parallel those of the incoming interface circuits 36 and the incoming multichannel signal analyzing circuit 24, respectively. In fact, much of the corresponding incoming and outgoing circuits can be implemented partly, or completely, in the same semicustomized circuits.

In any event, the incoming channel data appearing on the channel data bus 52 from a channel data output of the multichannel switching circuit 86, FIG. 2A, is received as outgoing channel data. The switching circuit 102 has an input 104 for receiving the switching control signals from the outgoing switching control signal output 27 of the central control processor 22, FIG. 1. Based on these switching control signals at an input 100, the switching circuit 102 appropriately switches outgoing channel data at input 100 through to its output 106 and the outgoing channel data bus 52.

In the case of cross connect channels, the signaling data switched through the outgoing switching circuit 102 is embedded in the voice data. For a channel selected for signaling bit analysis, on the other hand, the signaling data has been removed and is separately generated by an outgoing multichannel signaling control circuit 108. The control circuit 108 preferably capable of handling the same 768 channels corresponding to the incoming channel signaling control circuit.

The outgoing channel signaling control circuit 108 produces outgoing signaling data on its output 110 according to different signaling format data specified by a medium processing power processor, or medium power processor, 116 such as a 68000 made by Motorola, or the like. Selection of the signaling format for each channel by the signaling control circuit 108 is based on messages from an output 109 of the medium processing power processor, or medium power processor, 116. Preferably, the processor 116 is the same processor as processor 78, FIG. 2A. The medium power processor receives input messages from the central control processor 22 at a message output 30. It transmits messages to the outgoing message bus 56 in addition to conveying messages to the signaling control circuit 108 on a separate output 109. Likewise, the outgoing signaling data on output 110 feeds the outgoing signaling data bus 58.

Each of the outgoing interface circuits 54 is seen to include a low processing power, or low power, processor 118, a signal controller 120 and an interface and buffering circuit 122 corresponding to the processor 70, a signaling controller 64 and an interface and buffering circuit 60, respectively. Each of the signaling controllers 120 has an input 124 coupled to the channel data bus 52, and each of the lower power processors 118 has an input 126 coupled to the message bus 56. Each of the signaling controllers also has an input 128 connected to the signaling data bus 58. Preferably, processors 36 and 54 are embodied in the same device performing all the different functions.

Depending upon a message received at input 126, the low power processor transmits control signals on outputs 130 and 132 to the signal controller 120 and the interface and buffering circuit 122, respectively, to cause a channel to be treated as a cross connect channel or a signaling data analysis, or PBX, channel. If a channel is selected for cross connect treatment, the channel data will already contain signaling data, and this composite signal will be passed by the signal controller 120 to the interface and buffering circuit 122 without insertion of signaling data from the signaling control circuit 108. The interface and buffering circuit 122 receives a command from processor output 132 which causes it to pass the composite signal to the outgoing DS1 line 58 without buffering.

If, on the other hand, a channel has been selected for PBX treatment, a command signal on processor output 130 causes the signal controller 120 to embed the signaling data at input 128 into the outgoing channel data at input 124 to form a composite signal on its output 134 containing embedded signaling data generated by the signaling control circuit 108. The signaling control circuit causes the appropriate signaling data in exactly the format and content specified by the outgoing signaling circuit 26 to be sent to the DS1 line 58. The specification by command signal on bus 56 from the outgoing signaling control circuit 26 to the outgoing signaling circuits 54 to indicate the desired mode of signaling treatment for each channel is done only at initialization. No other messages are required between these entities for control of signaling operations except to change the mode of treatment.

Still referring to FIGS. 2A and 2B, in the preferred embodiment there is a hierarchy of board-level components with each DS1 port card 36 and 54 being at the lowest level and serving only twenty-four channels. Then switching and signaling control nodes are in the middle and serve 768 channels, while the central control processor is at the highest level serving all channels from a plurality of the switching and signaling control nodes. In other architectures, the channelization at each level in the hierarchy may be different and, in fact, the number of levels in the hierarchy could vary, but the structure is believed to represent the optimum levels in the hierarchy and the optimum channelization for each level in the hierarchy. The signal handling components have been located advantageously. The signal control circuit 64 is at the lowest level card or block in the hierarchy. The function is simply to embed signaling information into the voice data on a channel-by-channel basis or to avoid disturbing the voice bits. As noted above, the specification of "replace or don't replace" need happen only during switch initialization and represents the only interaction that the processors 70 need have in the signaling handling process. This enables use of very low processing power microprocessor on the most prevalent type of card in the entire system. This is enabled because there is a separate path on buses 44 and 58 for connecting signaling information between the port cards to the 768 channel signaling control circuits 80. It should also be noted that the voice or voice with embedded signaling data flows directly into a switching node.

Likewise, at the 768 channel switching and signaling control node, or module, 24 the signaling information for all 768 channels is analyzed by the signaling control circuit 108. New events are identified by this circuit in cooperation with the state machines 112 and 114 and are passed to the processor 116 for further action. This processor 116 will communicate only this necessary information to the central control processor to obtain the appropriate signaling response and switching activity and, thus, only use of a medium power processor is all that is required in the middle of the hierarchy of modules or cards. Because the signaling control circuit 108 is supported by state machines 112 and 114 a wide variety of signaling formats—any number of different channel types (and their associated signaling formats) can be employed concurrently in the switch and all will be serviced by the same circuitry.

When data is returned to the appropriate port card 54 for outbound transmission, again a small logic circuit is employed to choose the source of signaling bits which are to be transmitted to the outbound DS1 line from the 768 channel signaling control circuit 108 or from the voice with embedded signaling provided at switch 108. Again, this selection is needed to be made on a channel-by-channel basis only once at power-up time, and processor 118 must take for signaling handling.

The messages passed to the central control processor 22 are from the N processors 78 or 116 of the switching and signaling control modules 24 and 26, respectively, such that there are no intermediaries in these communications and faster operation is obtained. Specifically, there is no need for the central control processor to interact (after the power-up sequence) with the 32×N DS1 port cards 36 and 54 for the purpose of signaling handling.

For pure PBX operations there would be no need to have the signal control circuits 64 and 120 on the port cards 36 and 54 and no need for signaling passing capability through the switching elements 86 and 102. For pure cross-connect operation, there would be no need for the signaling control circuits 80 and 108 and then associated state machines 82, 84, 112 and 114 and located together with the switching elements 86 and 102. By providing this optimized circuitry, the switching network has the flexibility and to function not only as a PBX system or only as a cross-connect system, but to simultaneously function as both types of systems. This flexibility has been achieved with minimal circuit complexity and cost through means of the hierarchial structure described above.

Referring now to FIG. 3A, the preferred embodiment of the invention is preferably employed to interface with various elements of a network subsystem 229 which, in turn, is connected with an SBX bus 230 of a control subsystem and the elements of a network termination subsystem. Communication of the elements of the subsystem with a central controller and a central memory (not shown) of the telephonic switching system is through means of an SBX bus 230. The control subsystem of bus 230 is preferably a 68020/68030 microprocessor based multiprocessor, distributed processing system which is capable of either simplex or duplex operation. The network subsystem 229 consists of a system clock, or CLK, 232 and four interactive switching/control modes (only two shown), each comprising a single stage, nonblocking, 772 channel time slot interchanger, or TSI, 234. Most of these channels (768) are broken down into thirty-two groups of twenty-four channels for interface over high speed serial interfaces known as network links to transition circuits of the network termination subsystem 227. A network shelf controller, or NSC, circuit 236 connected to the TSI 234 has a 68000 microprocessor with two Mbytes of DRAM to provide processing capability of signaling activity on the 768 channels of each switch mode. Within the NSC circuit 236, the 768 channel parallel time division multiplexing, or TDM, bus to and from the TSI circuit (not shown) is multiplexed into a thirty-two, twenty-four channel 3.088 MHz serial links, or network links, to and from the network termination subsystem 227. The TSI circuit 234 provides access to higher level processing for itself and the NSC circuit 236 via an SBX interface (not shown) to an SBX circuit residing on the control subsystem secondary bus 230. The central controller memory and central controller are loaded via this secondary bus 230.

The circuits which form the network termination subsystem 227 include a DAS, or digital audio source, 237 for providing tones, announcements and messages; a basic rate line, or BRL, circuit 238; a primary rate interface circuit, or PRI, 240; one or more DS1 port circuits 242; and a digital signal processing, or DSP, circuit 244. The BRL circuit 238 provides system access to agent and supervisor consoles, while the PRI circuit 240 provides termination of the twenty-fourth 64 Kbit channel of the TI digital trunk and also has all the features of a DS1 port circuit 242. The DS1 port circuit 242 provides digital T1 trunk access into the system. PCM channels are appropriately formatted and delivered to a DS1 transmit link 246. Incoming information from the DS1 link 246 are recovered, buffered and delivered to network links for access to the network. The digital signal processing circuit 244 provides three separate TMS 320C25 digital signal processor based circuits for accessing eight of the twenty-four system channels that the DSP circuit 244 accesses over its link into the network. The DSP 244 processor receives functions for MF and DTMF signals and can also be used for tone metering functions in system diagnostics. As seen, advantageously a linkage 247 of only four wires connects each of the elements of the network termination subsystem 227 with the NSC 236 for a differential system or only two wires in a nondifferential system.

Figure 3B:
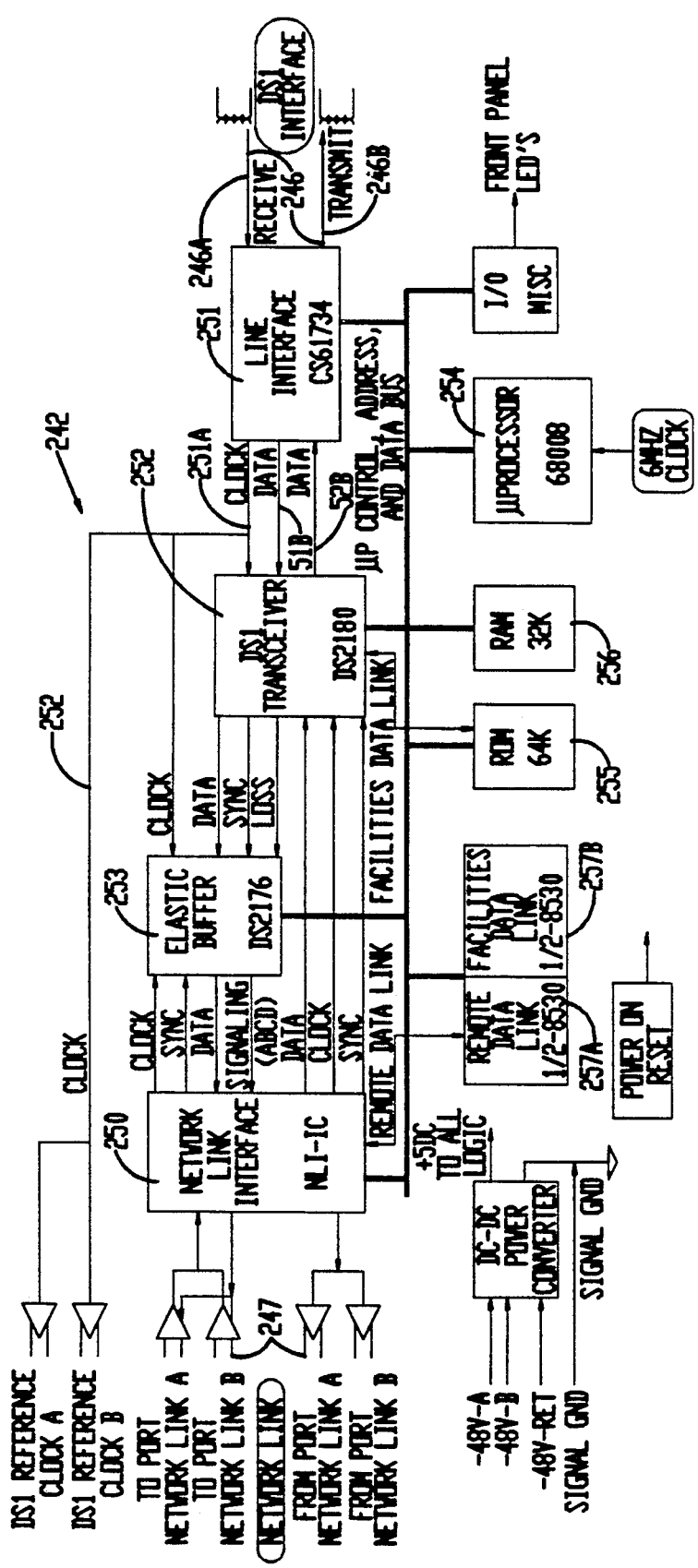
FIG. 3B is a detailed schematic diagram of a preferred form of the digital port circuit of FIG. 3A incoming interface circuit 36 of FIG. 2A and outgoing interface circuit 54 of FIG. 2B.

The wire linkages 247 are made possible by virtue of use of network link interface, or NLI, integrated circuits 250 of FIG. 3B. The single NLI circuit 250 is capable of operation in different modes depending upon the application in which it is employed. One or more NLI circuits 250, operating as network termination units 250, are contained in each of the network termination subsystem elements 237, 238, 240, 242 and 244 of FIG. 3A, and multiple NLI circuits, operating as control units 250 are contained in the NSC circuit 236 of the subsystem 229. Preferably, the NLI circuit 250 is implemented in a large scale integrated circuit package having preselected input and output terminals, although separate integrated circuit packages for each of the different modes of operation could be provided in lieu of a single package.

Figure 31:
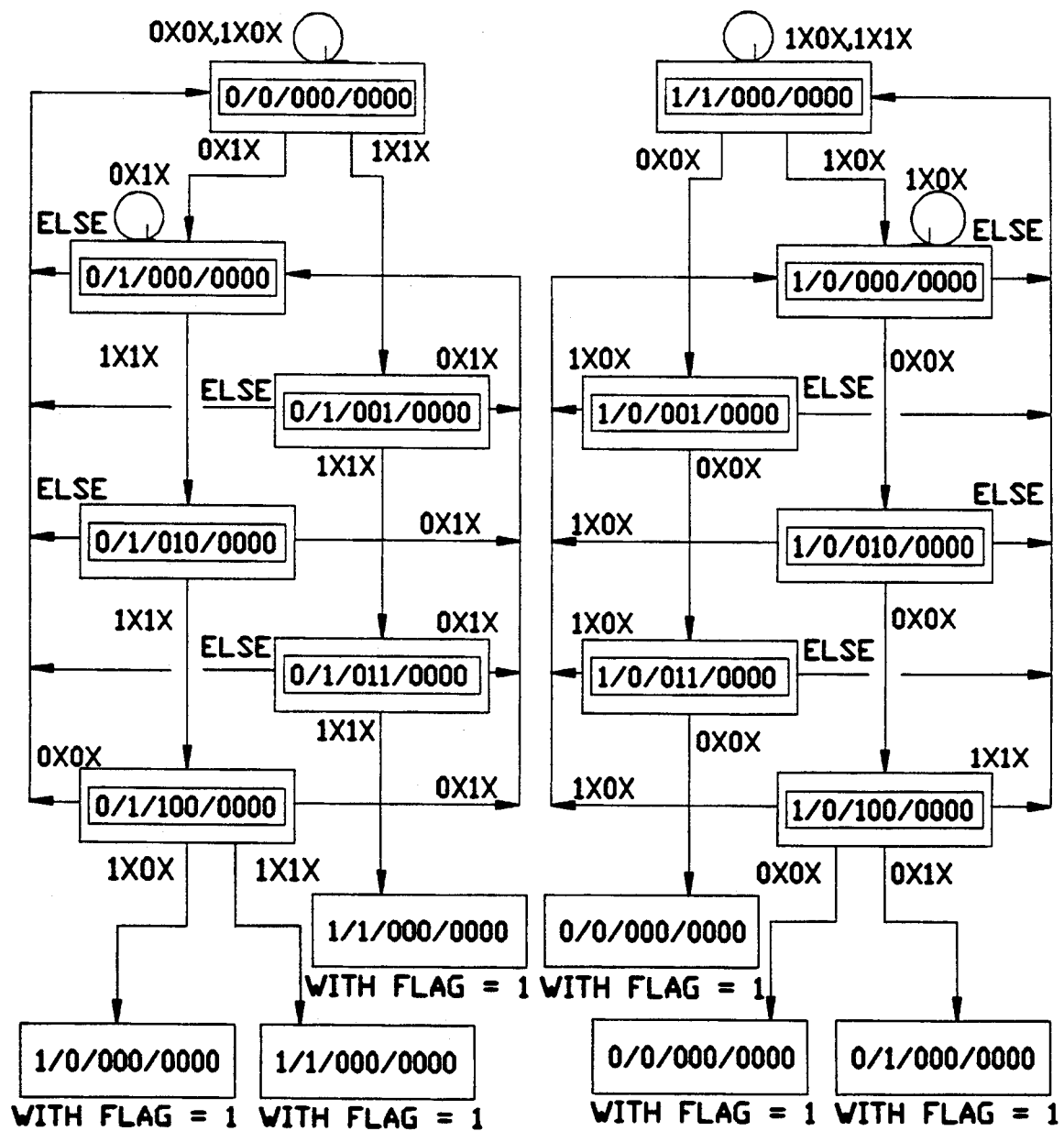
FIG. 31 shows the register bit definitions for the state diagram of A-only signaling debounce.
Figure 33:
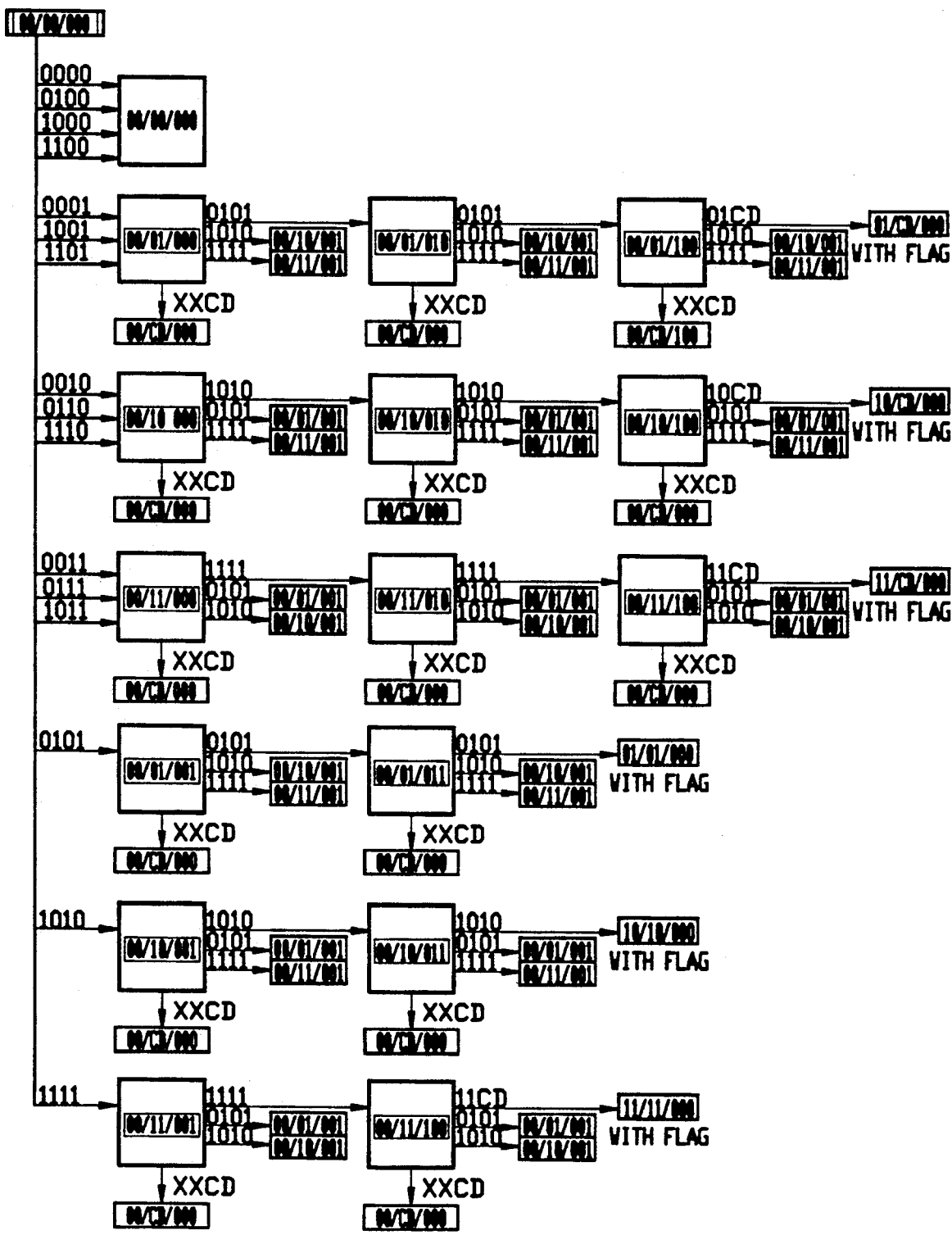
FIG. 33 shows the register bit definitions for the state diagram of AB signaling debounce - branch 00.
Figure 34:
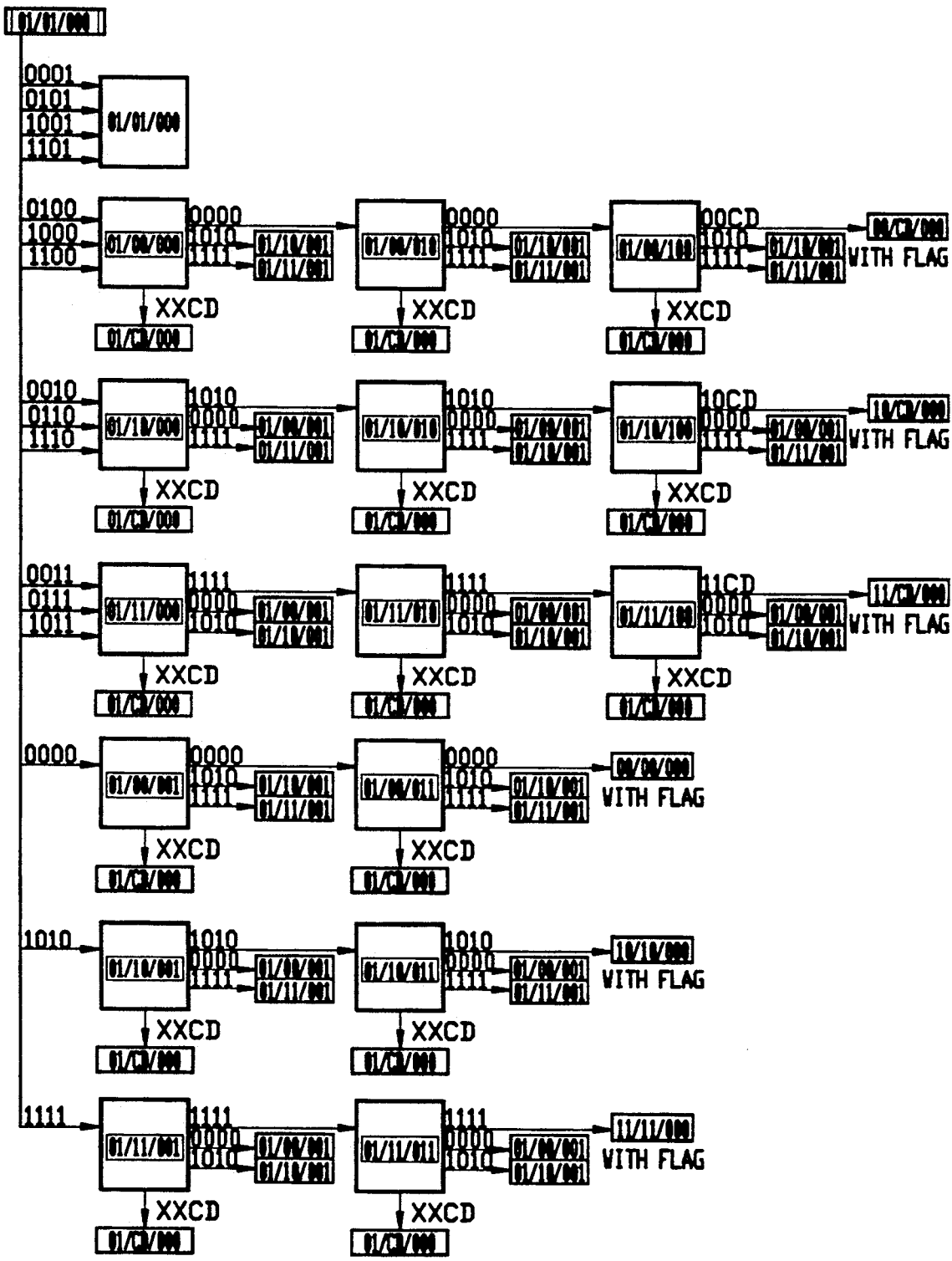
FIG. 34 shows the register bit definitions for the state diagram of AB signaling debounce - branch 01.
Figure 35:
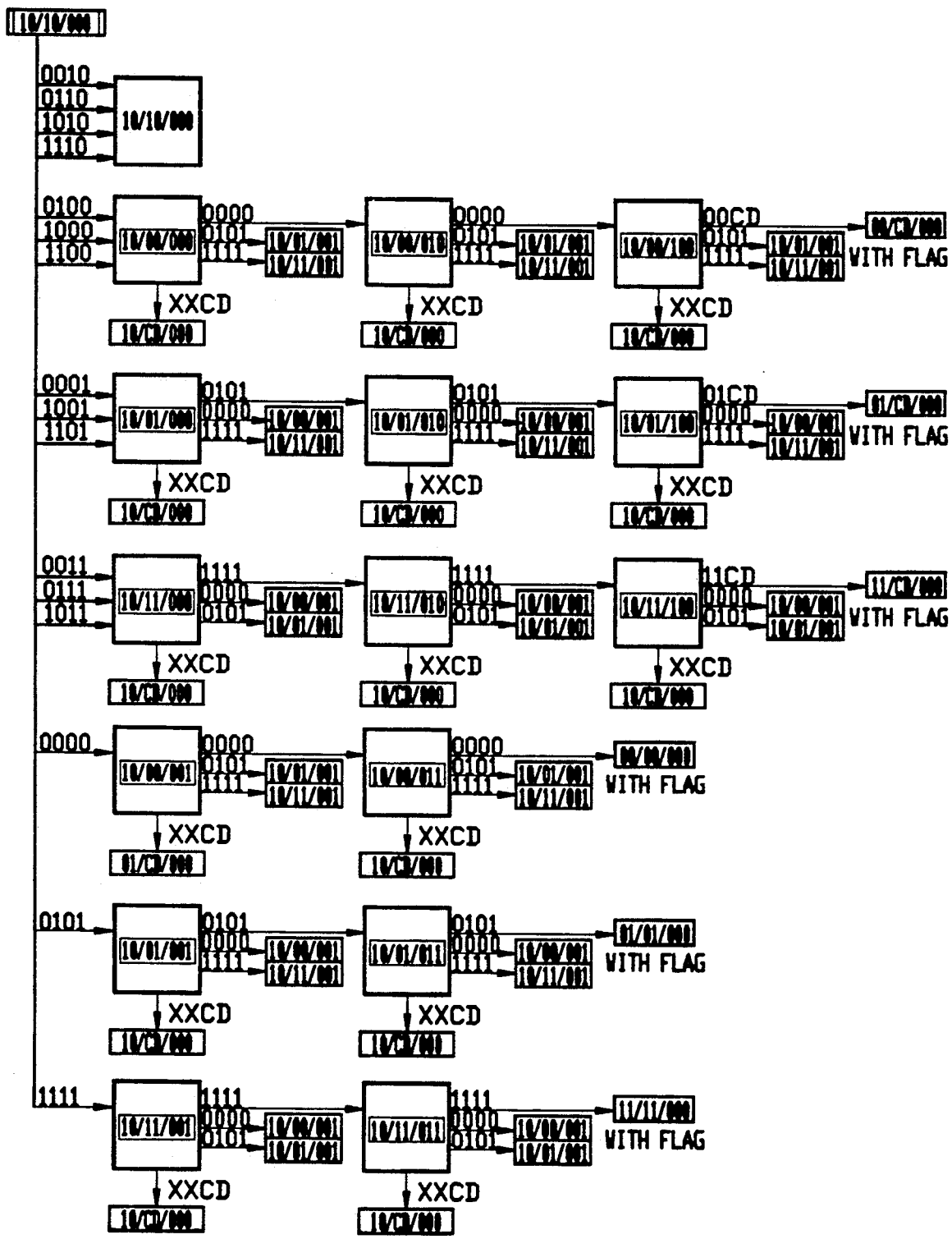
FIG. 35 shows the register bit definitions for the state diagram of AB signaling debounce - branch 10.
Figure 36:
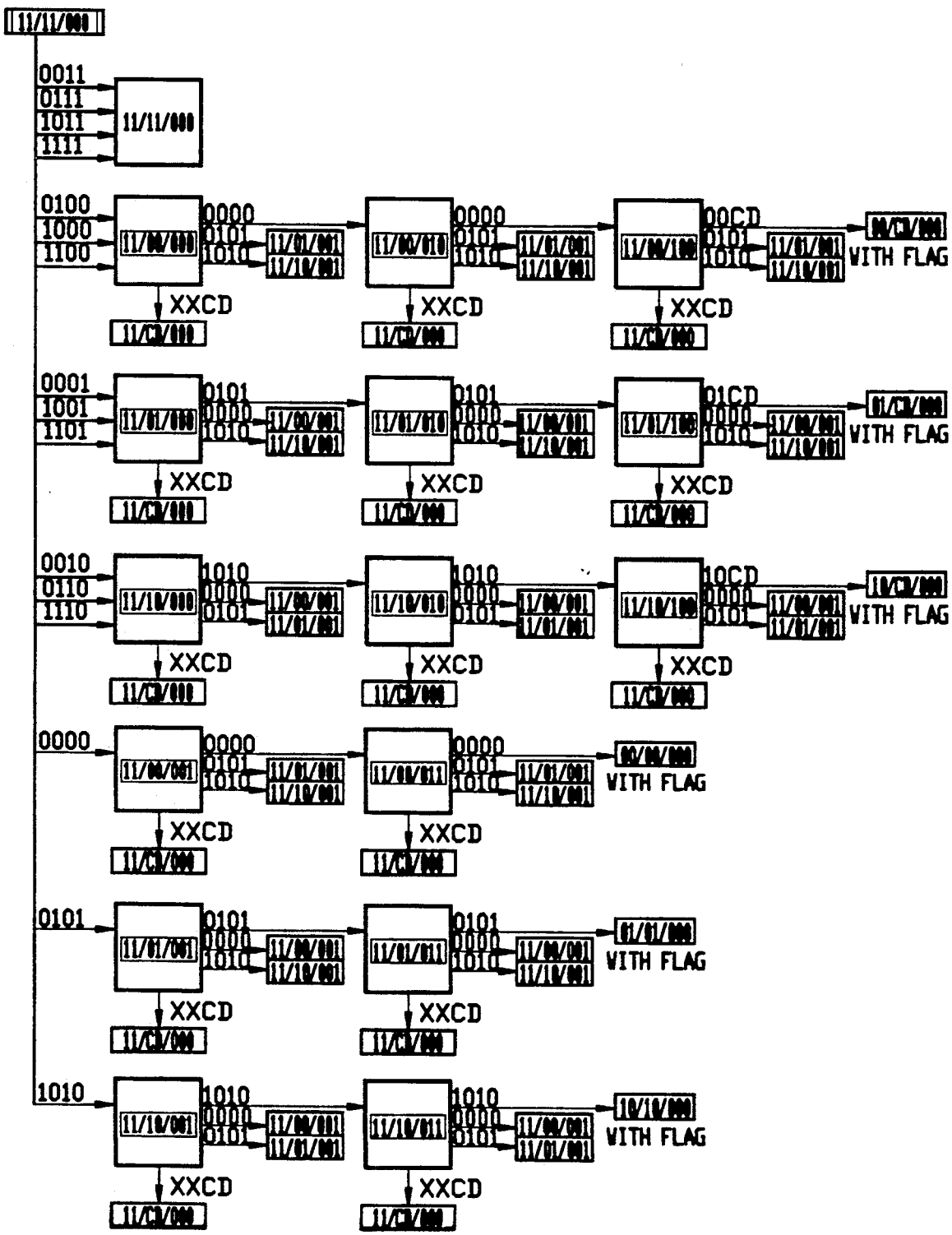
FIG. 36 shows the register bit definitions for the state diagram of AB signaling debounce - branch 11.
Figure 38:
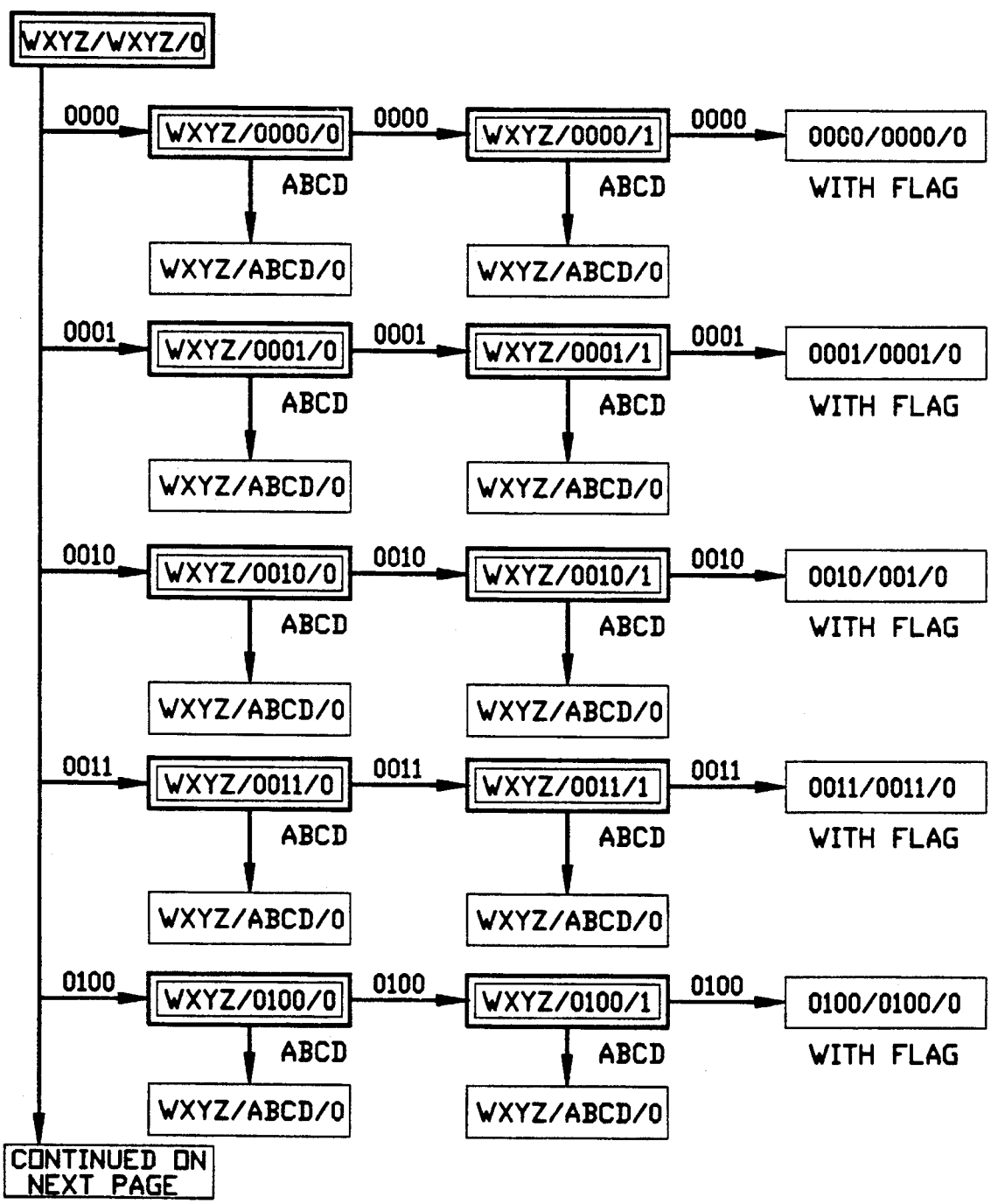
FIG. 38 shows the register bit definitions for the state diagram of ABCD (ESF) signaling debounce.
Figure 39:
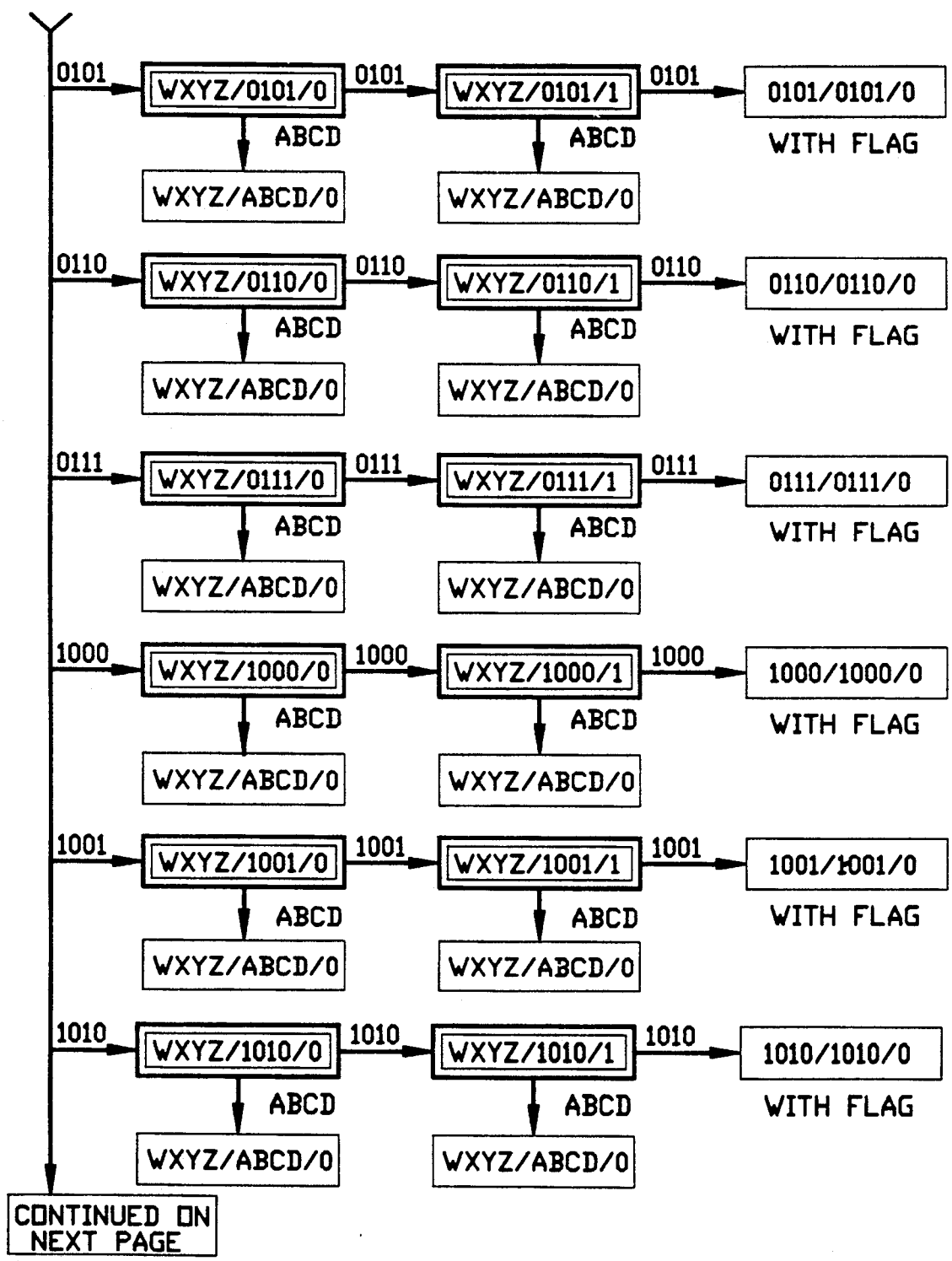
FIG. 39 shows the register bit definitions for the state diagram of ABCD (ESF) signaling debounce.
Figure 40:
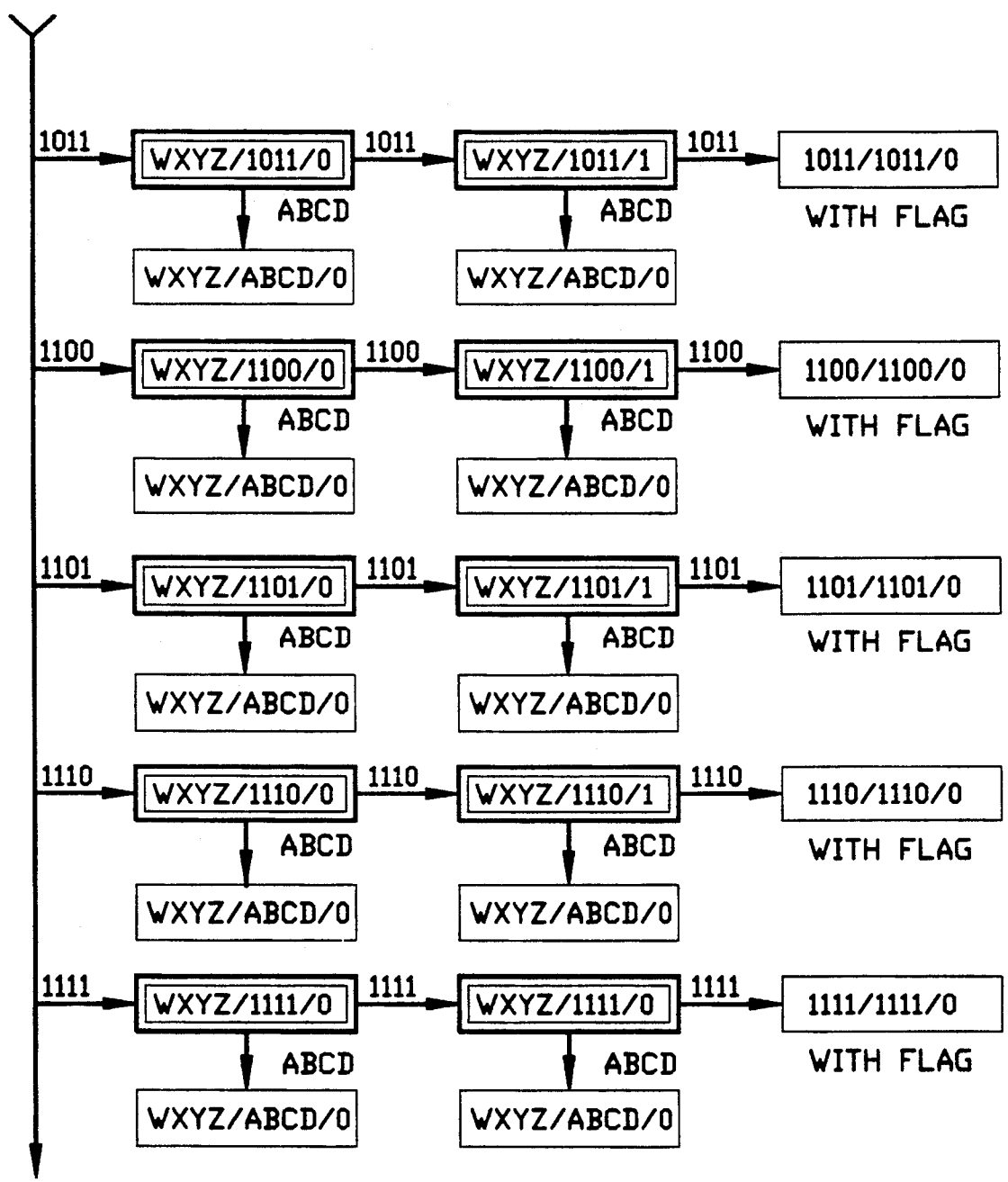
FIG. 40 shows the register bit definitions for the state diagram of ABCD (ESF) signaling debounce.
Figure 42:
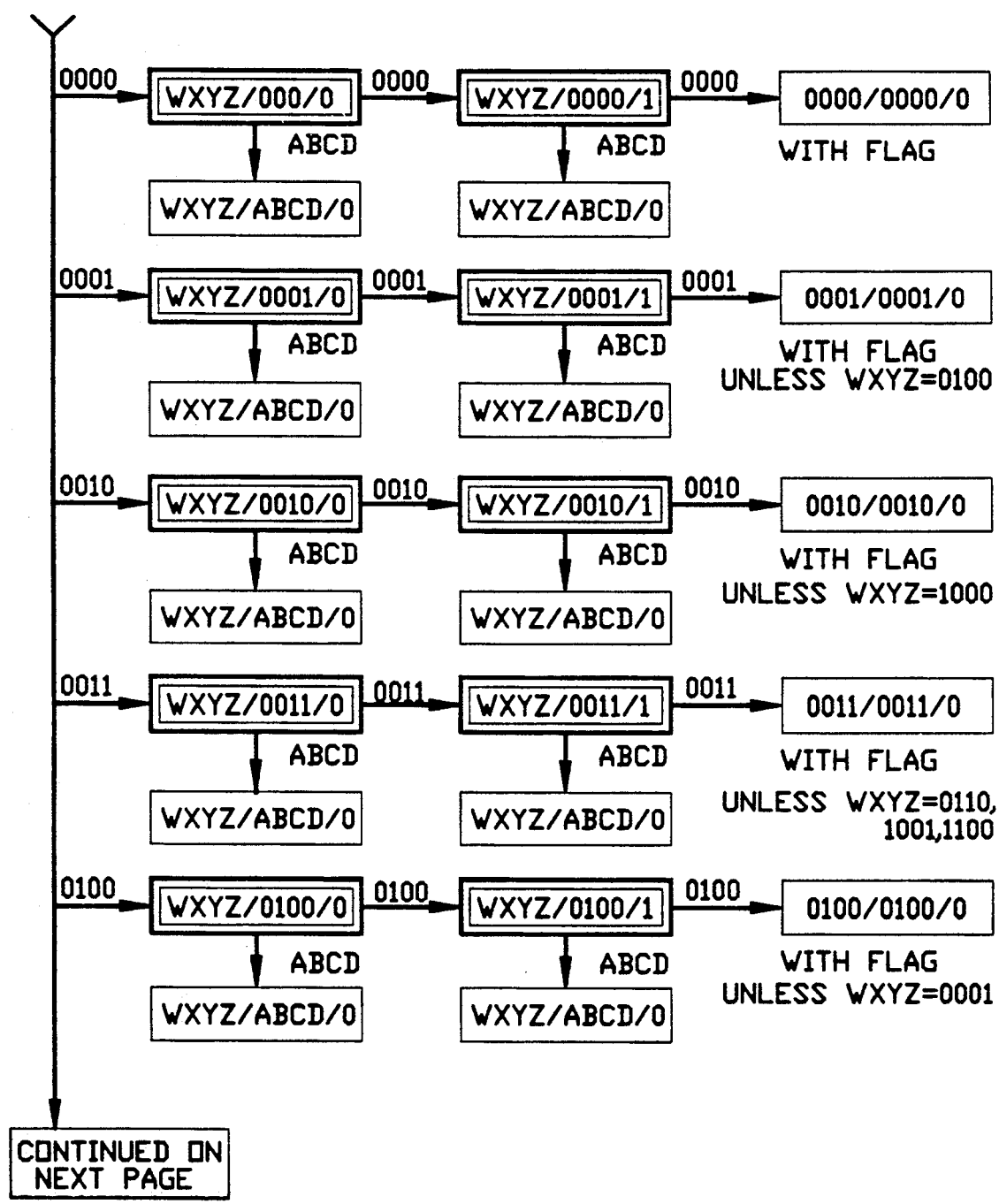
FIG. 42 shows the register bit definitions for the state diagram of ABAB (SLC96) signaling debounce.
Figure 43:
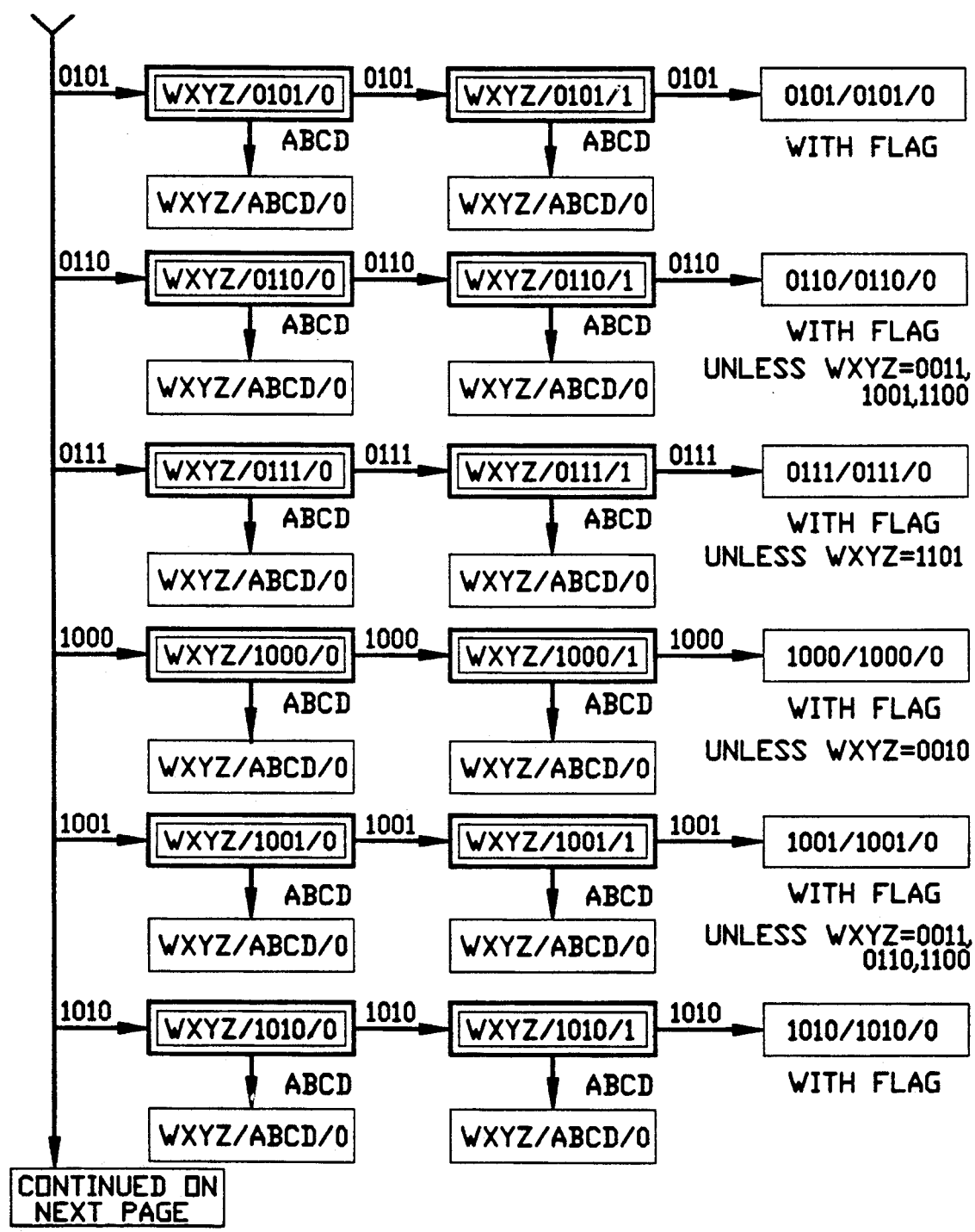
FIG. 43 shows the register bit definitions for the state diagram of ABAB (SLC96) signaling debounce.
Figure 44:
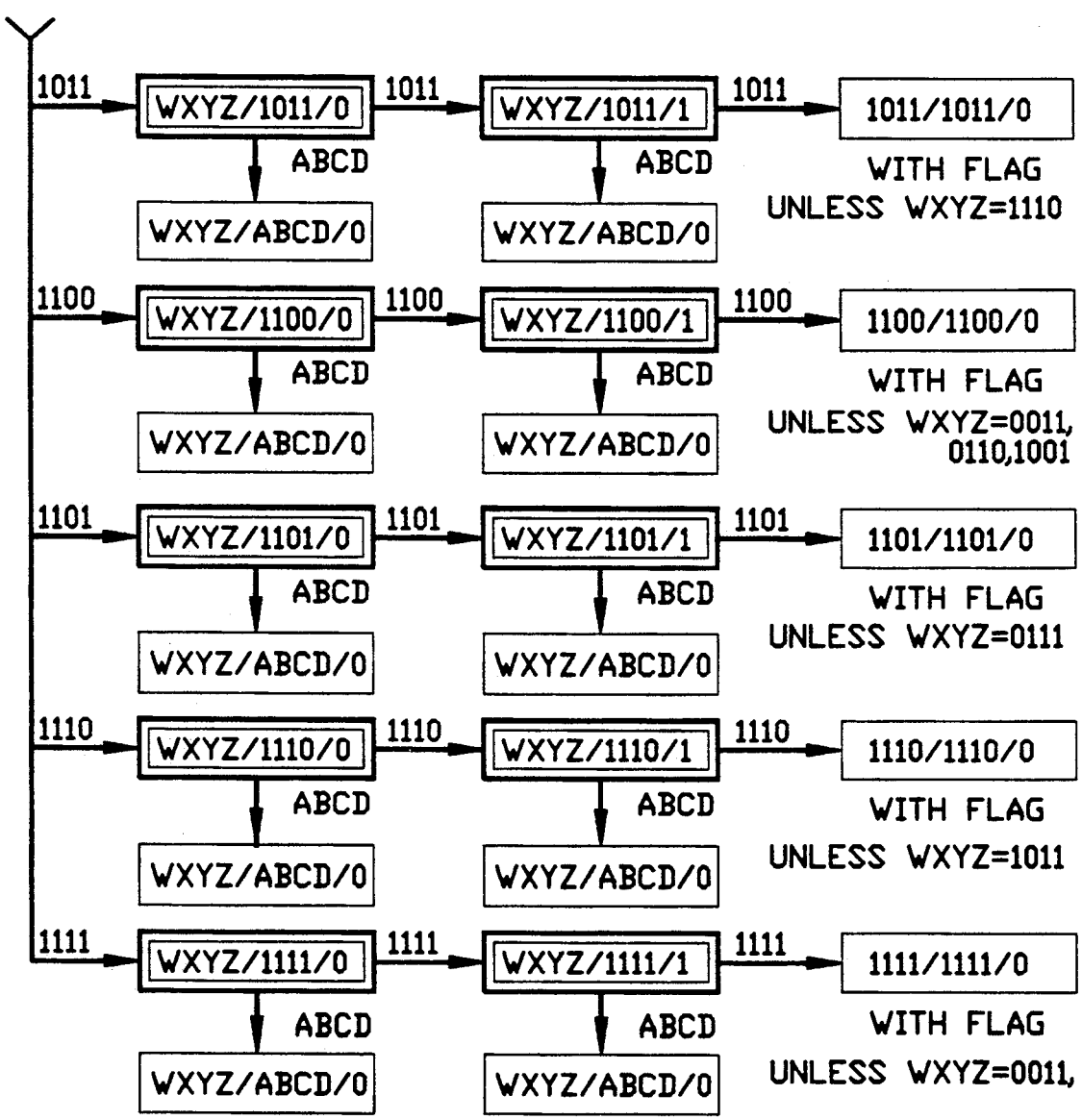
FIG. 44 shows the register bit definitions for the state diagram of ABAB, (SLC96) signaling debounce.
Figure 47:
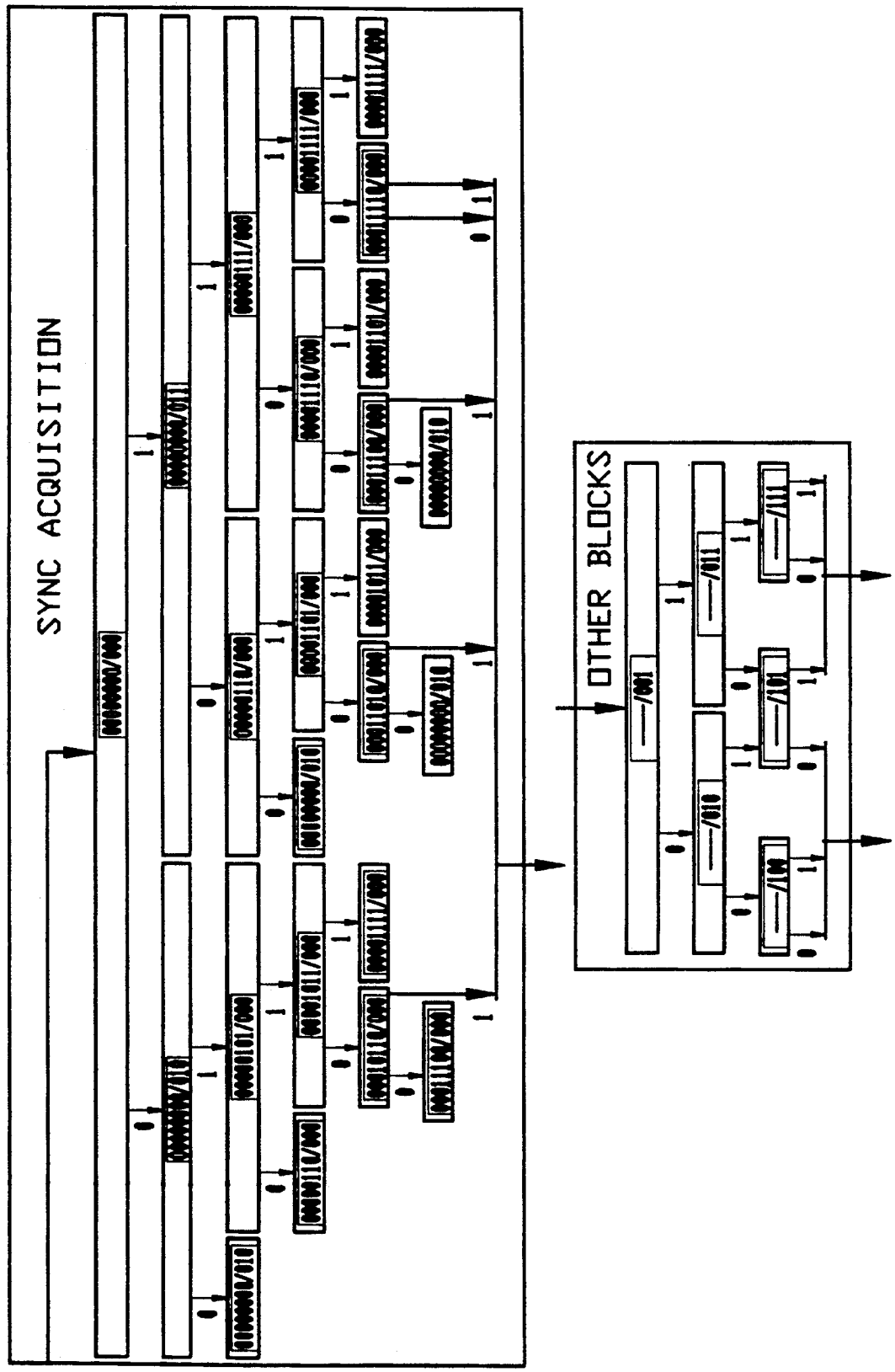
FIG. 47 shows the register bit definitions for the state diagram of special-B signaling decoding.
Figure 48:
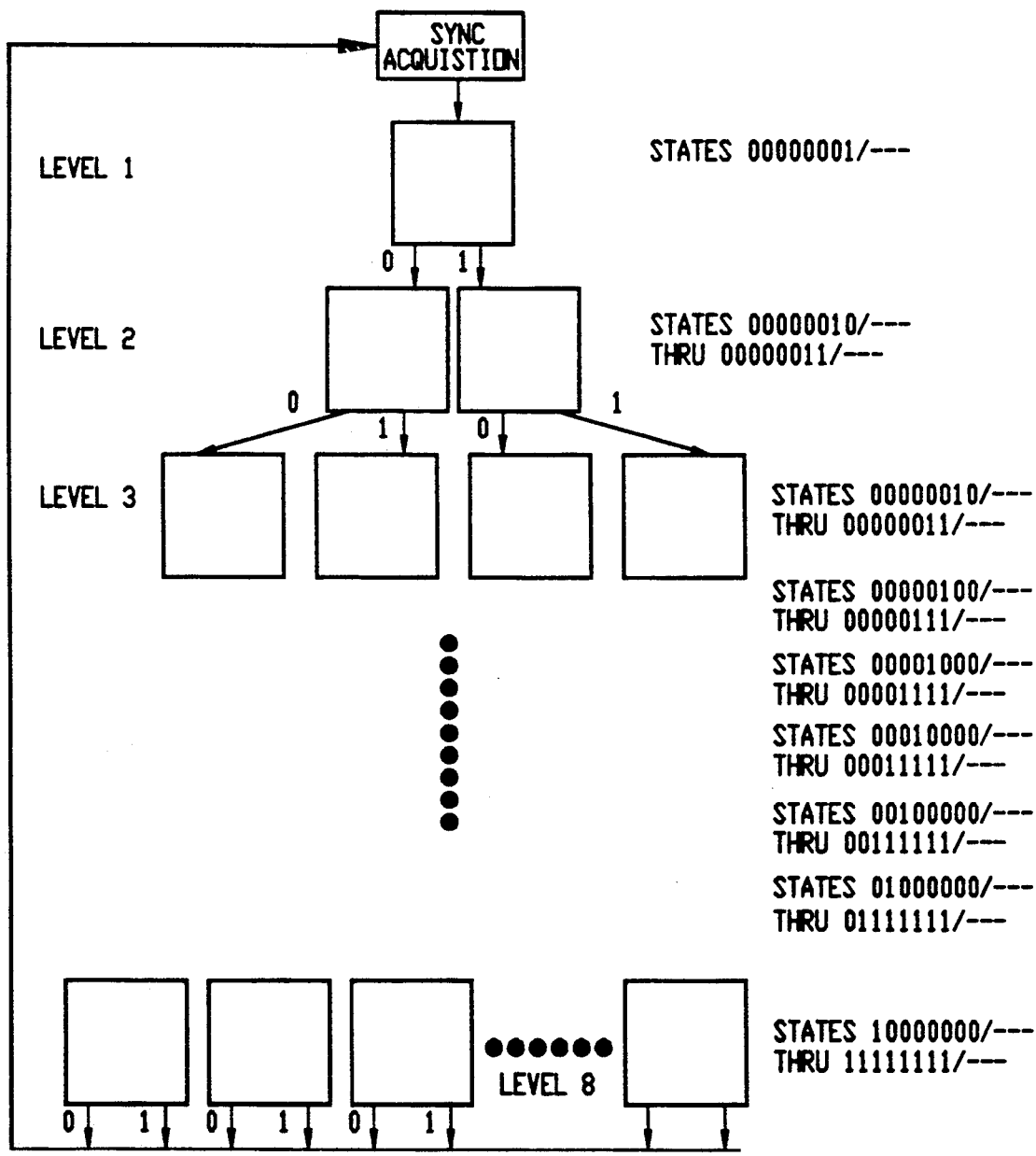
FIG. 48 shows the register bit definitions for the state diagram of special-B signaling decoding.

Referring to FIG. 3B, the interface and buffering circuit 60 of FIG. 2A and interface and buffering arm 122 of FIG. 2B is implemented by means of a combination of these elements, an elastic buffer 153, a DS1 transceiver 152 and a line interface Circuit 151 while the signal control unit 64 of FIG. 2A and signal control circuit 120 of FIG. 2B are preferably implemented in a network link interface, or NLI, circuit 50. The details of the structure of the NLI circuit 50 will be described below with reference to FIGS. 14 through 48. FIGS. 30-32 relate to per channel controls of signaling as described above with reference to the operation of the transmitting DS1 port card 54 of FIG. 2B in which insertion of signaling bits is indicated by a logic-1 while a noninsertion command is indicated by a logic-0. FIGS. 33-35 are related to per channel controls of signaling as described above with reference to the operation of the DSL port card 36 operating in a receiver mode in which cross connect treatment is indicated by a logic 1 while PBX.

Still referring to FIG. 3B, for purposes of illustration, the network link interface circuit 250 is shown being used as a network termination unit, or slave, circuit 250 to interface one of the DS1 port circuits 242, FIG. 3A, with another network link interface circuit 250, operating as a control unit, or master unit, 250.

The DPC 242 provides termination for a single DS1 trunk, interfacing its twenty-four channels into the network. The DPC 242 provides for received DS1 clock recovery, framing control, buffering of received PCM and AB(CD) signaling data, as well as DS1 line performance monitoring. Through the elastic buffer 253, the received DS1 line's PCM and signaling data received on the DS1 line 246 is synchronized with the a system clock appearing on line 251A. The data read from the elastic buffer 253 is transmitted on a network link 247 to the network. Information to be delivered to the outgoing DS1 line 246 is similarly received from the network on a network link 247. The microprocessor monitors bit-error rate and slip performance of the DS1 line, monitors for alarm conditions, controls loopback and other diagnostic facilities, and maintains communication with the control system via a datalink provided in the network link 247.

The received DS1 signal from an office repeater bay (ORB), channel service unit (CSU), or galaxy voice circuit (GVC) port interface equipment is transformer-coupled and terminated on the DPC 242, as shown. Similarly, each DS1 signal transmitted is transformer-coupled to the line. Three VLSI devices form the core of the DS1 interface function of the DPC 250: the line interface unit 251, the DS1 transceiver 252, and the elastic buffer 253. These three VLSI devices are programmable by the DPC microprocessor 254.

The DPC's line interface unit 251 provides appropriate termination and line driver circuitry for DS1 line interface 246, in addition to a programmable line build-out function. The line interface unit 251 also recovers the clock signal on the receive line 246A, presenting this clock and the 1.544 MHz serial data thereon to the DS1 transceiver 252 on lines 251A and 251B, respectively. Similarly, the line interface unit 251 will be provided with 1.544 MHz serial data by the DS1 transceiver 252 on line 252A for transmission on the outbound DS1 line 246. The received DS1 line clock extracted by the line interface unit 251 may also be output by the DPC 242 for cabling to clock controlling circuitry of the network (not shown) as a reference input.

The DS1 transceiver 252 locks on to the framing pattern of the receive DS1 line 246A and passes each channel of PCM and signaling data to the elastic buffer 253 device. Bit error counts and alarm conditions of the received DS1 line are maintained by the DS1 transceiver 252. Similarly, PCM and signaling data to be transmitted on the outbound DS1 line 246B are provided by the NLI 250 to the DS1 transceiver 252 for framing.

The elastic buffer 253 buffers the received PCM and signaling information for each channel to allow for variations between DS1 line and system clocks. This data is read from the buffer by the NLI 250 in synchronism with the system clock. Preferably, the elastic buffer device 253 is programmed to perform signaling integration and freeze functions, if desired.

The NSC 236 encodes the system clock and synchronization signals onto the network link 247 and these signals are decoded by the NLI 250 and its associated phase-locked loop circuitry. The NLI 250 provides the mechanism for connecting the twenty-four channels of PCM and signaling data of the DPC 242 with the network. The NLI 250 also provides the means for the microprocessor 254 to communicate with the microprocessor of the NSC 236 over the 768kbps datalink of the network link 247. In redundant systems, the NLI 250 is connected to an NSC 236 in each network copy.

The DPC 240 contains a 68008 microprocessor 254 is a 68008IC operating at six MHz. The major function of the microprocessor 254 is to program the DS1 interface circuitry of the NLI SOB and to monitor the DS1 line 240, reporting error and alarm conditions to the NSC 236. The microprocessor 254 will interact with the NLI SOB for communication with the NSC 236. In such case, the DS1 transceiver 252 will control the facilities data link 251A in ESF DS1 applications. Alternatively, for remote agent applications, the NLI 250 will control a datalink to remote facility 257B maintained in one of the 64kbps channels of the DPC 242.

The DPC 242 contains sixty-four kbytes of no wait-state EPROM 255 for boot loading and diagnostic code. The DPC 242 contains 32kbytes of no wait-state RAM 256 which can be optionally expanded to 96kbytes. The RAM 256 can be write-protected in 8kbyte blocks.

Several registers are also provided in the address space of the microprocessor 254 to allow for control and monitoring of various functions.

The microprocessor 254 can receive interrupts from the NLI 50, the DS1 transceiver 252, the line interface unit 251, the serial communications controller 257, and by a ten microsecond signal developed in the NLI 250.

In order to provide for remote agent capability, the DPC 242 is provided with access to one of the twenty-four sixty-four kbps channels of the DS1 line 246 to facilitate 'D' channel control in an ISDN '23B+D' environment. The received sixty-four kbps data is passed by the DS1 transceiver 252 through the NLI 250 to a Z8530 serial communications device, or data links 257A and 257B, controlled by the microprocessor 254. The devices 257 will serialize the sixty-four kbps data stream and pass this through the NLI 250 to the DS1 transceiver 252 for transmission to the outbound DS1 line 246B. At a remote site, another DPC 242 will be present as the source and sink of this 'D' channel information.

The DPC accepts redundant −48VDC inputs and contains a DC-to-DC power converter to derive the +5V required for its logic circuits.

Figure 4A:
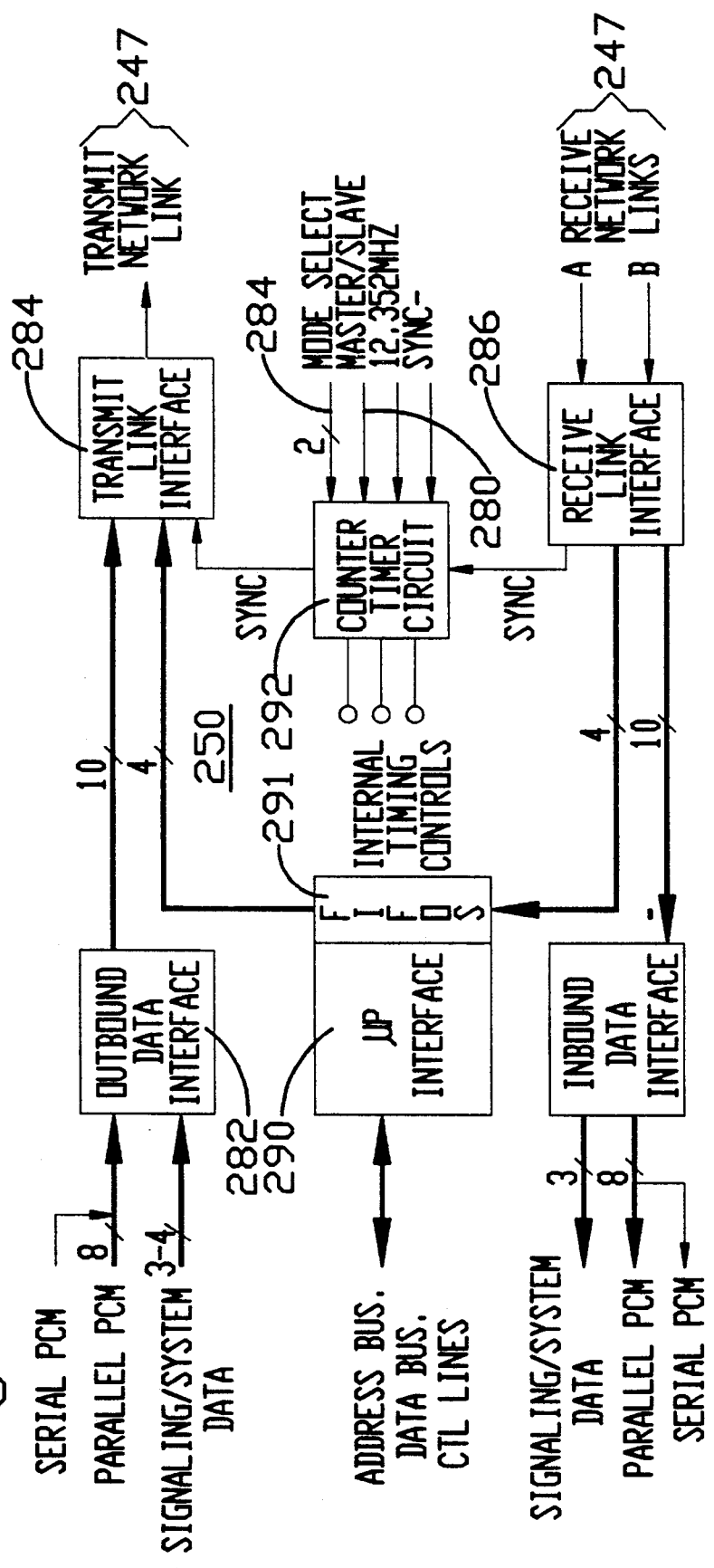
FIG. 4A is a schematic diagram of the network link interface circuit 50B of FIG. 3.

Referring to FIG. 4A, the NLI 250 has five interfaces: an outbound data interface, the transmit link interface 282, the receive link interface 286, an inbound data interface 288, and a microprocessor interface 290. The outbound data interface 282 provides means for a card to hand off PCM and signaling data to be transmitted on a network link. This data is merged with information specified for transmission by the microprocessor interface 290 and is sent in pulse-width modulation encoded form to the outbound network link by the transmit link interface 284. In the other direction, data received form a network link 247 arrives at the receive link interface 86 where PCM and signaling data is extracted and sent to the inbound data interface 288 for output from the NLI 250. Message information is also extracted from the received network link 247 and is routed to the microprocessor interface 290. The connections between the microprocessor interface 290 and both the receive and transmit interfaces 286 and 284 are made via FIFOs 291.

Figure 4B:
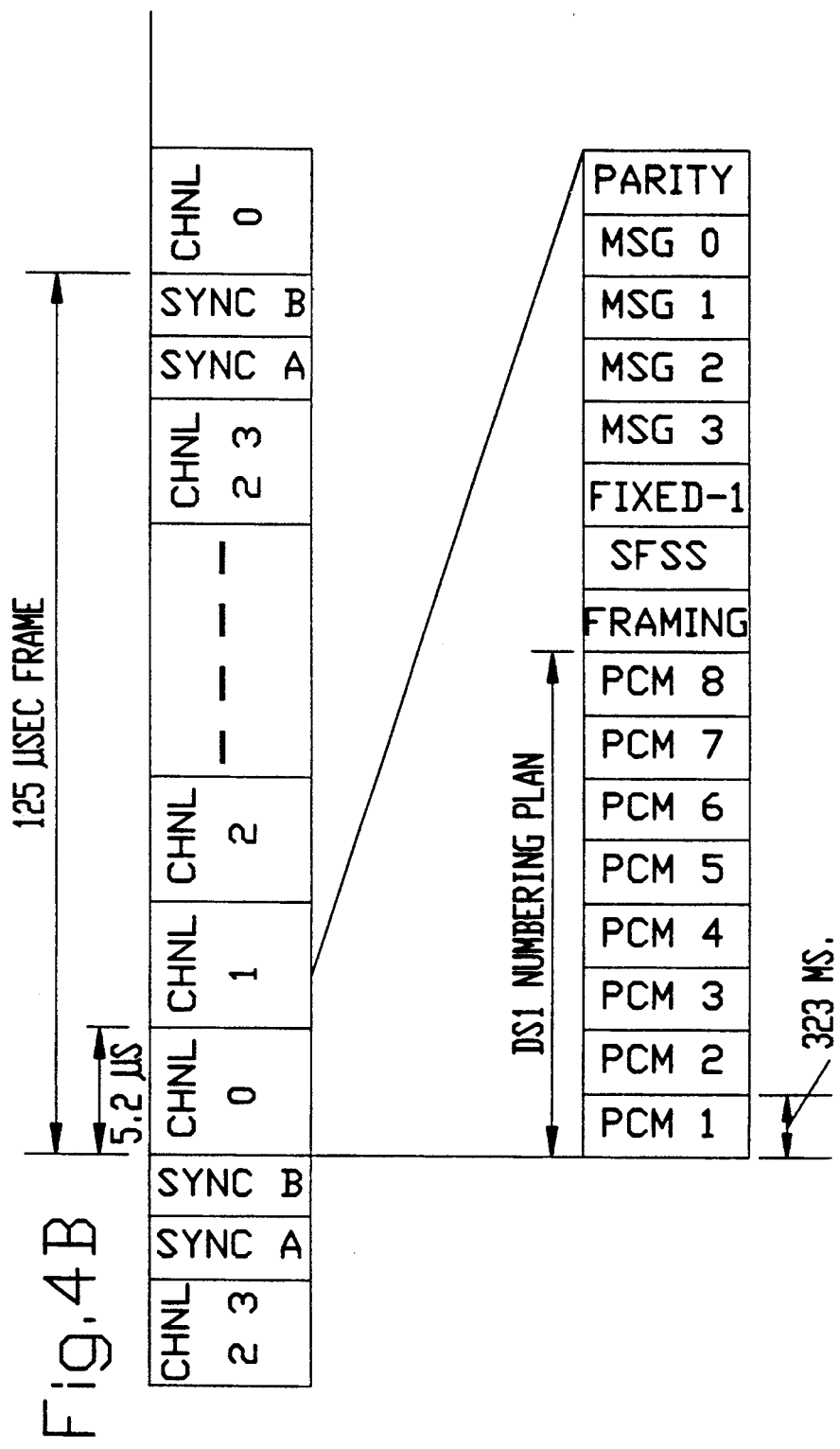
FIG. 4B illustrates the preferred network link format employed with the network link interface of FIG. 4A.
Figure 4C:
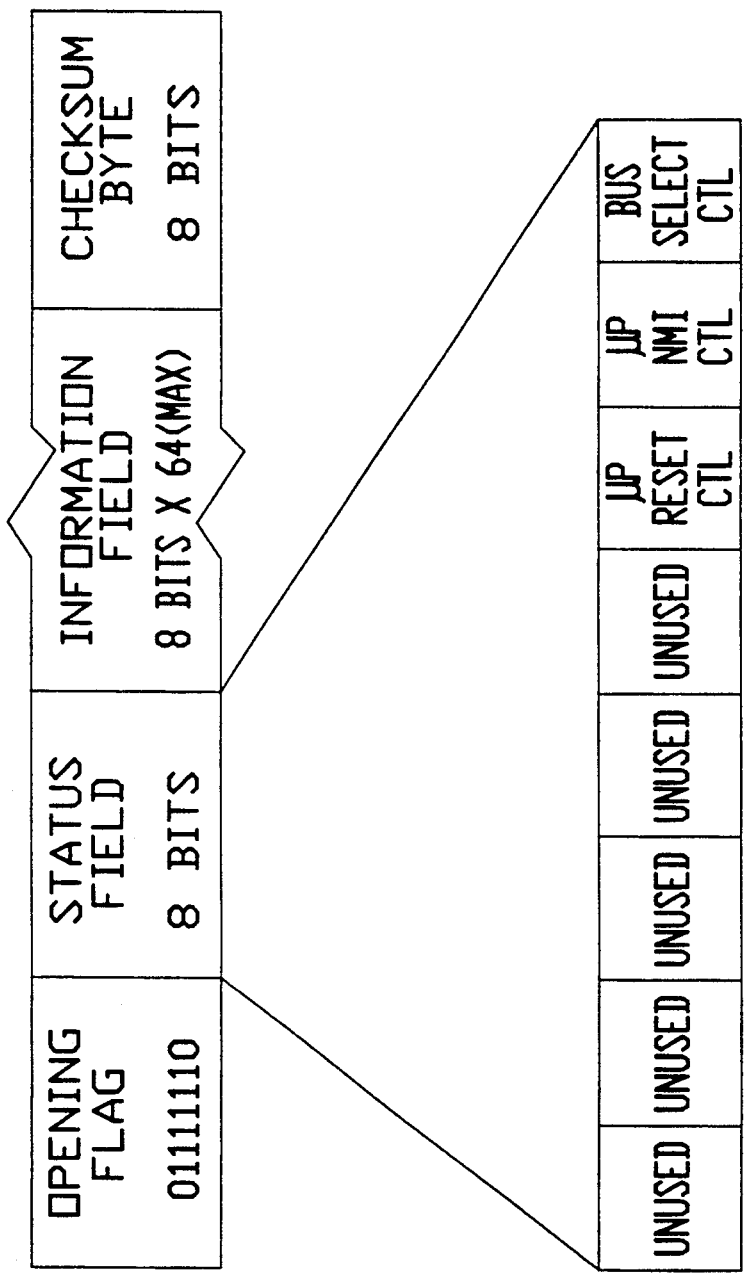
FIG. 4C shows the preferred message format employed with the network link interface of FIG. 4A.

While there are several formats for data flowing across the NLI inbound and outbound data interfaces 288 and 282, the format of data on each network link 247, whether created by the transmit link interface 284 or received at the receive link interface 286, will always be as indicated in FIG. 4B.

The outbound data interrace 282 will accept either parallel or serial input for network link transmission. The operation of the outbound data interface 282 is dependent on the strapping of the NLI mode select pins.

As stated previously, each of the thirty-two NLI circuits 250 on the NSC circuit 236 receives parallel data for each of twenty-four channels for network link transmission. This data is obtained from a 768 channel TDM bus. Referring to FIG. 4B, each NLI 250 will latch a set of twenty-four, eleven bit samples at an approximate 192 kHz rate. The timing for this latching is derived from counters within the NLI 250 which are driven by a 12.352 MHZ control time base clock, and 333 Hz synchronization pulse provided to each element on the NSC circuit 236. To identify which set of twenty-four channels of the 768 channel bus are intended for a given circuit, each NLI 250 has a position register loaded with a value from zero to thirty-one. Each NLI 250 on NSC circuit 236 will have a different value in its position register. The eleven bits handed to each NLI 250 originate at the TSI circuit 234 and consist of eight PCM and three system bits. The three system bits include a parity bit, a frame bit, and a super-frame-synchronous signaling (SFSS) bit. All of these inputs except the SFSS bit are sourced from the switching complex. The SFSS bit is generated by the signaling circuit on the TSI circuit 234 and is passed to the NLI 250 in parallel with the other ten. The parity bit received by the NLI 250 is on the eight PCM and one frame bit generated by the TSI 234, and checking of this parity is performed in the outbound data interface 282, FIG. 4A. If a parity error is detected, the appropriate bit of an NLI interrupt status register, will be set and the DPC circuit's microprocessor of the DPC 242 will be interrupted. Regardless of the priority check results, the ten remaining data bits are transferred to the transmit link interface 284.

On DPC circuits 242, FIG. 3A, and PRI circuits 240, serial PCM and parallel signaling data is received at the outbound data interface 282 for transmission on a network link 247. The serial stream contains twenty-four channels of PCM data and a frame bit is received at a 1.544 MHz rate. A pin 292 (not shown) of the NLI 250 is provided to source a transmit 1.544 MHZ clock for use on DPC circuits 242 and PRI circuits 240 in generating this data stream. An eight kHz transmit sync output pin (not shown) is provided on the NLI 50, so that channel order can be derived on the NLI 250. Timing of each of these clock signals is derived from the received network link synchronization information in conjunction with the 12.352 MHZ input to the NLI 250 from the NLI PLL pin.

The eight bit PCM sample of each channel is extracted from the received serial stream and is converted into parallel form. The frame bit of the serial stream is latched and passed in parallel with the parallel PCM data of each channel to the transmit link interface 284. The four bits of signaling information received at the outbound data interface 282 represent the A, B, C, and D signaling bits for each channel. Based on system-defined superframe timing, the appropriate signaling bit of the four received is selected and sent to the transmit link interface 282 in parallel with the PCM and frame bits. Under microprocessor control, this signaling data may also be specified to replace the LSB of outgoing PCM samples. This type of control is maintained on a channel-by-channel basis through processor specifications for each channel in the transmit signaling control registers.

Operation of the outbound data interface 282 is comparable on BRL circuits 238, except that no signaling bits are passed to the NLI 250.

On DAS circuits 237, twenty-four eight bit parallel PCM samples are presented to the outbound data interface 282 every 125 microseconds for transmission to a network link. The NLI 250 will supply the DAS 237 with an eight kHz transmit sync output on pin 293 to be used with the on board 12.352 MHz clock such that the timing and channel order for passing data to the outbound data interface 282 can be derived. The DAS circuit 237, will supply the NLI 250 with data for transmission at a 192 kHz rate. This data will, in turn, be transferred to the transmit data interface 284.

On DSP circuits 242, serial PCM data is received at the outbound data interface 282 for transmission on a network link 247. The serial stream contains twenty-four channels of PCM data and is received at a 1.536 MHz rate. The 1.536 MHz transmit clock pin 295 of the NLI 250 has been provided to source the clock to be used on the DSP circuit 244 in generating this data stream. The eight kHz transmit sync pin 293 is also used for determining channel order. The 8 bit PCM sample of each channel is extracted from the serial stream, converted into parallel form and passed to the transmit link interface 284.

The transmit link interface 284 receives data from the outbound data interface 282 and the microprocessor interface 290. Sixteen bit data for link transmission is formed by combining the (up to) ten bits from the outbound data interface 282 with four bits from the microprocessor interface 290, generating odd parity on the set, and appending a bit fixed as logic one. Twenty-four such words are formed every 125 usec. Two link sync bits are added to these twenty-four, sixteen bit words and the entire block of information is serialized. The setting of the NLI's Master/Slave-pin 280 determines the coding employed on the outbound 3.088 MHz stream. NLI circuits 250 strapped to function as a master 250 employ a pulse-width modulation coding in order for the NLI circuits 250 operating as a slave 250 at the far end of the network link to be able to derive a clock from the low-to-high transition which begins each bit interval. NLI circuits 250 which are strapped as a slave 50B output the 3.088 MHz stream as simple NRZ, the ones represented as high voltages for the entire bit interval and zeros as low voltages.

The receive link interface 286 receives a 3.088 MHz network link and passes the stream immediately through a decoder. Transitions of data on the received stream are detected in the pulse-width modulation decoder, and a 3.088 MHz clock is derived. This clock is divided by two to form a 1.544 MHz signal which, with respect to NLI circuits 250 specified for slave operation by their Master/Slave-pin 280 setting, will be sent out of the NLI 250 to a phase-locked loop circuit, where 12.352 MHz is created and passed back to the NLI 250 for use in deriving all timing. The serial data output of the decoder is clocked into a shift register at a 3.088 MHz rate to convert the data into parallel form. Sixteen bit words are formed in this fashion consisting of ten bits bound for the inbound data interface 288, four bits for the microprocessor interface 290, a parity bit on the entire word, and a fixed bit of logic one. An odd parity checker is used to verify a properly received data word and, if a parity error is detected, the appropriate bit of the NLI interrupt status register, will be set and the microprocessor of the NLI circuit 250 will be interrupted. In the 3.088 MHz link there are 386 bits transmitted every 125 microseconds. Since only 384 are used for channel data (twenty-four sets of sixteen bit words), two extra bits of link sync information are also received in the data stream. These bits are routed to the counter/timer circuit 292, FIG. 3A, where they are used for acquiring synchronization to the link transmitter.

The inbound data interface 288 receives ten bits from the receive link interface 286 and transmits this data in either parallel or serial form. The mode select pins on the NLI 250 are used to select the output mode for each card.

On the NSC circuit 236, data from each of the thirty-two inbound data interfaces 288 are merged to form a 768 channel TDM bus. Each NLI master circuit 250 will source a set of twenty-four eleven bit samples at an approximate 192 kHz rate. The timing for this latching is derived from counters within the NLI circuit 250 which are driven by the 12.352 MHZ clock and 333 Hz synchronization pulse provided to each NLI 50 on the NSC circuit 236 by the clock card 232, FIG. 3. Each NLI circuit 250 has a position register loaded with a value from zero to thirty-one to determine when it should output to this 768 channel bus. When a given NLI circuit 250 is not outputting data, it will keep its output pins in a high impedance state. When a given NLI circuit 250 is outputting data, the EXG pin of that NLI 250 will generate a low level pulse which is used for special purposes on the NSC circuit 236.

Eleven bits of output are provided by the inbound data interface 288 of each NLI circuit 250, consisting of eight PCM and three system bits. The three system bits include a parity bit, a frame bit and a SFSS bit. All of these outputs except the SFSS bit are sent to the TSI circuit 234, with the parity bit generated on the nine non-SFSS data bits. The SFSS bit is sent to the signaling circuit of the TSI circuit 234 in parallel with the other ten.

In DPC circuits 242 and PRI circuits 240, serial PCM data is output by the inbound data interface 288. The serial stream contains twenty-four channels of PCM data and a frame bit and is transmitted at a 1.544 MHz rate. The receive 1.544 MHz clock pin of the NLI is used by DPC 242 and PRI 240 in latching this data stream. A 333 Hz receive sync output pin 294 has also been provided such that channel and frame order can be derived on these circuits. Timing of each of these clock signals is derived from the received network link sync information in conjunction with the 12.352 MHz input from the NLI phase locked loop circuit.

Signaling information obtained for each channel in the SFSS bit position on the received network link may be inserted into the LSB of each PCM word output by the inbound data interface 288 in accordance with the system-defined superframe timing. This is selectable on a channel-by-channel basis under microprocessor control by setting the bit corresponding to a channel in the received link signaling control registers, FIGS. 5A. 5B and 5C. Operation of the inbound data interface 288 is comparable on BRL circuits 238, except that no signaling bit information is ever inserted into PCM samples.

In DAS circuits 237, twenty-four eight bit parallel PCM samples are output by the inbound data interface 288 every 125 usec. Each of the four NLI circuits 250 on the card will be assigned a distinct value in their position register, to define when each should present parallel output onto a common output bus. When a given device is not passing data from its inbound data interface 288 to this bus, its output pins will remain in a high impedance state. The DAS circuit 237 circuitry will make use of a OSYC pin of the NLI circuit 250 to determine when output data should be latched from a given NLI circuit 250.

In DSP circuits 242, serial PCM data is output by the inbound data interface 288. The serial stream contains twenty-four channels of PCM data and is transmitted at a 1.536 MHz rate. The 1.536 MHz receive clock pin 292 has been provided to source the clock to be used on the DSP circuit 244 in generating this data stream. An 8 kHz receive sync pin and the 1.536 MHz and 8 kHz pins provided for interaction with the inbound data interface 288 and those provided for interaction with the outbound data interface 282 are distinct. Each set has a different phase than the other. The eight bit PCM sample of each channel is extracted from the serial stream, converted into parallel form and passed to the transmit link interface 84.

For channels received by the DSP circuit 242, signaling bits are present in the LSB of PCM samples during the system-defined signaling frames. A-signaling bits will be captured by the NLI circuit 250 and stored in the receive signaling data registers, FIGS. 36-38, for reading by the card microprocessor.

The microprocessor interface 290 provides a variety of registers with which the microprocessor can communicate with the NLI circuit 250 and control its function. One major function controlled by the microprocessor interface 290 is associated with passing messages between circuits. This circuit will perform the necessary functions associated with embedding message information into the 3.088 MHZ network link transmitted and, conversely, with extracting such information from the received link. The message and associated control information is allocated four out of every sixteen bits on a network link. These information bits are sent using a packet protocol at a 768 kbit/sec rate.

Communications between the control and the network termination units is always initiated from the NSC circuit 236. When message information needs to be sent to a network card, microprocessor of the NSC 236 will buffer up to 64 bytes—the first being a byte count—in an NLI transmit FIFO, through means of writing to a transmit message data register. Thereafter, the microprocessor will write a word to the NLI control register containing a logic one in the send message bit position. The NLI 250 will "packetize" the message bytes according to the protocol depicted in FIG. 4C, adding flag, status field, and checksum bytes around this information field. During times when no messages are being sent, the NLI circuit 250 outputs non-flag characters in the 768 kbit/sec field.

The NLI circuit 250 constantly searches for incoming message information by checking for an opening flag in the message field of its received link. Once the opening flag is recognized and the byte count is determined, the NLI circuit 250 will buffer the message bytes in a receive FIFO. A running checksum on the message bytes will be kept as they are received and this will be compared to the checksum byte appended to the incoming message. If the checksum received differs from that calculated, the appropriate bit of an interrupt status register will be set and the circuits microprocessor will be interrupted. Upon receipt of a valid message, the receive FIFO full bit of the interrupt status register will be set and the received status field bits will be interpreted and acted upon. In the NSC circuit 236, a received message will be detected by polling each interrupt status register of the NLI circuits 250 to see if this receive FIFO full bit is set. The message may then be read out of the NLI circuit 250 through the receive message data register. The first byte read will be the byte count, and the microprocessor should loop that number of times, reading the (up to) sixty-three other message bytes.

The NLI circuit 250 will function in a similar fashion in all other modes with the following exceptions. First, on receipt of an inbound message, the circuit's microprocessor will be interrupted along with the indication of receive FIFO full in the NLI interrupt status register. Secondly, on receipt of a message, the receive FIFO will become "locked" such that the message will not be overwritten by a second message to the card. Obviously, any subsequent messages which are passed while the FIFO remains locked will be lost. The processor must act to unlock the FIFO by altering the appropriate bit of the control register upon extracting the current message from the receive FIFO. The FIFO lock mechanism is not available for devices, such as those on the NSC card 236, with master designations on a Master/-Slave pin. Finally, no message should be transmitted by an NLI 250 specified to operate in Modes 1 through 3 until a message has been received requesting a response. However, there is nothing in the circuit to restrict sending an unsolicited message.

The NLI circuit 250 will "packetize" messages from the processor using a protocol consisting of adding an opening flag, a status field, and a checksum on all preceding bytes except the opening flag. The opening flag represents the beginning of a message frame and will always have the value of 7E Hex (01111110 Binary). The status field is an eight bit field used for sending control information from the NSC circuit 235 to net-Work cards—its contents have no meaning on links bound to an NSC 236. The status field bits are used to cause either a reset or a nonmaskable interrupt (NMI) to the processor on an NSC circuit 236 or to cause it to switch which bus from which serial information is received. The (up to) sixty-four bytes of message information will be transmitted after the status field, with the first byte of the information field always being byte count of that field. While transmitting this data, a checksum value is calculated. This checksum byte will be inserted on the link after completion of the information field to provide the far end with a means of checking message integrity.

It should be noted that the byte count beginning the information field may take on the range from zero to sixty-three. A zero byte count message may be sent, for instance, to simply pass status field information between cards. However, a zero byte count message properly received at a slave device, even with the receive FIFO locked, will be interpreted and acted upon. A sixty-three byte count message is one with a completely full information field comprising one byte count digit and sixty-three actual data bytes.

The NLI circuit 250 is designed to recognize parity errors on data coming into the NLI circuit 250, as well as generate parity on data leaving the NLI circuit 250. Parity errors can be detected on outbound parallel data from the TSI Mode 0, on received 3.088 MHz serial data in all modes or on bytes transferred from either of the two FIFOs maintained within the NLI circuit 250. Odd parity is employed on the 3.088 MHz serial links, even parity is employed on the two internal FIFOs, and the type of parity is selected via the control register for Mode 0 TSI data checking and generation. Violations of parity are indicated as to type in the NLI interrupt status register and are always accompanied by an interrupt of the circuit's microprocessor. Should the microprocessor wish to mask any of these parity error interrupts, it may do so by setting the corresponding bit of the control register. Further, should the microprocessor wish to cause any or all of these errors to test its own diagnostic software, bits of the control register are also been specified for this purpose.

Similar to the parity checking, the NLI circuit 250 will always observe the checksum byte associated with each received message. Should the checksum value calculated during message receipt not correspond exactly to that appended to the message, the circuit's microprocessor will receive an interrupt and an indication of such will be placed in the interrupt status register. Such interrupts may be masked or "caused" for diagnostic software checking by setting the appropriate bits of the control register.

Should the NLI 250 ever lose synchronization with the transmitter of its received network link, an indication of such is made in the interrupt status register and the circuit's microprocessor will be interrupted. For NLI circuits strapped as a master 250, the interrupt status register indication is in the receive link out-of-sync bit location; for NLI circuits 250 strapped as slave units 250, the interrupt are indicated in the master clock out-of-sync bit. Further, in NLI circuits 250 operating as a master unit 250, checks are made that the internal counters are in step with the synchronization signal provided on a NLI sync input pin 297. Should such synchronization ever be lost, the master clock out-of-sync bit of the interrupt status register will be set and the circuit's processor interrupted. Consistent with the handling of other error interrupts, these types may be masked, or "caused", for diagnostic software checking by setting the appropriate bits of the control register.

The NLI circuit 250 also provides features for background testing of several system functions. There are registers in each NLI circuit 250 which allow the insertion of a known PCM and signaling pattern in place of the data of one channel to be output on the transmit network link. The microprocessor can specify an eight bit PCM and/or a four bit A,B,C, and D signaling value in the transmit insertion data registers and a channel number designation in the transmit insertion address register. By setting the enable PCM insertion bit of the control register, the microprocessor will cause the A,B,C and D signaling value to be substituted during the system defined superframe timing on the SFSS bit for that channel. In this fashion, an NSC 236 can, for a channel out-of-service, send known values on the link to the switching complex and to a signaling circuit of the TSI 234 where action can be taken to check their operation. PCM insertion can take place without signaling insertion and vice versa. There are, similarly, extraction data register and an address register in the NLI 250 for latching a given channel's PCM and signaling data as it is received from a network link 247. The insertion and extraction registers can be used either individually or as a pair to monitor a variety of system functions.

The NLI circuit 250 has a 10 msec output pin for providing each card with a real-time signal for interrupting its processor. This 10 msec signal is derived from the 12.352 MHz clock input to the NLI circuit 250. This interrupt is acknowledged by reading the clear timer/NMI register of the NLI circuit 250, after which the output signal will go inactive until the next interval has elapsed.

The NLI circuit 250 has an output pin for providing DSP circuits 242 with an interrupt signal for their microprocessor each time A-port signaling bits have been received for all channels on the network link. This 1.5 msec signal will be derived from the 12.352 MHz clock input to the NLI circuit 250 in accordance with the system-defined superframe structure. This interrupt should be acknowledged by reading the clear timer/NMI register of the NLI circuit 250, after which the output signal will go inactive until the next interval has elapsed.

Four pins are provided on the NLI circuit 250 to accommodate 256 or 64 kbps data links. Two pins represent clock signals generated by the NLI circuit 250 for use in transferring 256 or 64 kbps data into and out of the NLI circuit. The two clock signals are not in phase. The remaining two pins are the avenues for 256 or 64 kbps data I/O. On the PRI circuit 240, these pins will be used in transferring data between the NLI circuit 250 and a serial communications controller (SCC), which in turn will be connected to the circuit's microprocessor. In this fashion, the processor will be able to receive data from one channel within the NLI circuit 250 and, likewise, source the data bound to that channel. The 256 or 64 kbps channel with which the processor can interact will be one of those arriving/departing on the T1 line connected to the circuit. Data link operation must be enabled and 256 or 64 kbps operation specified by setting the appropriate bits in the control register.

A DTACK output pin is provided on each NLI circuit 250 for use in handshaking during data transfers with a terminal circuit microprocessor.

Figure 7:
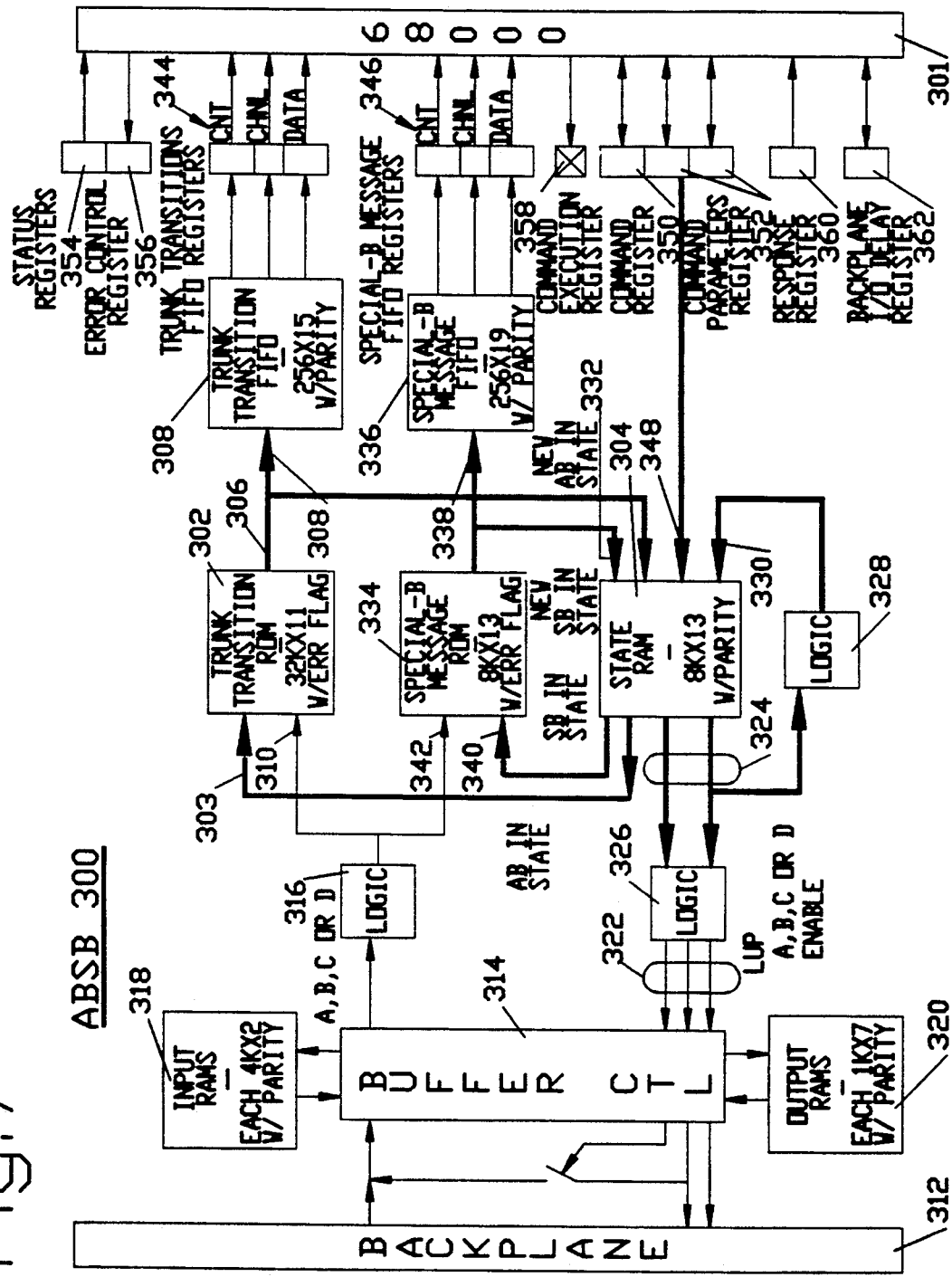
FIG. 7 is a functional block diagram of a preferred integrated circuit implementation of the signaling control of FIG. 2A and referred to as the ABSB IC.

Referring now to FIG. 7, a preferred implementation of the functional blocks 24, 25, 26, 36 and 54 of FIGS.

1, 2A and 2B is in an integrated circuit hereinafter referred to as the ABSB IC 300, or ABSB 300 and, will be described in detail as used in conjunction with the telephonic network shown in copending U.S. application Ser. No. 07/416,077 of Jones et al., filed Sep. 29, 1989, and reference should be made to the application for further details although such details which are most relevant to the present invention are described above with reference to FIGS. 3A, 3B, 4A–4C, 5A–5C and 6A–6C. The registers which compose the microprocessor interface to the NLI 250, FIG. 3B, are described and shown with reference to FIGS. 14–48. The ABSB IC 300 is directly addressable by a microprocessor 201 on the NSC card 236, FIG. 3A. The microprocessor 201 is on the NSC card 236 and communicates with the ABSB IC 300 to provide the bidirectional control of signaling for up to 772 channels. The ABSB IC 300 controls signaling functions for channels using either standard AB signaling or those using a proprietary, or special-B (SB) signaling format, hence the derivation of the name "ABSB" IC. The ABSB IC 300 also provides for control of channels using either extended superframe, or SLC96, signaling formats.

The ABSB IC 300 provides the microprocessor of the NSC circuit, or card, 236, FIG. 3, with the means to control the signaling bits of up to 772 channels in a switching application. Several RAMs, ROMs, and latching components support the ABSB IC 300 in this function and many of the ABSB's pins are dedicated to direct connection of these components. Other pins of the ABSB IC 300 are provided for connection to a 68000 microprocessor and for receipt and transmission of signaling bit information.

The ABSB IC 300 includes a 32K×11 trunk transition ROM 302 with an error flag having an input 303 from an 8K×13 state RAM 304 with parity checking capability, an output 306 back to the state RAM 304 and also coupled with an input 308 of a 256×15 trunk transition FIFO register with parity checking. The trunk transition ROM 302 also has an input 310 for signals received from the back plane 312 through a buffer control circuit 314 and a logic circuit 316. The buffer control circuit 314 is in duplex communication with a plurality of 4K×2 input RAMS 318 with parity and with a plurality of 1K×7 output RAMS 320 with parity checking capability. The buffer control circuit 314 also receives input 322 from outputs 324 of the state RAM 304 through another logic circuit 326. Feedback from one of the outputs 324 is also applied through another logic circuit 328 to an input 330 of state RAM 304.

The state RAM 304 also has an input 332 from a 8K×13 Special-B Message ROM 334 with parity. A 256×19 special-B message FIFO register 336 with parity also has an input 338 receiving the same signals from the Special-B message ROM 334 as input 332 of the state RAM 304. The state RAM 332 also provides signals to an input 340 of the special-B message ROM 334. The special-B message ROM 334 also receives signals of an input 342 from the logic circuit 316.

The microprocessor 301 communicates with the trunk transition FIFO 308 through a plurality of trunk transition FIFO registers 344, CNT, CHNL and DATA. Similarly, the special-B message FIFO register communicates with the microprocessor 301 through a plurality of special-B message FIFO registers 346, CNT, CHNL and DATA.

The state RAM 304 has inputs 348 for communication with the microprocessor 301 through a command register 350 and a pair of command parameter registers 352.

The microprocessor is also coupled with a status register 354, an error control register 356, a command execution register 358, a response register 360 and a back plane VO delay register 362.

The interrelationship between these elements of the ABSB IC 300 described above and the other elements of the system will be described in detail below.

The ABSB IC 300 receives a serial input containing the time-division multiplexed signaling bits from each of 772 channels. This serial input has a twenty-four frame organization as shown in FIG. 8. The "A" signaling bits of each channel are present on the serial signaling input to the ABSB IC during frames one through six; "B" signaling bits are present in frames seven through twelve; "C" signaling bits are present in frames thirteen through eighteen; "D" signaling bits are on the line during frames nineteen through twenty-four. The ABSB IC 300 will sample the A, B, C and D signaling bits for each channel during the twenty-four frame "superframe" and store the four bits from each channel for interpretation during the subsequent twenty-four frame interval. The ABSB IC 300 also outputs a serial stream of signaling bits for 772 channels in accordance with the time-division multiplexed scheme depicted in FIG. 8.

The signaling bits arriving at the ABSB IC 300 are delivered to the switch on either ESF- or D4-formatted DS1 lines. For those channels delivered on ESF-formatted DS1 lines, there is clearly a meaning to each of the A, B, C, and D signaling bits. For those channels delivered on D4-formatted DS1 lines, only A and B signaling bits have meaning and during what would otherwise be C and D signaling bit frames, A and B bits are delivered to the ABSB IC instead. In either case, the ABSB IC 300 will buffer four signaling bits from each of the 772 channels in the twenty-four frame superframe interval for subsequent interpretation. A means is available to notify the ABSB IC 300 as to which channels are from ESF-formatted and which are from D4-formatted DS1 lines, such that signaling information can be interpreted properly. This specification of DS1 line format is also considered in formulating the serial output of the ABSB IC 300.

In addition to a specification as to the type of DS1 line on which a given channel's signaling data is provided, the ABSB IC 300 must be informed of the exact type of termination involved in sourcing each channel's signaling data. The signaling data received by the ABSB IC may have been sourced by a termination card employing either A-only, AB, ABCD, or SLC96 signaling or it may have been sourced by a thin-wire agent console proprietary to Rockwell International. In the case of terminations using either AB, ABCD, or SLC96 (hereafter referred to as ABAB) signaling, the ABSB IC 300 will employ the appropriate algorithm to determine whether a change in signaling state has occurred on each of the 772 channels it services. When a state change has been detected for a given channel, the ABSB IC 300 will make an entry into its internal trunk transition FIFO 308, FIG. 7, citing the number of that channel and its new signaling state. A count of elements within this FIFO 308 is kept in one of the registers 344, CNT. This FIFO counter 344 can be sampled periodically by the microprocessor of the NSC card 236, and the indicated number of elements can be removed from the trunk transition FIFO 303 for further processing. In this fashion, the microprocessor 301 need only concern itself with those channels which have clearly undergone a change in signaling state. Similarly, for signaling data sourced by a thin-wire agent console, the ABSB IC 300 will employ the Rockwell special-B signaling algorithm to determine if an eight bit message has been received. When a message has clearly been received on a given channel, the ABSB IC 300 will make an entry into its internal special-B message FIFO 336 citing the number of that channel and indicating the eight bit message data. A count of elements within this FIFO 336 is also kept in one of the registers 346, CNT. Like the trunk transition FIFO counter 344, CNT, the special-B message FIFO counter 336 can be sampled periodically by the microprocessor of the NSC card 236, FIG. 3A, and the indicated number of elements can be removed from the special-B message FIFO 336 for further processing. The ABSB IC 300 will also source the signaling data specified by the microprocessor of the NSC card 236 in accordance with each channels specification of AB, ABCD, ABAB, or special-B signaling type.

The typical application of the ABSB IC 300 is depicted in FIG. 7. The ABSB IC 300 is physically located on the TSI card 234, FIG. 3A, and is accessible by the 68000 microprocessor 301 of the NSC card 236, FIG. 3A. The ABSB IC 300 is provided with a 772 channel time-division multiplexed serial signaling input and also provides a serial signaling output. The various RAMs 304, 318 and 320, ROMs 302 and 334, and latching components which support the ABSB IC 300 in its function have briefly been described above with reference to FIG. 7.

A detailed schematic of the ABSB IC and its support circuitry are shown in FIG. 7 and the contents of each of the ROMs employed with the ABSB IC 300 are described below.

The components which are external to the ABSB are input RAMs 318, out RAMs 320, timer transition ROM 302, special-B message ROM 334 and state RAM 304.

The ABSB IC 300 operates in "channel synchronization" with the switching complex of the TSI card 234, FIG. 3A. The same 12.352 MHZ clock and 333 Hz synchronization pulse provided to each of the other components of the TSI card 234 by CLK 232 are also applied to the ABSB IC 300. A 772 channel, 11 bit parallel "From Port" data bus flows from the NSC card 236 to the TSI card 232 via the control/network backplane 312. One of these bits (referred to as the superframe synchronous signaling bit, SFSS) is the signaling input to the ABSB IC 300. During a 3 msec, twenty-four frame superframe interval, the A, B, C. and D signaling bits of each channel are sampled by the ABSB IC 300 and are stored in one of the two input RAMs 318. During a given 3 msec interval, one of the input RAMs 318 is being written with the currently received signaling bits, while the signaling bits stored during the previous 3 msec interval in the other input RAM 318 is being accessed for interpretation. These two input RAMs 318 switch roles—one being read while the other is being written—every 3 msec under control of the buffer control 314. Similarly, the ABSB IC 300 also has two output RAMs 320. During a given 3 msec interval, one of these output RAMs 320 is being read to provide time-division multiplexed 772 channel data as the signaling output of the ABSB IC 300, while the other output RAM 320 is being written by the internal circuitry of the ABSB IC 300 with the signaling data to be output during the next 3 msec period. As with the input RAMs 318, the role of each of the output RAMs 320 alternates each 3 msec interval. The signaling output of the ABSB IC 300 becomes one bit (also referred to as SFSS) of the 11 bit "to port" data bus transmitted by the TSI card 234 to the NSC card 236 over the control/network backplane 312.

The state RAM 304 contains data about each channel. For each channel, there is a configuration word in the state RAM 304 that defines the type of termination which is involved. Further, the state RAM 304 contains data on the recent inbound signaling state of each channel, as well as what is to be sourced on the signaling output of the ABSB IC 300. During a 3 msec interval, the ABSB IC 300 must access any changes in the inbound signaling state of each channel, determine what signaling data is to output for each channel during the interval, and also provide access by the microprocessor 301 of the NSC card 236 to make or make changes to the contents of the state RAM 304. Each 3 msec interval is divided into 772 (roughly) equal sub-intervals, where inbound and outbound signaling operations for one channel are performed. Each such 3.89 usec subinterval also provides a window for access of the state RAM 304 by the microprocessor 301.

During a given 3.89 usec period, the state RAM data for the corresponding channel is read and latched by the ABSB IC 300. Also, the most recently received four signaling bits for that channel are read from the input RAM 318 and are latched. The recently received signaling bits are applied along with the data read from the state RAM 304 indicting the signaling state of the channel as address inputs to the trunk transition ROM 302 and the special-B message ROM 334. Data outputs of each of these ROMs are then stored back in the state RAM 304, updating the records on the channel in anticipation of signaling bit analysis during the subsequent 3 msec interval. Should a specific output of the trunk transition ROM 302 be at a logic one, a transition of signaling state will be indicated and an entry of the number of the channel and its new signaling state will be made into the internal trunk transition FIFO 308, and the counter of elements within the FIFO will be incremented. Similarly, should a specific output of the special-B message ROM 304 be at a logic one state, receipt of a special-B message will be indicated and an entry of the number of the channel and its new signaling state will be made into the internal trunk transition FIFO 308 and the counter of elements within that FIFO 308 will be incremented. Similarly, should a specific output of the special-B message ROM 334 be at a logic one, receipt of a special-B message will be indicated and an entry of the number of the channel and the eight bit message data received will be made into the internal special-B message FIFO 336 and the counter elements within that FIFO 336 will be incremented.

During the same 3.89 usec period, the signaling data to be output for the channel will be assessed by the ABSB IC 300, and the signaling data to be output for the channel will be assessed by the ABSB IC 300. The signaling data to be output for a given channel is easily determined by the combinational logic circuit 326 whose inputs are the state RAM configuration and output state (or message) words which have been read and latched by the ABSB IC 300 for that channel. These four signaling bits to be output for the channel during the next 3 msec interval are then stored in one of the output RAMs 320.

Also during that same 3.89 usec period, the microprocessor of the NSC card 236, FIG. 3A, can access the state RAM 304 to either read data or make modifications. The microprocessor 301 does this by issuing commands to the ABSB IC 300. The microprocessor 301 can asynchronously alter the command register 350 and command parameter registers 350 to formulate a command to the ABSB IC 300. The command will be initiated by writing to the command execution register 358. However, as access to the state RAM 304 can only be made during specific (synchronous) intervals, the ABSB IC 300 cannot immediately insure response to a command. So as to indicate exactly when a command issued to the ABSB IC 300 has been successfully completed, a bit will be set in the status register upon completion. Should the command issued require a response such as in a request to read the contents of one of the memory locations of the state RAM 304, the value returned can be obtained from the response register 360.

All of the registers within the ABSB IC 300 which are accessible to the microprocessor 301 are depicted in FIG. 7. The purpose and operation of each will be described below. It is important to note, however, that the microprocessor 301 can directly (and asynchronously) access the FIFOs 344 and 346 without employing any "command-oriented" dialog. The FIFO count registers 344 and 346 and the data contained within each can be accessed similar to access of any memory device. Further, the ABSB IC 300 is connected to all sixteen bits of the microprocessor 301 to expedite data transfers.

During the course of inbound signaling, the ABSB IC 300 will, for each channel in turn, compare the most recently received signaling bits to its previously established signaling state. For those channels whose signaling data is sourced by standard termination cards (i.e., not thin-wire agent consoles), should those recently received bits be consistent for 9.0 msecs. and differ from the previously known state, a transition of signaling state will be declared and an entry will be made into the trunk transition FIFO for later reading by the microprocessor 301. Each entry to the trunk transition FIFO 308 will contain the ten bit number associated with the channel, as well as the four bit representation of the new signaling state. The ABSB IC 300 can be directed by the microprocessor 301 of the NSC card 236 to monitor a signaling bits of the channel for transition in either of four fashions:

1) simply checking the A signaling bits for a transition (ignoring B bits);
2) checking amongst successive A-B bit pairs;
3) checking groups of two consecutive A-B pairs (A-B-A-B groups) for 9-state SLC96 signaling transitions;
4) checking groups of two consecutive A-B pairs (A-B-A-B, or more accurately, A-B-C-D groups) for 16-state ESF signaling transitions.

The trunk transition ROMs 302 employed by the ABSB IC 300 actually control a "debounce" algorithm for all channels. Should something other than a 9.0 msec debounce interval be desired or should a different form of checking be desired, replacement of the currently ROMs could yield a new algorithm. However, that there are constraints in this regard, primarily due to the size of the ROMs employed and available pins interconnecting the ABSB IC 300 to these ROMs.

For those channels were special-B signaling is employed, the A and B bits received will be analyzed separately. The A signaling bits will be debounced by the "A-only" signaling algorithm noted above and the transition information passed to the trunk transition FIFO 302. The B bits will be decoded according to a proprietary special-B signaling algorithm, with messages extracted form the serial bit stream passed to a special-B FIFO 336 for later input to the NSC card microprocessor 301.

It should be noted that the trunk transition FIFO 308 and the special-B FIFO 336 are completely separate and each can hold up to 255 entries at a time. Should a given FIFO be overrun, an indication of such is available to the NSC card microprocessor 301 in the ABSB IC status register 354. A determination of FIFO overrun can also be made when reading the maximum value (255) from the FIFO counter register of the FIFO 308 or 336.

In the course of outbound signaling, the ABSB IC 300 also provides for control of the signaling bits to be sent out on each channel. The NSC card microprocessor 301 need simply specify to the ABSB IC 300 the desired signaling state (or special-B message) to be output on a given channel; this data will be stored in the state RAM 304 and the subsequent transmission will take place without need of further action by the microprocessor 301. In the case of special-B message output, an indication that the complete message has been output to a given channel is available by accessing the state RAM 304.

The organization of the state RAM 304 is depicted in FIG. 8. The data contained for each channel in the state RAM 304 dictates how its signaling is administered by the ABSB IC 300. There are eight words reserved for each channel in the state RAM 304, of which five are actively used by the ABSB IC 300. Access to the data of a given channel in the state RAM 304 by the NSC card microprocessor 301 is accomplished by formulating a thirteen bit address. The top eight bits of this address are the channel number, and the bottom three indicate which of the eight words of the state RAM 304 corresponding to that channel should be accessed. The NSC card microprocessor 301 can either read or write any location in the state RAM 304.

The five state RAM elements for each channel which are employed by the ABSB IC 300 are the configuration (CFG) word, the ABIN word, the SBIN word, the ABOUT word, and the SBOUT word. The CFG word is the element wherein the NSC card microprocessor 301 can specify the type of each channel—whether a standard AB trunk, a thin-wire agent console, etc. The ABIN word is what the ABSB IC 300 uses to store the last known signaling state of a channel. The SBIN word is only meaningful for channels designated as consoles and is employed by the ABSB IC 300 to record the most recent state of the special-B signaling data received on a channel. The ABOUT word is employed by the ABSB IC 300 in determining the A, B, C, and D signaling bits which should be output on a given channel. The SBOUT word only has meaning for those channel designated as consoles and is used by the ABSB IC 300 to receive indications from the NSC card microprocessor 301 as to what special-B message should be output on the given channel and, thereafter, as to a bookkeeping location during the special-B message encoding process. The data structures involving each of these types of state RAM elements are described in FIG. 9.

While there are twelve data bits (plus one parity bit) contained at each state RAM address, not all are meaningful. Only the lower five bits have meaning in specifying (or reading) the configuration word of a given channel; only the lower nine are meaningful in the ABIN word of a channel; the lower eleven have meaning in an SBIN word; the lower four are meaningful in an ABOUT word but all twelve have meaning in an SBOUT word.

The ABSB IC 300 contains fourteen registers which are directly addressable by the microprocessor 301. These registers are listed in FIG. 10 along with their read/write properties and their base address within the ABSB IC 300 as well as being shown in FIG. 7 as registers 354, 356, 344, 346, 358, 350,,352, 360 and 362. A bit map of each register is depicted in FIGS. 17-48. All of the register bits will power-up to logic zero with the exception of the "Test Mode A Set" bit in the status register 354, which will be at logic one.

Many of the bits in the ABSB IC 300 status register 354 (depicted in FIG. 15) are reserved for identifying to the NSC microprocesser 301 that a particular type of error has occurred and been detected by the ABSB IC 300. Errors are defined as parity failures on any of the five RAM blocks, access errors (reading outside the addressable range) on either of the two ROM blocks, synchronization errors between the 333 HZ synchronization input to the ABSB IC 300 and the ABSB internal counter logic, and indicators that either of the two FIFOs have become full. An interrupt will be given to the NSC microprocessor 301 when any of these errors (except FIFO overrun) occurs.

The NSC card microprocessor 301 can directly access registers CNT containing the element count message queues of each of the trunk transition FIFO 308 and the special message FIFO 336. Further, the topmost element of each queue may be read directly. Two words must be read by the microprocessor 301 to acquire all information about a given trunk transition. "Word #1" contains the ten bit channel number of the trunk observed and "Word #2" contains four bits representing the current signaling state. Likewise, special-B queue elements utilize separate words for channel number and for the eight bit message extracted from the bit stream. Reading all elements in a queue can be accomplished by first reading the element count and looping that number of times, reading each of the two word resisters. Hardware within the ABSB IC 300 will sense when the FIFO's word #1 register is being read and will prepare both word #1 and word #2 with the topmost data of the element, updating the queue count. The FIFO count and element registers corresponding to each of these two FIFOs are depicted in FIGS. 17 through 22. When either of the FIFO counter values indicates that there are no elements in the associated FIFO, there should be no attempt to read elements from that FIFO.

The backplane I/O delay register depicted in FIG. 26 is an element to be considered only at power-up. It represents a means to make the hardware adaptable to a variety of system configurations. For a given configuration, a particular word should be written to this register. After the initial write to this register, it is no longer a consideration in the operation of the ABSB IC 300. The value to be placed in this register is seven.

For testing purposes, any of the types of errors which can be indicated in the status register 354 (except FIFO full indications) can be "created" by setting the appropriate bit of the error control register depicted in FIG. 27. Likewise, bits of the error control register have been provided to mask interrupts due to any of these errors.

The remaining registers within the ABSB IC 300 are all involved in processing commands issued to the device from the NSC card microprocessor 301. The first step involved in the process of issuing a command to the ABSB IC 300 involves the NSC card microprocessor 301 reading the status register 354. Two bits of the status register are used as handshake signals with between the ABSB IC 300 and the microprocessor 301: a command ready bit and a response ready bit. On receipt of command ready high, the microprocessor 301 may write a four bit value to the command register 354 indicating to the ABSB IC 300 some specific "command" to be performed. The list of four bit "commands" understood by the ABSB IC 300 is given in FIG. 1. As can be seen, several commands involve parameters, i.e. a state RAM address and, possibly, a value to be placed at that address. Parameters associated with a specific command should be written as indicated in FIG. 11 to the appropriate command parameter register 352. Upon being satisfied that the appropriate values are specified in the command register 350 and command parameter registers 352, the microprocessor 301 should initiate a write to the command execution register 358—the specified operation will begin thereafter and will be completed within five microseconds. The microprocessor 301 should loop after issuing this write command, reading the status register and testing for the response ready bit being high. On receipt of response bit ready high, the microprocessor 301 can expect that the any data requested as a result of the command will be available in the response register 360. This command execution sequence is shown in FIG. 12.

Preferably, two modes of test designated "A" and "B" are available. The ABSB IC 300 will power-up in test mode A. In order to switch between test modes, separate "Set Test Mode" commands are provided. A "Clear Test Mode" command should be issued at completion of testing to enable normal on-line operations.

The ABSB IC test modes are defined with reference again to the ABSB IC 300 block functional diagram of FIG. 7. As seen, there are several blocks of memory involved in the ABSB IC 300 signaling bit processing, none of these memories reside in the address space of the microprocessor 301. Access to these memories can only come through mechanisms provided by the ABSB IC 300. While parity checking is done on each of these memories to detect failures in on-line operation, it is desirable to provide offline access to these memories for diagnostic testing purposes. Such testing is done while in test mode A. Without additions to the command list, only the state memory 304 would be accessible to the microprocessor 301 through the command structure involving the status register 354, command register 350, command parameter regoster 352, command execution register 358 and response registers 360, described previously. The commands "Write Trunk Transition FIFO" and "Write Special-B FIFO" are provided for testing the memory and control logic integrity of each of the two queues. Access to each of the input RAM 318 and output RAM 320 of the ABSB IC 300 is not provided due principally to timing problems associated with the addition of further logic to their I/O paths.

Some confidence can be gained in the input and output RAMs and their control circuitry while in test mode B. In this mode, the entire operation of the ABSB IC 300 can be verified by causing a loopback of data for all channels at the backplane 312. Data specified by the microprocessor 301 for encoding and transmission to the backplane 312 will propagate through the output RAMs 320 and back into the input RAMs 318 and be immediately obtained and processed by the ABSB IC inbound signaling handling circuits. It should be noted that data will not be transmitted to the backplane 312 at all during either of these test modes.

Individual channels can be looped-back in this fashion during on-line operation through a "loopback" control bit in a the configuration word of a given channel within the state RAM. This capability is especially useful on the top four channels of the 772 channel set serviced by the ABSB IC 300, as these channels are not used for any other purpose in the system. By using any of these four channels, the entire function of the ABSB IC 300 circuitry can be periodically audited with the device fully on-line.

The two "Reset FIFO" commands are available for instances where an abnormally large amount of data bound for the microprocessor 301 has been accumulated in a short period of time. In such instances, the microprocessor 301 may either read all elements of the associated FIFO or simply reset the FIFO with the appropriate command, ignoring the recent burst of inbound data. One might choose to make use of these commands during startup operations when an inbound state transition might quickly be received for each of the channels activated.

As previously stated, the ABSB IC 300 is in test mode A at power-up, and all signaling bit output to the backplane is inhibited. Prior to bringing the ABSB IC 300 on line, it is necessary that the appropriate word, such as the number seven, be written to the backplane I/O delay register and that each configuration word of the channel in the state memory be cleared. Also, the SBOUT word for each channel can then be initialized or it can be initialized on a per channel basis when not in test mode A. The initialized value for the SBOUT word should be 000000001111 which indicates an idle channel. Thereafter, a "Clear Test Mode" command may be issued, and any number of channels may be activated.

While the ABSB IC 300 is in a test mode, a variety of operations can be performed to ensure that the circuitry (in part or as a whole) is working properly. When the device is on-line, however, much less can be done without disrupting service to channels.

The ABSB IC 300 has three major interfaces. One has a system backplane and associated input and output RAMs, a second interface is with the microprocessor 301, and a third with a variety of RAM and ROM components forming signaling state machines.

Referring to the ABSB IC 300 schematic diagram of FIG. 7, there are four distinct circuits.

The JCTL circuit controls device operation. The backplane clock and synchronization signals are taken into this block and are used to drive counters of various modules. The outputs of these counters are passed through logic gates to form the various addresses, latch clocks, and provide other control signals required in the other three blocks of the ABSB IC 300.

All data transfers to and from the backplane are made through a JBCK circuit. This circuit will take in signaling bits from the backplane 312 and direct their storage in either of two input RAMs 318 designated A or B. While writing the received signaling bits to one of these memories 318, previously written data in the other memory 318 will be read by the JBCK circuit and passed to the state machines for processing. Likewise, signaling data designated for transmission to the backplane 312 by state machine circuitry will be stored in either of two output RAMs 320 designated A or B. While writing the signaling bits to be transmitted to one of these memories 320, previously stored bits in the other memory 320 will be output to the backplane 312. While each direction of transmission through this block is normally independent, facilities are provided for looping signaling bits bound for the backplane 312 back into the inbound circuit (as though they are arriving from the backplane) for test purposes. Note that the four RAM buffers described are located external to the ABSB IC 300 the two input RAMs 318 are each minimally 4k×2 in size, while each output RAM 320 is minimally lk×7 in size.

The interface between the trunk transition and special-B state machines and both the backplane and microprocessor circuits of the device is found by a JSM circuit. Data words for a given channel are read from the externally located stat RAM and latched in this circuit. From these data words, the appropriate signaling bits to be sent to the backplane 312 are determined. Simultaneously, these data words are used along with the most recently received signaling bits for that channel as address inputs to the external trunk transition ROM 302 and special-B message ROM 336 tables for determining changes in the inbound signaling state. The data resulting from these table lookups is latched within the ABSB IC 300 in the JSM circuit. The content of this data determines whether the state RAM contents of the channel should be altered, if the data should be passed to the microprocessor 301 for further analysis, or both.

The circuit which forms the interface between the microprocessor and the other elements of the card is a JUP circuit. Separate FIFO registers 308 are kept in this circuit for the passing of data to the microprocessor 301 from either the trunk transition FIFO 308 or the special-B message FIFO or state machine 336. The topmost elements of each of these queues as well as other information about chip status is read directly from registers within the ABSB IC 300 which are mapped into the address space of the microprocessor 301. Likewise, several of these registers may be written to in order to direct control of the ABSB IC 300.

Still referring to FIG. 7, there are seven blocks of memory, two ROM and five RAM memories accessed by the ABSB IC 300. These memory blocks are the input RAMs 318, the output RAMs 320, the state RAM 304, the trunk transition FIFO 308, the special-B message FIFO 336, the trunk transition ROM 322, and the special-B message ROM 334.

The input and output RAMs 318 and 320 are each composed of two RAM components simulating dual-port structures. The input RAMs 318 are organized such that each signaling bit received from the backplane 312 is stored with a complemented version of itself (as a parity bit) in a unique memory location. The output RAMs 320 are organized into 7-bit words consisting of the A, B, C, and D signaling bits, a backplane output-enable bit, an output-to-output loopback indicator and a parity bit. The organization of the state RAM 304 is depicted in FIG. 13. The data contained in the state RAM 304 dictates how each channel is to be administered by the ABSB IC 300. The trunk transition FIFO 308 can hold up to 256 15-bit elements, though only 255 can actually be accessed. Each element stored in the trunk transition FIFO 308 consists of a ten bit channel number, a four bit state value (of the same form as those of the state memory) and a parity bit. The special-B message FIFO 336 can hold up to 256 nineteen bit elements, though only 255 can actually be accessed. Each element stored in the special-B message FIFO 336 has a ten bit channel number, an eight bit message value (of the same form as those of the state memory) and a parity bit. It should be noted that data passed between either the state RAM 304, the trunk transition FIFO RAM 308, or the special-B message FIFO RAM 336 and the NSC card microprocessor 301 will not contain the associated parity bit of the RAM. Parity generation and checking will be done by the ABSB IC 300 in a fashion transparent to the microprocessor 301. Further, the NSC card microprocessor 301 has no access capability to either the input or output RAMs 318 and 320.

The two ROMs 302 and 334 employed With the ABSB IC 300 form the control logic of state machines for inbound signaling debouncing and special-B message decoding. The channel data is read from the state RAM 304 and latched external to the ABSB IC 300. This information is used in conjunction with the most recently received signaling bits for that channel as address inputs to the ROMs 302 and 304. The resulting ROM data output is used in updating the state RAM of the channel and, when a particular bit is found to be set, as entry data to the appropriate FIFO 308 or 336.

The ABSB IC 300 preferably operates with a power supply voltage (Vcc) within the range of 4.75 to 5.25 Volts DC. In addition, it is capable of operation with a maximum backplane clock frequency of 13.5 MHz (12.352 MHz+10%) and a maximum microprocessor clock frequency of 17.6 MHz (16.0 MHz+1.0%).

The worst case power consumption of the ABSB IC 300 is 2.0 watts.

In FIG. 10B are listed mnemonics and descriptions for each of the 159 pins required on the ABSB IC 300 in addition to the power supply pins. Since determination of the number of pins to be added for supply power and ground is dominated by the number of outputs switching simultaneously at the highest rate, roughly eighty outputs can be switching simultaneously at 6.176 MHz on the ABSB IC 300. The conversion used in assigning pin mnemonics is the appending of an underscore (_) to a name where a signal is active low; a signal is otherwise to be assumed active high. Several of these pins will be used in different fashions from those described if desired.

The registers which compose the microprocessor interface to the NLI 250, FIG. 3B, are described below and shown in FIGS. 14 et seq. Addresses for each of the registers are given along with their names. These addresses contain five bits and their designation is from A5–A1. On 68000-microprocessor based circuits which employ the NLI circuit 50, it should be expected that the NLI registers will not be at contiguous locations in the address spectrum of the processor. The NLI registers may be placed in either the upper byte only or lower byte only of the data bus of the processor. In addition to the address given with each register, there are Read-Only (RO) designations given to the appropriate registers. Any register without an RO designation is read/writeable.

Referring to FIG. 28, the construction of ROMs external to the ABSB IC 300 which support the inbound signaling state machine operations are described below. Four ROMs are employed external to the ABSB IC 300, two 32k×8 ROMs ABL and ABH for incoming trunk signaling debounce and two 8k×8 ROMs SBL and SBH for incoming special-B signaling message decoding.

The state RAM 304 which supports the ABSB IC 300 contains three words for each channel which are of interest with respect to state machine operations: the ABIN word, the CONFIGURATION word, and the SBIN word. Each of these words will be read by the ABSB IC for each channel in turn and, together with the most recently received signaling bits provided by the buffer RAM, they will describe the current signaling state of that channel.

The ABSB IC 300 support ROMs are depicted in FIG. 28 along with their connections to the ABSB IC 300 and its latching components 384 and 386. The address inputs to the ROMs are provided by the ABSB IC 300 either directly or through latches 384 and 386 under control of the ABSB IC 300. The data outputs of the ROMs are fed directly into the ABSB IC 300. The ROMs, themselves, are simply look-up tables referred to by the ABSB IC 300. The "state machine operation" of the ABSB IC 300 has four steps:

1. The current signaling state of the channel being processed is read by the ABSB IC 300 from the state RAM 304, FIG. 7, and externally latched as part of the address input to the ROMs.

2. The most recently received signaling bits for that channel are read from a buffer RAM and are provided by the ABSB IC 300 as the remainder of address inputs to the ROMs.

3. The ROM output is allowed to propagate for its full access time and is latched within the ABSB IC 300.

4. The ROM output data is used by the ABSB IC 300 to update the current signaling state of that channel in the state RAM 304. Additionally, if certain bits of the ROM output data are set, either an error is declared or an entry is made into a FIFO to pass information on for examination by the NSC card microprocessor 301.

The purpose of the trunk signaling state machine is to identify transitions of signaling state on each channel. The algorithm employed calls for signaling to be in a new state consistently for 9.0 msec prior to declaring a transition of state on that channel. On identification of a transition, an entry will be made into the ABSB IC internal trunk transition FIFOs, FIG. 7, consisting of a ten bit channel number and four bits which identify the signaling state. The contents of the trunk transition FIFOs will be read periodically by the microprocessor 301 on the NSC card 236.

Four distinct methods of searching for signaling transitions are available in the trunk signaling state machine. Selection of a particular method is done for each channel by setting the appropriate bits in its CONFIGURATION word in the state RAM 304. A-only signaling—presumes that the set of four signaling bits in buffer consist of two pairs of AB bits; B signaling bits are ignored in determining transitions. AB signaling presumes that the set of four signaling bits in buffer consist of two pairs of AB bits; AB signaling bits are treated as a pair in determining transitions. ABAB (SLC96) signaling presumes that the set of four signaling bits in buffer consist of two pairs of AB bits; these four bits are treated as a group in determining transitions and only nine of the sixteen possible values of ABAB signaling bit groups are considered distinct (e.g. 0100 is considered equal to 0001). ABCD (ESF) signaling presumes that the set of four signaling bits in buffer consist of one ABCD bit group; these four bits are treated as a group in determining transitions and all sixteen possible values for ABCD are considered distinct.

FIG. 29 describes the address inputs to the ABH and ABL ROMs and the nature of their output. Note that the "Mode" address inputs to the ROMs come from the CONFIGURATION word of the channel in the state RAM 304. As depicted, the ROMs are actually composed of four distinct segments and the mode address inputs select the appropriate segment. The "Last State" address inputs to the ROMs come from the ABIN word of the channel in the state RAM 304. The "New State" which results on ROM output is the data which will be placed back into that ABIN word of the channel of the state RAM 304 in order to prepare for the next time that the signaling data of the channel is to be processed. Finally, note that there are two "flag" outputs from the ROM. If the error flag is set, something is wrong with the address provided to the ROM and the appropriate action will be undertaken to alert the microprocessor 301 of such; if the transition flag is set, an entry will be made into the trunk transition FIFO.

Special-B signaling is signaling scheme proprietary to Rockwell International and used to allow thin-wire agent consoles to communicate with the switch control system. Messages are transmitted in the B-bit positions of the AB signaling bits on a DS1 line with 12 frame superframe format. Each message transmitted is accompanied with a header and a trailer. A complete message including header and trailer requires 32 superframes to transmit (16 system superframes) which in time is equal to 48.0 msec. The header consists of five bits, with five distinct patterns considered as "valid" at a receiver, and the trailer consists of three consecutive zeroes. The twenty-four information bits which follow the header represent an eight bit message, with each bit repeated three times. A receiver will obtain the eight bit message transmitted by doing a majority logic decision on the three copies of each bit received.

The purpose of the special-B signaling state machine is to identify messages received in the B signaling bits for each channel. The algorithm employed calls for first identifying the message header and thereafter decoding the 24 following information bits into an eight bit message. On identification of a received message, an entry will be made into the internal special-B message FIFO 336 consisting of a ten bit channel number and eight bits which identify the message. The contents of the special-B message FIFO will be read periodically by the microprocessor 301 on the NSC card 236.

FIG. 45 describes the address inputs to the SBH and SBL ROMs and the nature of their output. The "Last State" address inputs to the ROMs come from the SBIN word of the channel in the state RAM 304. The "New State" which results on the ROM output is the data which will be placed back into that SBIN word of the channel of the state RAM 304 in order to prepare for the next time that the signaling data of the channel is to be processed. There are two "flag" outputs from the ROM. If the error flag is set, something is wrong with the address provided to the ROM and the appropriate action will be undertaken to alert the microprocessor 301 of such; if the message flag is set, an entry will be made into the special-B message FIFO 336.

The thin-wire agent consoles, in addition to sourcing Special-B message data, also source A signaling information. A given channel designated as an agent console to the ABSB IC 300 will, then, have B signaling bits assessed by the Special-B state machine and will also have A signaling bits assessed by the trunk signaling state machine for transitions.

While a detailed description of the preferred embodiment of the invention has been given, it should be appreciated that many variations can be made thereto without departing from the scope of the invention as set forth in the appended claims.

We claim:

1. A telephonic switching network, comprising:
   means for receiving a plurality of time division multiplexed input channels of incoming information from selected nodes of the network in the form of PCM voice data with embedded signaling data,
   means for preselecting individual ones of said plurality of channels for alternative cross connect treatment and signaling data analysis treatment on a channel by channel basis; and
   a controllable incoming switching circuit with signaling data passing capability for passing the incoming information of each channel for transmission to other selected nodes in the network selectively with and without embedded signaling data depending upon the preselection of each incoming channel for alternative cross connect treatment and signaling data analysis treatment, respectively.

2. The telephonic switching network of claim 1 including means for separating the data of at least the channels preselected for signaling data analysis treatment into two separate intermediate signals of only PCM voice data and only signaling data information, respectively.

3. The telephonic switching network of claim 2 including means responsive to said preselecting means for generating separate output signals containing only PCM voice data and only signaling data information respectively corresponding to the two separate intermediate signals for the channels preselected for signaling data analysis treatment.

4. The telephonic switching network of claim 3 including means responsive to said preselecting means for generating a composite output signal of voice data with embedded signaling data corresponding to said voice data with embedded signaling data at the input channels receiving means for only the channels preselected for cross connect treatment.

5. The telephonic switching network of claim 2 including means responsive to said preselecting means for generating a composite output signal of voice data with embedded signaling data corresponding to said voice data with embedded signaling data at said input channels receiving means for only the channels preselected for cross connect treatment.

6. The telephonic switching network of claim 5 in which said composite output signal generating means includes means responsive to said data separating means for recombining the voice data and signaling data information of the intermediate signals to generate the composite output signal for only the channels preselected for cross connect treatment.

7. The telephonic switching network of claim 1 in which said preselecting means includes a relatively low processing power microprocessor connected with the receiving means for preselecting said channels according to a message received from a relatively higher order microprocessor associated with the multichannel switching element.

8. The telephonic switching network of claim 7 in which said preselecting means includes a central control processor for controlling switching by a plurality of substantially identical multichannel switching elements, and means for conveying preselection information to each of the higher order microprocessors of said plurality of substantially identical multichannel switching elements for causing the relatively lower processing power microprocessors to make preselections for input channels associated therewith.

9. The telephonic switching network of claim 1 including a central control processor for controlling the switching of a plurality of controllable switching circuits to output the incoming information of channels preselected for signaling data analysis treatment to other selected nodes of the network according to the signaling data embedded therein.

10. The telephonic switching network of claim 9 in which
each of said plurality of controllable switching circuits includes
means for analyzing the signaling data embedded in the channels preselected for signaling analysis, and
means for conveying a signaling message of the results of said signaling data analysis to said central control processor, and
said central control processor controls the switching of said controllable switching circuits in accordance with said signaling message.

11. The telephonic switching network of claim 10 in which said signaling data analyzing means includes a state machine.

12. The telephonic switching network of claim 11 in which said state machine is equipped to analyze signaling data of more than one format.

13. The telephonic switching network of claim 1 including a plurality of substantially identical input port circuits each including a receiving means and a preselecting means and each associated with a different group of input channels.

14. The telephonic switching network of claim 13 including a plurality of substantially identical controllable switching circuits each associated with incoming channels of a plurality of said input port circuits.

15. The telephonic switching network of claim 1 including a controllable outgoing switching circuit with signal passing capability for receiving the incoming information from said controllable incoming switching circuit and outputting the incoming information therefrom to other nodes in the network according to said preselection, information from channels preselected for cross connect treatment being provided on a single composite output of PCM voice data with embedded signaling data and information from channels preselected for signaling data analyzing treatment having the PCM voice data and associated signaling data being provided on a pair of separate outputs.

16. The telephonic switching network of claim 15 including means for embedding signaling data into the PCM voice data for those channels selected for signaling data analysis.

17. The telephonic switching network of claim 15 in which said embedding means includes an outgoing signaling control circuit for generating outgoing signaling data on a separate output, and means for receiving said outgoing signaling data and said PCM voice data and combining them for each channel preselected for signaling bit analysis.

18. The telephonic switching network of claim 16 in which said signal receiving means includes means for receiving PCM voice data with embedded signaling data from the outgoing switching element for those channels preselected for crossconnect treatment.

19. The telephonic switching network of claim 15 including a medium processing power microprocessor for providing messages to the outgoing signaling control circuit concerning, in part, the format of signaling data embedded by the signaling control circuit, said medium processing power microprocessor providing messages to said embedding means to identify those channels preselected for signaling data analysis.

20. A telephonic switching network, comprising:
means for receiving on a plurality of time division multiplex channels of selected nodes of the network data including PCM voice data and signaling data in a plurality of different preselected signaling formats;
means including a multichannel incoming switching circuit connected with the receiving means for switching the data of said plurality of channels to other nodes of the network; and
means for controlling the multichannel incoming switching circuit to switch said plurality of channels in accordance with the signaling data in said plurality of different signaling formats, said controlling means including a multichannel signaling control circuit responsive to said signaling data and to a state machine associated therewith for analysis of said signaling data on each channel according to the signaling format preselected for each of said channels.

21. The telephone switching network of claim 20 in which
said data receiving means includes means for separating the signaling data from the PCM voice data and providing it on an incoming signaling bus.

22. The telephonic switching network of claim 20 in which said receiving means includes
means for separating the signaling data from the PCM voice data, and
means including a signaling bus to provide the signaling data to the controlling means.

23. The telephonic switching network of claim 20 in which said controlling means includes a central control processor for controlling a plurality of said switching circuits according to said analysis by the multichannel signaling control circuits.

24. The telephonic switching network of claim 23 in which each of said plurality of controllable switching circuits has a relatively medium processing power processor which is less powerful than the central control processor for conveying to the central control processor a message of the results of said analysis.

25. The telephonic switching network of claim 24 in which each of said controllable switching circuits has a multichannel switching element controlled by the central control processor for selectively switching the channels of the receiving means to other selected nodes in the network.

26. The telephonic switching network of claim 20 in which said state machine includes means for analysis of signaling data of each of said plurality of signaling formats.

27. The telephonic switching network of claim 20 in which said state machine includes removable plug-in units associated with different preselected signaling formats.

28. The telephonic switching network of claim 20 in which said switching means includes a multichannel outgoing switching circuit for receiving data including PCM voice data from said incoming switching circuit and switching it to said other nodes.

29. The telephonic switching network of claim 28 including means for controlling the multichannel outgoing switching circuit, said controlling means including a multichannel outgoing signaling control circuit for selectively embedding signaling data into said outgoing PCM voice data.

30. The telephonic switching network of claim 29 in which
said controlling means includes
a signaling state machine containing signaling data for said plurality of different signaling formats, and
means for receiving control messages, and
said outgoing signaling control means includes means for generating signaling data for each channel in response to said messages in a preselected one of the signaling formats of said state machine.

31. A telephonic switching network, comprising:
a plurality of multichannel incoming switching circuits;
a central control processor for controlling the plurality of multichannel switching circuits to switch a selected plurality of incoming time division multiplex channels of PCM voice data to a plurality of selected outgoing channels;
means including a plurality of relatively lower order processors respectively associated with said plurality of multichannel switching circuits for analyzing signaling data embedded in the voice from the incoming channels;
means for transmitting messages representative of said analysis of the signaling data from each of the plurality of relatively lower order processors directly to the central control processor, said central control processor responsive to said transmitted messages for controlling the switching of the channels of all of said plurality of switching circuits.

32. The telephonic switching network of claim 31 including a plurality of multichannel outgoing switching circuits for selectively conveying data to said outgoing channels.

33. The telephonic switching network of claim 31 including a plurality of relatively medium power processors associated with said multichannel outgoing switching circuits, respectively.

34. The telephonic switching network of claim 33 including
means for transmitting messages from the central control processor to the plurality of relatively medium processing power processors, and
means responsive to said medium processing power processors to generate signaling data.

35. The telephonic switching network of claim 33 including means for embedding said signaling data in voice data from said multichannel outgoing switching circuits before being conveyed to the outgoing channels.

36. The telephonic switching network, of claim 31 including a plurality of receiving circuits associated with a plurality of groups of said incoming channels, each including
means for receiving incoming PCM voice data with embedded signaling data, and
means including a still lower order processor for receiving messages from said central control processor relayed thereto by the lower order processor for preselecting some of the group of incoming channels associated therewith for cross connect treatment and others for signaling data analysis treatment.

37. The telephonic switching network of claim 36 in which each of said receiving means includes means for separating the signaling data from the PCM voice data for each of the incoming channels preselected for signal data analysis.

38. The telephonic switching network of claim 31 in which said analyzing means includes a signaling control circuit for analyzing signaling data in different preselected signaling formats.

39. The telephonic switching network of claim 38 includes a state machine for providing inputs to said signaling control circuit representative of said different signaling formats and in which said relatively lower order processors are responsive to said signaling data and to said state machine for analyzing the signaling data.

40. The telephonic switching network of claim 39 in which said state machines are in the form of interchangeable snap-in state machine units respectively associated with different signaling formats.

* * * * *